(12) United States Patent
Herbert et al.

(10) Patent No.: US 11,635,637 B1
(45) Date of Patent: Apr. 25, 2023

(54) FLUID LENS WITH LOW ENERGY MEMBRANE ADJUSTMENT

(71) Applicant: META PLATFORMS TECHNOLOGIES, LLC, Menlo Park, CA (US)

(72) Inventors: Andrew Alexander Herbert, Bedfordshire (GB); Robert Edward Stevens, Eynsham (GB); Thomas Norman Llyn Jacoby, Oxfordshire (GB); Andrew John Ouderkirk, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 396 days.

(21) Appl. No.: 16/861,125

(22) Filed: Apr. 28, 2020

Related U.S. Application Data

(60) Provisional application No. 62/849,003, filed on May 16, 2019.

(51) Int. Cl.
*G02C 7/08* (2006.01)

(52) U.S. Cl.
CPC .................................... *G02C 7/085* (2013.01)

(58) Field of Classification Search
CPC ........ G02C 7/022; G02C 7/061; G02C 7/085; G02C 7/086; G02C 7/088; G02C 7/02; G02C 7/08; G02B 27/0075; G02B 27/0172; G02B 27/0093; G02B 26/004; G02B 26/0825; G02B 26/0866; G02B 26/0858

See application file for complete search history.

(56) References Cited

U.S. PATENT DOCUMENTS

| | | |
|---|---|---|
| 5,138,494 A | 8/1992 | Kurtin |
| 5,371,629 A | 12/1994 | Kurtin et al. |
| 5,668,620 A | 9/1997 | Kurtin et al. |
| 5,696,521 A | 12/1997 | Robinson et al. |
| 5,956,183 A | 9/1999 | Epstein et al. |
| 5,999,328 A | 12/1999 | Kurtin et al. |
| 7,256,943 B1 | 8/2007 | Kobrin et al. |
| 8,254,034 B1 | 8/2012 | Shields et al. |
| 10,634,824 B1 | 4/2020 | Ouderkirk et al. |

(Continued)

FOREIGN PATENT DOCUMENTS

| | | |
|---|---|---|
| WO | 2013/143630 A1 | 10/2013 |
| WO | 2018/158347 A1 | 9/2018 |
| WO | 2019/186181 A1 | 10/2019 |

*Primary Examiner* — Mustak Choudhury
(74) *Attorney, Agent, or Firm* — Greenberg Traurig, LLP

(57) ABSTRACT

Examples include a device including a fluid lens having a membrane (that may be in elastic tension), a substrate, a fluid at least partially enclosed between the membrane and the substrate, and a support structure configured to provide a guide path for an edge portion of the membrane, such as a membrane attachment at a periphery of the membrane. The guide path may be configured to greatly reduce (or substantially eliminate) changes in the elastic energy of the membrane as the membrane profile is adjusted. The guide path may be configured so that the elastic force exerted by the membrane is generally normal to the guide path for each location on the guide path. Adjustment of the membrane profile may include applying an actuation force that is normal to the elastic force exerted by the membrane. Various other methods and apparatus are also disclosed.

18 Claims, 32 Drawing Sheets

(56) References Cited

U.S. PATENT DOCUMENTS

| | | |
|---|---|---|
| 2003/0095336 A1 | 5/2003 | Floyd |
| 2004/0156983 A1 | 8/2004 | Moravec et al. |
| 2006/0077562 A1 | 4/2006 | Silver |
| 2006/0163612 A1 | 7/2006 | Kouvetakis et al. |
| 2007/0279585 A1 | 12/2007 | Bartoli |
| 2008/0001169 A1 | 1/2008 | Lochtefeld |
| 2008/0207846 A1 | 8/2008 | Henze et al. |
| 2008/0239503 A1 | 10/2008 | Conradi et al. |
| 2008/0257409 A1 | 10/2008 | Li et al. |
| 2009/0147371 A1 | 6/2009 | Lee et al. |
| 2010/0068866 A1 | 3/2010 | Yu et al. |
| 2010/0118413 A1 | 5/2010 | Kim et al. |
| 2010/0176375 A1 | 7/2010 | Lochtefeld |
| 2010/0182703 A1 | 7/2010 | Bolis |
| 2010/0252861 A1 | 10/2010 | Lochtefeld |
| 2011/0085131 A1 | 4/2011 | Gupta et al. |
| 2011/0085243 A1 | 4/2011 | Gupta et al. |
| 2012/0041553 A1 | 2/2012 | Gupta et al. |
| 2012/0287512 A1 | 11/2012 | Egan et al. |
| 2014/0077220 A1 | 3/2014 | Kryliouk et al. |
| 2014/0253873 A1 | 9/2014 | Crosby et al. |
| 2014/0261611 A1 | 9/2014 | King et al. |
| 2015/0055084 A1* | 2/2015 | Stevens .................... G02B 3/14 |
| | | 359/666 |
| 2015/0116656 A1 | 4/2015 | Stevens et al. |
| 2015/0185480 A1 | 7/2015 | Ouderkirk et al. |
| 2016/0049299 A1 | 2/2016 | Ko et al. |
| 2016/0223837 A1 | 8/2016 | Holland et al. |
| 2017/0269378 A1 | 9/2017 | Stevens et al. |
| 2019/0097080 A1 | 3/2019 | Ide |
| 2019/0258084 A1 | 8/2019 | Stevens et al. |

\* cited by examiner

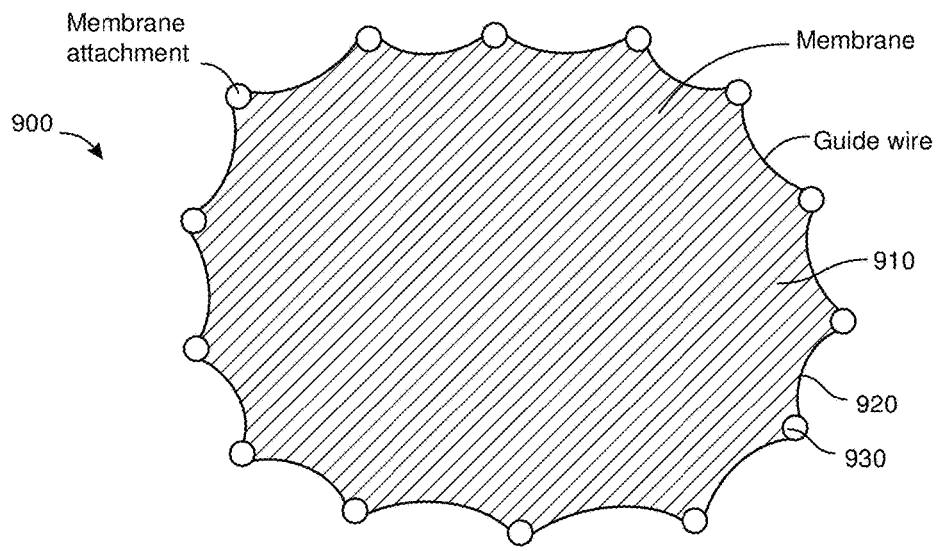
FIG. 9
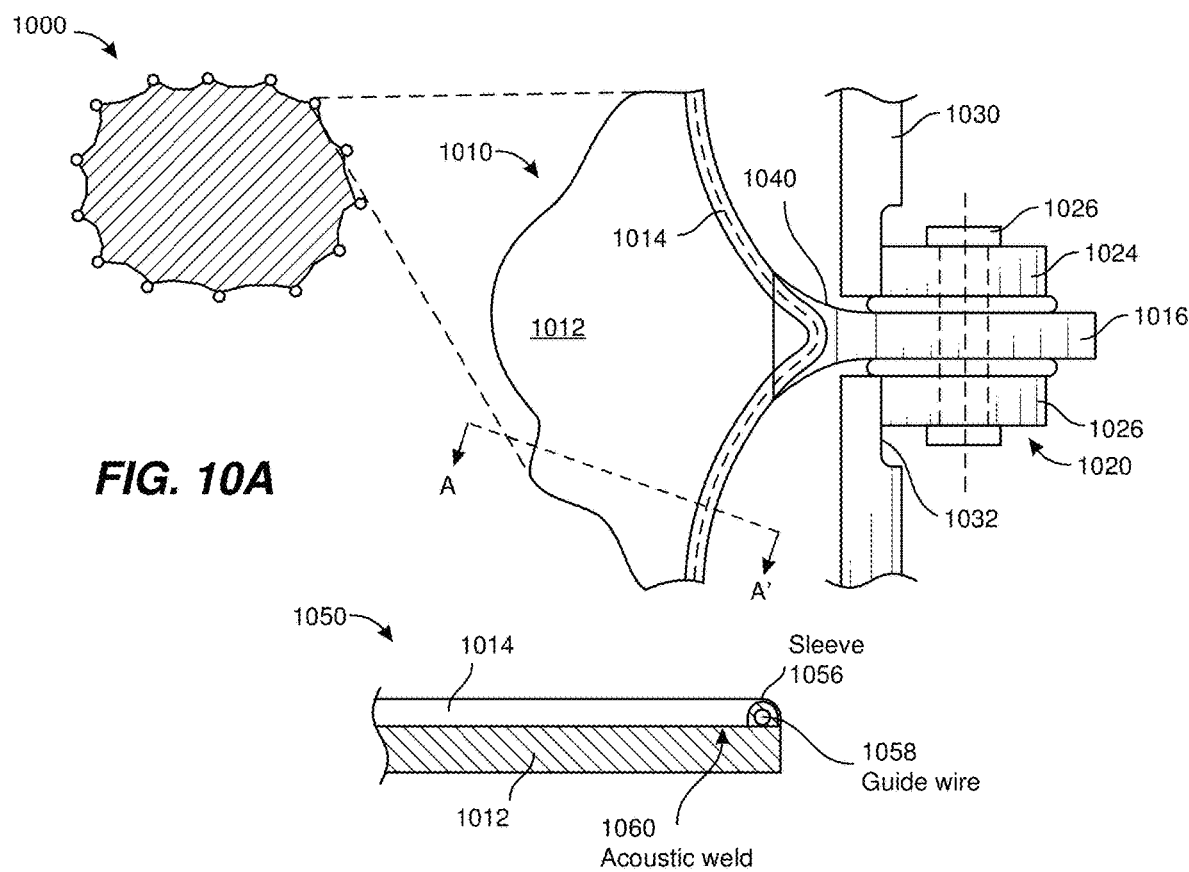
FIG. 10A
FIG. 10B

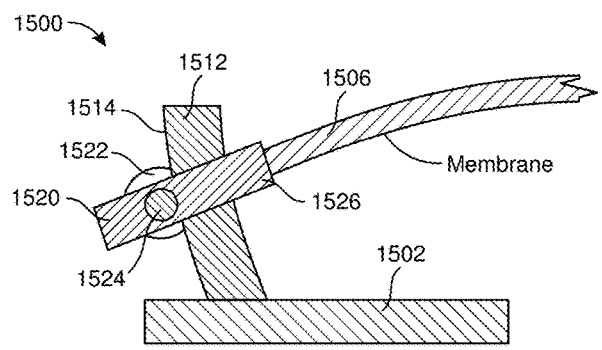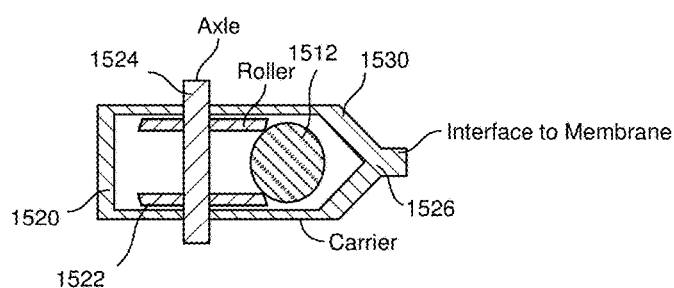
FIG. 15A
FIG. 15B
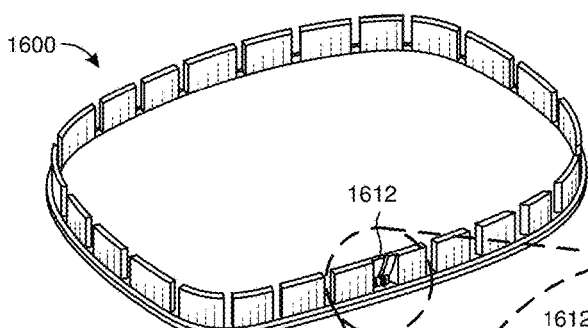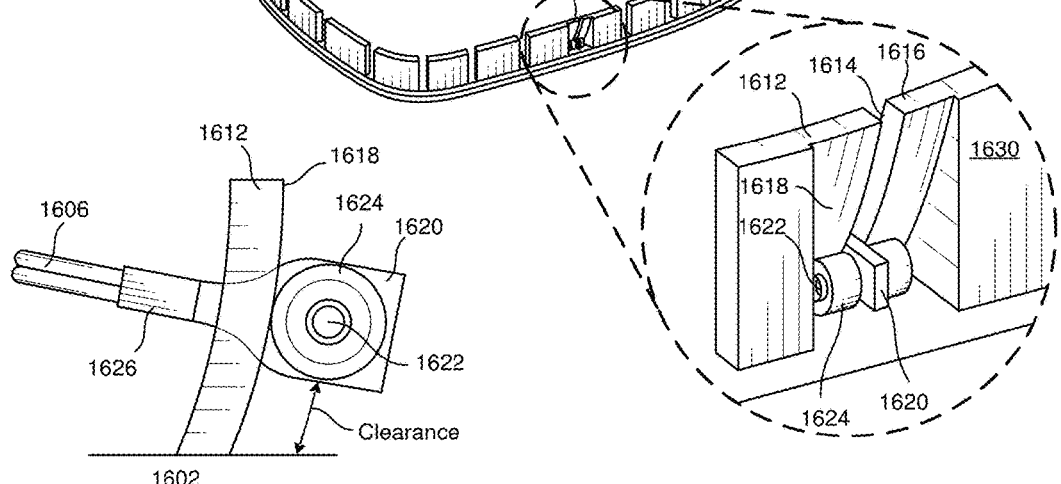
FIG. 16A
FIG. 16B

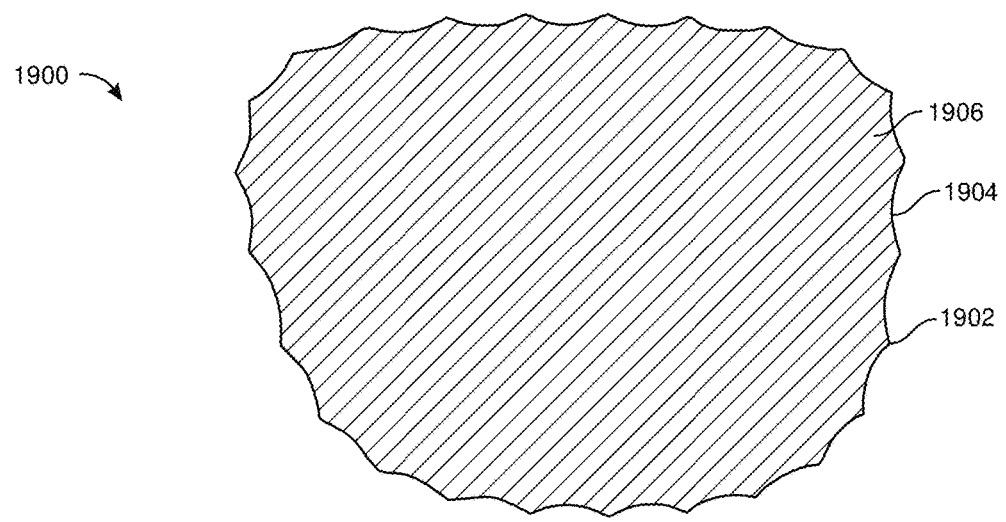
FIG. 19
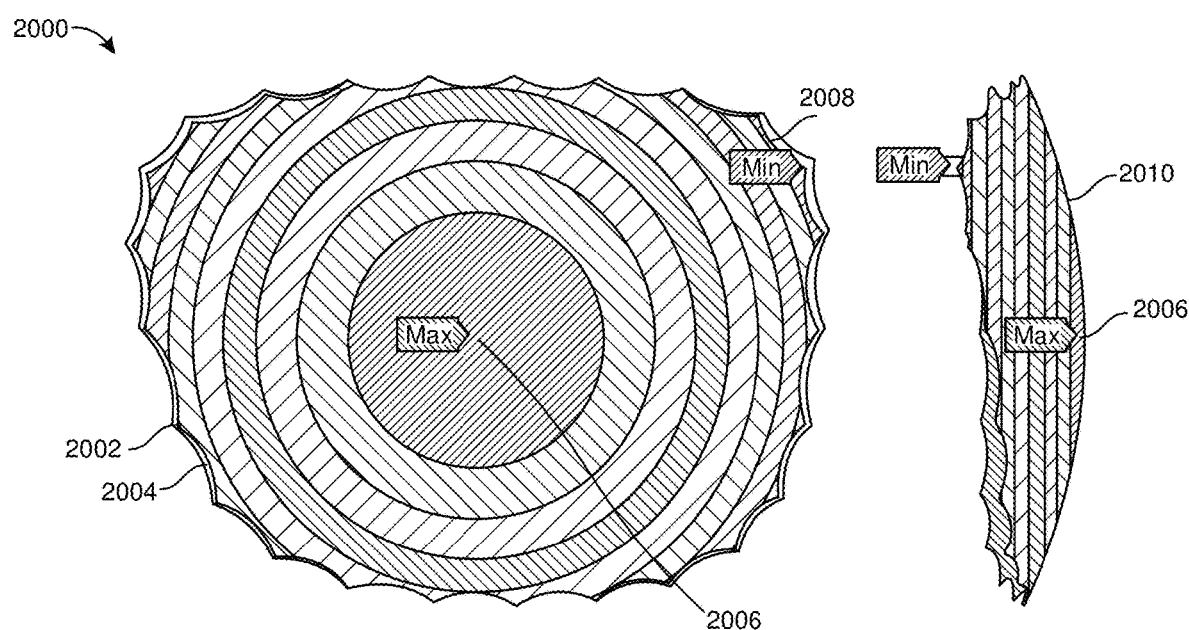
FIG. 20A  FIG. 20B

Optical Quality - 3.5D

|       | Ave NES error | SD NES |
|-------|---------------|--------|
| ZoneA | 0.02          | 0.028  |
| ZoneB | 0.07          | 0.075  |
| ZoneC | 0.2           | 0.067  |
| ZoneD | 0.26          | 0.153  |

|        | Ave cyl error | SD cyl |
|--------|---------------|--------|
| Zone A | -0.09         | 0.027  |
| Zone B | -0.11         | 0.059  |
| Zone C | -0.19         | 0.097  |
| Zone D | -0.41         | 0.323  |

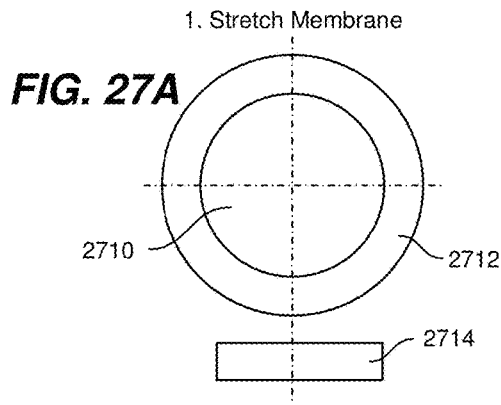
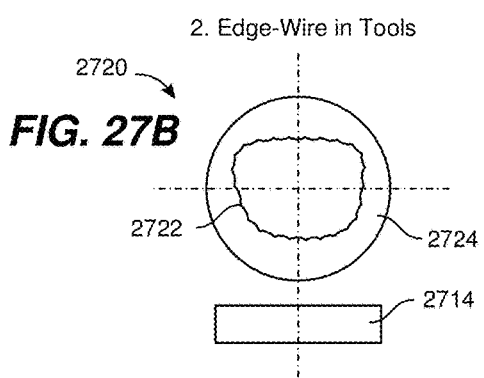
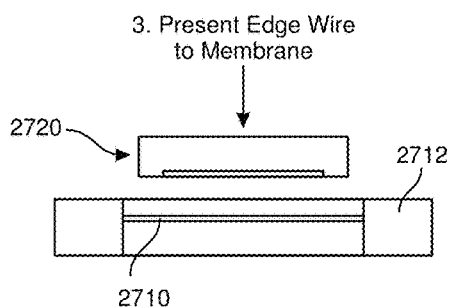
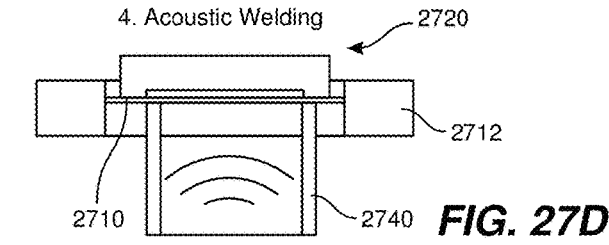
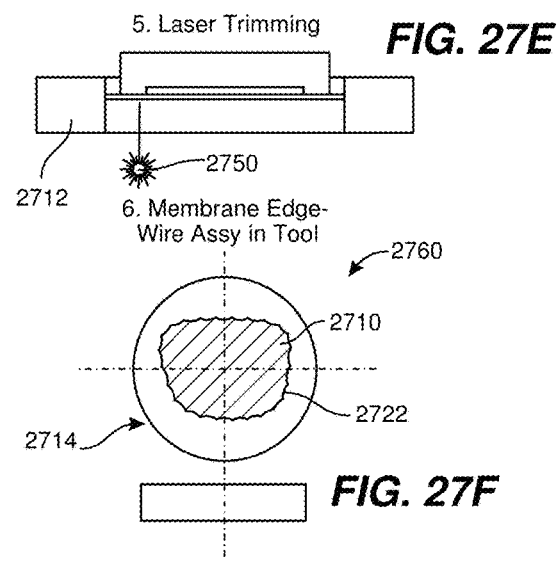
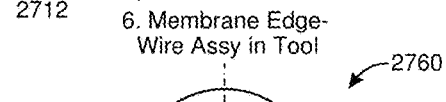
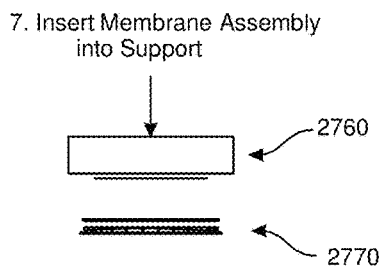
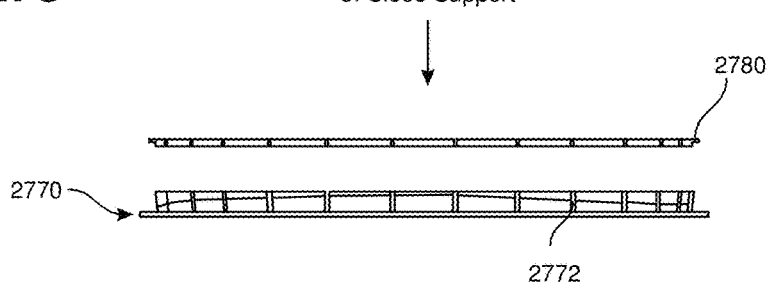

FLUID LENS WITH LOW ENERGY MEMBRANE ADJUSTMENT

CROSS REFERENCE TO RELATED APPLICATION

This application claims the benefit of U.S. Provisional Application No. 62/849,003, filed May 16, 2019, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 9 illustrates actuation of an example membrane assembly, according to some embodiments.

FIGS. 10A-10B illustrate an example guide wire and membrane attachment, according to some embodiments.

FIGS. 15A-15B illustrate an example membrane attachment.

FIGS. 16A-16B illustrate an example membrane attachment and engagement with a support structure.

FIG. 19 illustrates an example membrane assembly with a guide wire.

FIGS. 20A-20B illustrate an example curved membrane profile.

FIGS. 27A-27H illustrate example approaches to assembling a device.

Figure 1A:
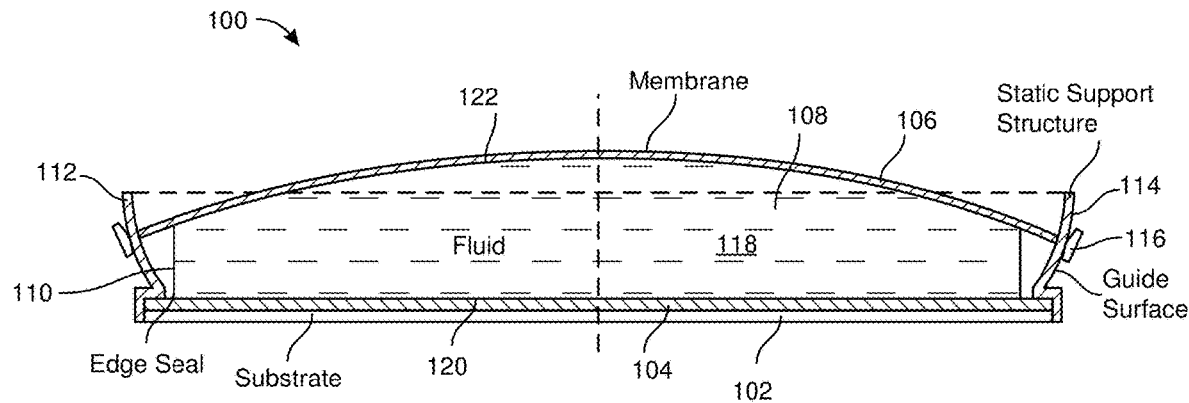
FIGS. 1A-1C illustrate example fluid lenses.

Throughout the drawings and appendices, identical reference characters and descriptions indicate similar, but not necessarily identical, elements. While the exemplary embodiments described herein are susceptible to various modifications and alternative forms, specific embodiments have been shown by way of example in the drawings and appendices and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to fluid lenses, such as adjustable fluid lenses. As will be explained in greater detail below, embodiments of the present disclosure may include adjustable liquid lenses, membranes configured for use in fluid lenses, membrane assemblies that may include a peripheral guide wire, and improved devices using fluid lenses, such as ophthalmic devices. Fluid lenses may include lenses having an elastomeric or otherwise deformable element (such as a membrane), a substrate, and a fluid.

Figure 31:
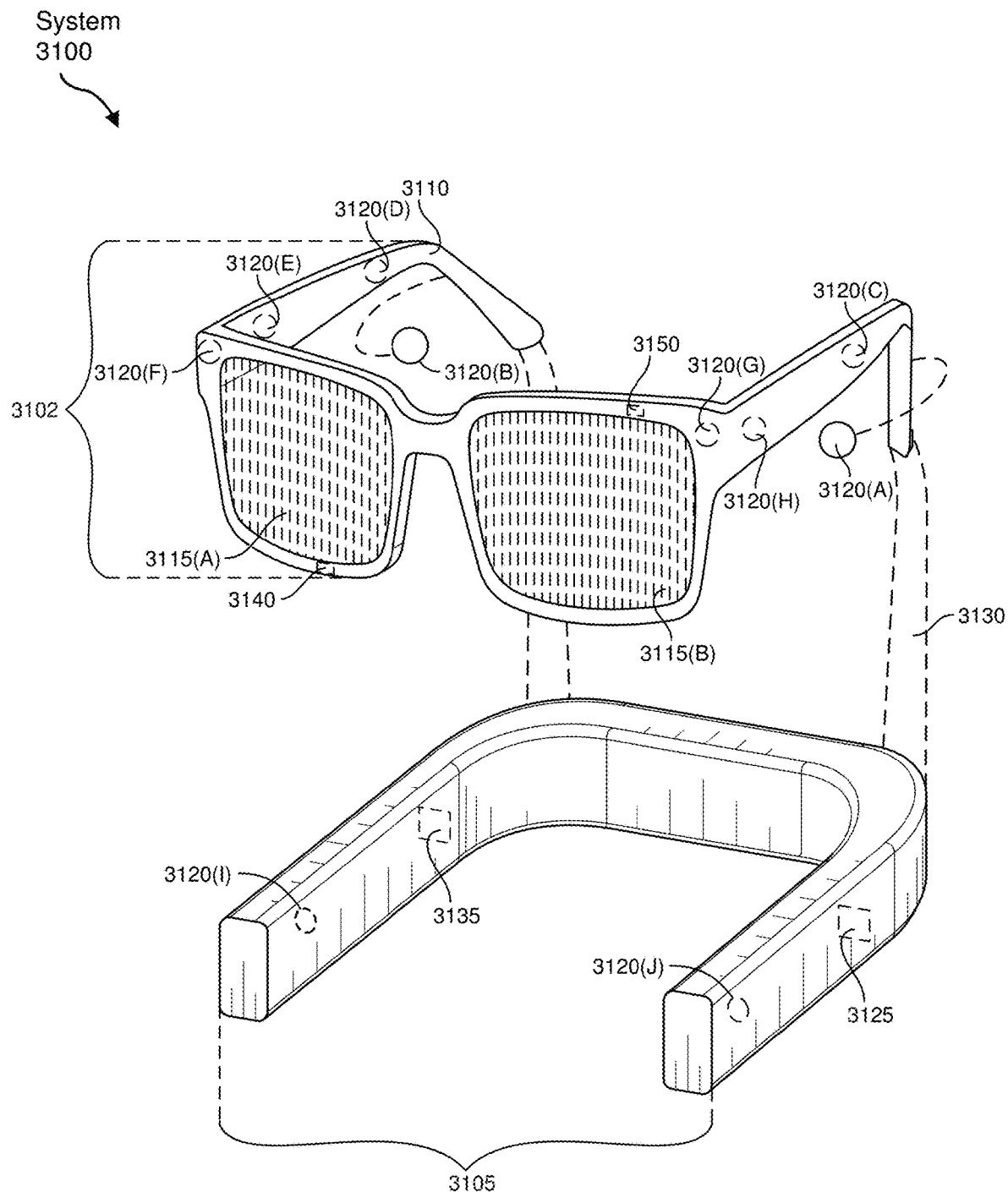
FIG. 31 is an illustration of exemplary augmented-reality glasses that may be used in connection with embodiments of this disclosure.
Figure 32:
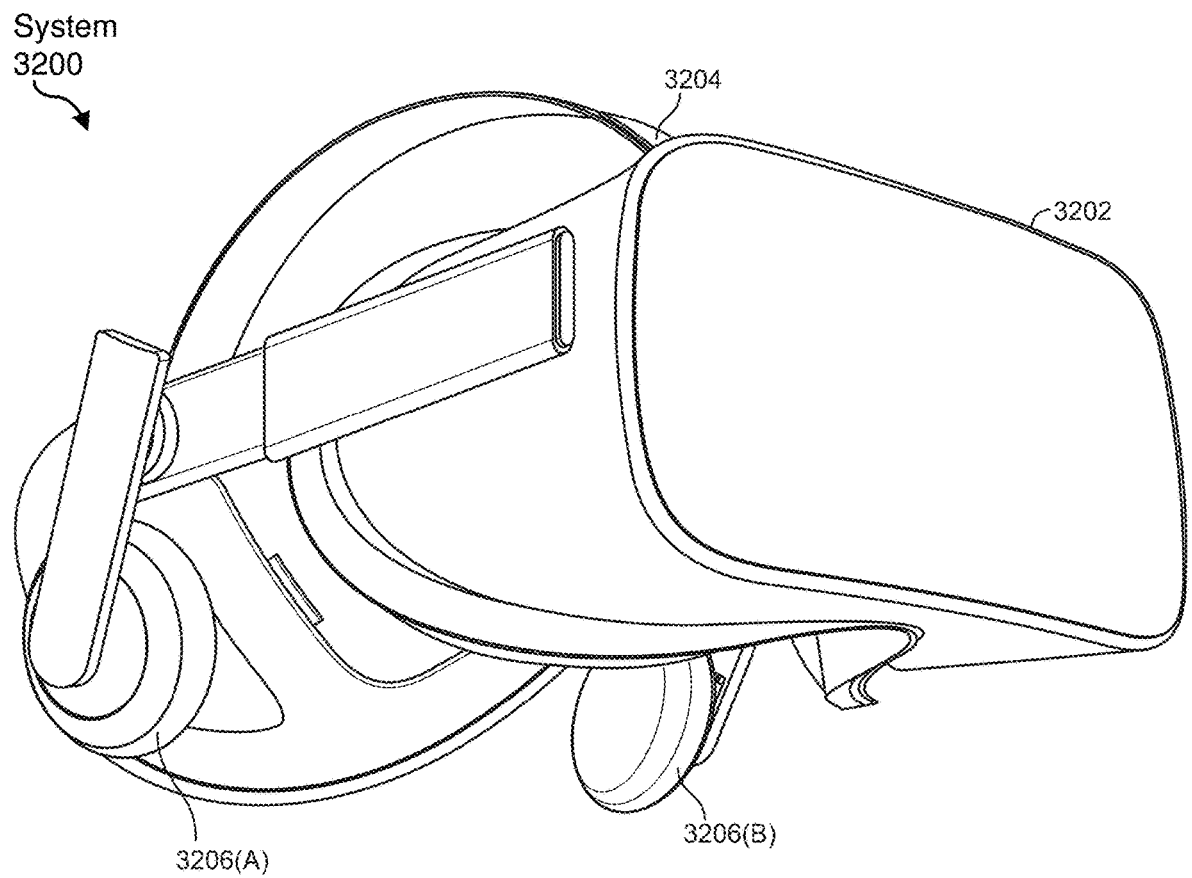
FIG. 32 is an illustration of an exemplary virtual-reality headset that may be used in connection with embodiments of this disclosure.

The following provide, with reference to FIGS. 1-32, detailed descriptions of various examples. FIGS. 1A-2G illustrate example fluid lenses. FIG. 3 illustrates an ophthalmic device that may include one or more fluid lenses. FIGS. 4-8 depict further example fluid lenses. FIGS. 9-17 illustrate, for example, membrane assemblies including a guide wire, and interactions between a membrane attachment and a support structure. FIGS. 18-24 illustrate example elastic forces exerted at membrane control points, and example actuation forces for membrane profile adjustment. FIGS. 25A-26D illustrate guide wire material choices, and the optional inclusion of a spring or resilient material. FIGS. 27A-30 illustrate example approaches to device fabrication. FIGS. 31 and 32 show example augmented reality and virtual reality devices.

An adjustable fluid lens may be configured so that adjustment of the membrane profile may result in no appreciable change in the elastic energy of the membrane. This configuration may be termed a "zero-strain" device configuration, as, in some examples, adjustment of at least one membrane edge portion, such as at least one control point, along a respective guide path does not appreciably change the strain energy of the membrane. In some examples, a "zero-strain"

device configuration may reduce the actuation force required by an order of magnitude when compared with a conventional support beam type configuration. A conventional fluid lens may, for example, require an actuation force that is greater than 1N for an actuation distance of 1 mm. Using a "zero-strain" device configuration, actuation forces may be 0.1N or less for an actuation of 1 mm, for quasi-static actuation. This substantial reduction of actuation forces may enable the use of smaller, more speed-efficient actuators in fluid lenses, resulting in a more compact and efficient form factor. In such examples, in a "zero-strain" device configuration, the membrane may actually be under appreciable strain, but the total strain energy in the membrane may not change appreciably as the lens is adjusted. This may advantageously greatly reduce the force needed to adjust the fluid lens.

In some examples, an adjustable fluid lens (such as a liquid lens) includes a pre-strained flexible membrane that at least partially encloses a fluid volume, a fluid enclosed within the fluid volume, a flexible edge seal that defines a periphery of the fluid volume, and an actuation system configured to control the edge of the membrane such that the optical power of the lens can be modified. In some examples, movement of an edge portion of the membrane, such as a control point, along a guide path provided by a support structure may result in no appreciable change in the elastic energy of the membrane. The membrane profile may be adjusted by movement of a plurality of control points along respective guide paths, and this may result in no appreciable change in the elastic energy of the membrane. The membrane may be an elastic membrane, and the membrane profile may be a curved profile providing a refractive surface of the fluid lens.

FIG. 1A depicts a cross-section through a fluid lens, according to some embodiments. The fluid lens 100 illustrated in this example includes a substrate 102 (which in this example may be a generally rigid, planar substrate), an optional substrate coating 104, a membrane 106, a fluid 108 (denoted by dashed horizontal lines), an edge seal 110, a support structure 112 providing a guide surface 114, and a membrane attachment 116. In this example, the substrate 102 may have a lower (as illustrated) outer surface, and an interior surface on which the substrate coating 104 is supported. The interior surface 120 of the coating 104 may be in contact with the fluid 108. The membrane 106 has an upper (as illustrated) outer surface and an interior surface 122 bounding the fluid 108.

The fluid 108 is enclosed within an enclosure 118, which is at least in part defined by the substrate 102 (along with the coating 104), the membrane 106, and the edge seal 110, which here cooperatively define the enclosure 118 in which the fluid 108 is located. The edge seal 110 may extend around the periphery of the enclosure 118, and retain (in cooperation with the substrate and the membrane) the fluid within the enclosed fluid volume of the enclosure 118. In some examples, an enclosure may be referred to a cavity or lens cavity.

In this example, the membrane 106 has a curved profile, so that the enclosure has a greater thickness in the center of the lens than at the periphery of the enclosure (e.g., adjacent the edge seal 110). In some examples, the fluid lens may be a plano-convex lens, with the planar surface being provided by the substrate 102 and the convex surface being provided by the membrane 106. A plano-convex lens may have a thicker layer of lens fluid around the center of the lens. In some examples, the exterior surface of a membrane may provide the convex surface, with the interior surface being substantially adjacent the lens fluid.

The support structure 112 (which in this example may include a guide slot through which the membrane attachment 116 may extend) may extend around the periphery (or within a peripheral region) of the substrate 102, and may attach the membrane to the substrate. The support structure may provide a guide path, in this example a guide surface 114 along which a membrane attachment 116 (e.g., located within an edge portion of the membrane) may slide. The membrane attachment may provide a control point for the membrane, so that the guide path for the membrane attachment may provide a corresponding guide path for a respective control point.

The lens 100 may include one or more actuators (not shown in FIG. 1A) that may be located around the periphery of the lens and may be part of or mechanically coupled to the support structure 112. The actuators may exert a controllable force on the membrane at one or more control points, such as provided by membrane attachment 116, that may be used to adjust the curvature of the membrane surface and hence at least one optical property of the lens, such as focal length, astigmatism correction, surface curvature, cylindricity, or any other controllable optical property. In some examples, the membrane attachment may be attached to an edge portion of the membrane, or to a peripheral structure extending around the periphery of the membrane (such as a peripheral guide wire, or a guide ring), and may be used to control the curvature of the membrane.

In some examples, FIG. 1A may represent a cross-section through a circular lens, though examples fluid lenses may also include non-circular lenses, as discussed further below.

Figure 1B:
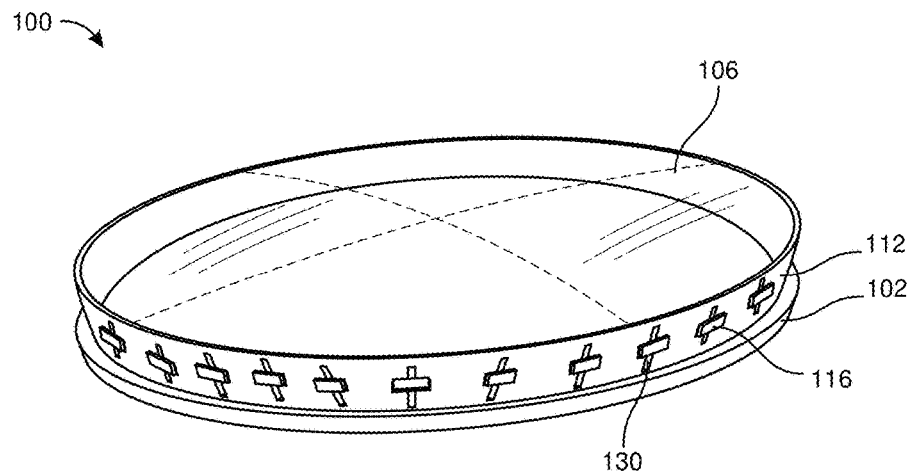

FIG. 1B shows a circular lens, of which FIG. 1A may be a cross-section. The figure shows the lens 100, including the substrate 102, the membrane 106, and the support structure 112. The figure shows the membrane attachment 116 as moveable along a guide path defined by the guide slot 130 and the profile of the guide surface 114 (shown in FIG. 1A). The dashed lines forming a cross are visual guides indicating a general exterior surface profile of the membrane 106. In this example, the membrane profile may correspond to a plano-convex lens.

Figure 1C:
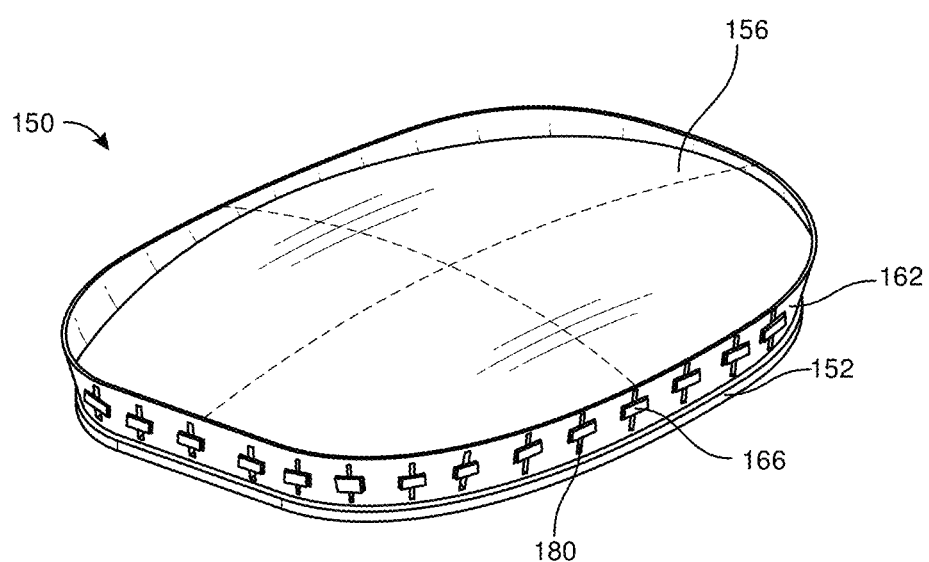

FIG. 1C shows a non-circular lens 150 that may otherwise be similar to the circular lens 100 of FIG. 1B and may have a similar configuration. The non-circular lens 150 includes substrate 152, membrane 156, and support structure 162. The lens has a similar configuration of the membrane attachment 166, movable along a guide path defined by the guide slot 180. The profile of a guide path may be defined by the surface profile of the support structure 162, through which the guide slot is formed. The cross-section of the lens may be analogous to that of FIG. 1A. The dashed lines forming a cross on the membrane 156 are visual guides indicating a general exterior surface profile of the membrane 156. In this example, the membrane profile may correspond to a plano-convex lens.

Figure 2A:
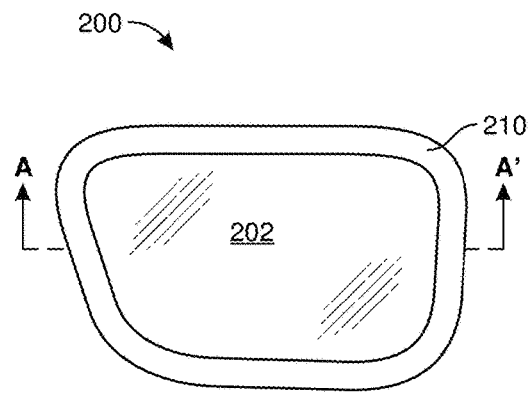
FIGS. 2A-2G illustrate example fluid lenses, and adjustment of the optical power of the fluid lenses, according to some embodiments.

FIGS. 2A-2D illustrate an ophthalmic device 200 including a fluid lens 202, according to some embodiments. FIG. 2A shows a portion of an ophthalmic device 200, which includes a portion of a peripheral structure 210 (that may include a guide wire or a support ring) supporting a fluid lens 202.

In some examples, the lens may be supported by a frame. An ophthalmic device (e.g., spectacles, goggles, eye protectors, visors, and the like) may include a pair of fluid lenses, and the frame may include components configured to support the ophthalmic device on the head of a user, for example, using components that interact with (e.g., rest on) the nose and/or ears of the user.

Figure 2B:
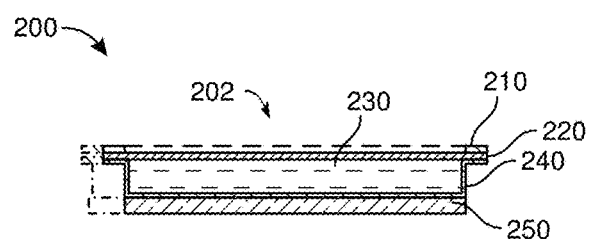
Figure 3:
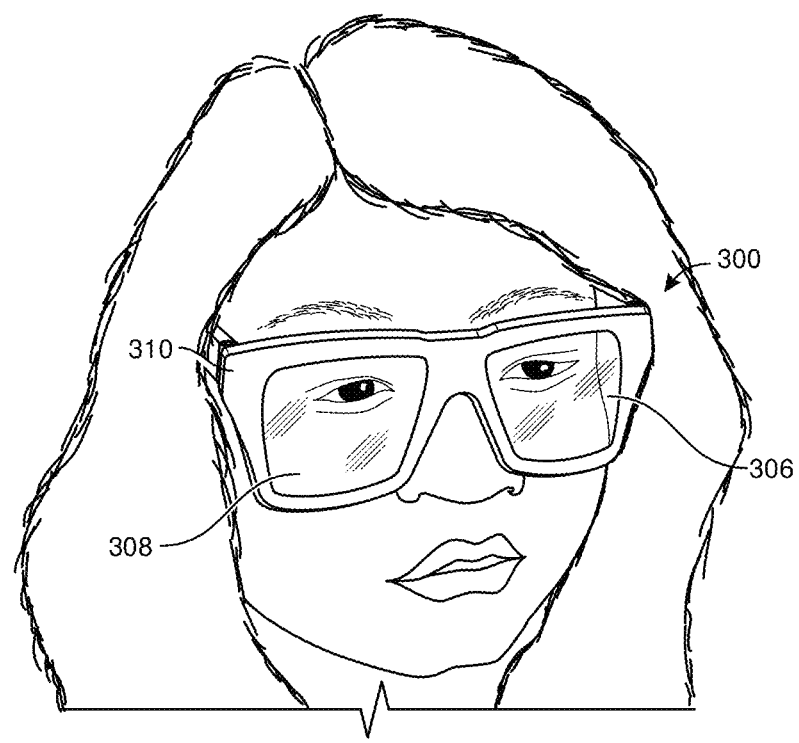
FIG. 3 illustrates an example ophthalmic device.

FIG. 2B shows a cross-section through the device 200, along A-A' as shown in FIG. 2A. The figure shows the peripheral structure 210 and the fluid lens 202. The fluid lens 202 includes a membrane 220, lens fluid 230, an edge seal 240, and a substrate 250. In this example, the substrate 250 includes a generally planar, rigid layer. The figure shows that the fluid lens may have a planar-planar configuration, which in some examples may be adjusted to a plano-concave and/or plano-convex lens configuration.

In some examples disclosed herein, one or both surfaces of the substrate may include a concave or convex surface, and in some examples the substrate may have a non-spherical surface such as a toroidal or freeform optical progressive or digressive surface. In various examples, the substrate may include a plano-concave, plano-convex, biconcave, or biconvex lens, or any other suitable optical element.

Figure 2C:
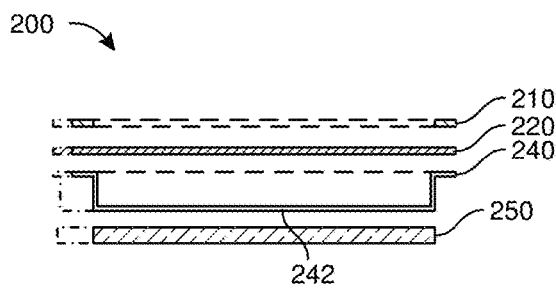

FIG. 2C shows an exploded schematic of the device shown in FIG. 2B, in which corresponding elements have the same numbering as discussed above in relation to FIG. 2A. In this example, the edge seal is joined with a central seal portion 242 extending over the substrate 250.

In some examples, the central seal portion 242 and the edge seal 240 may be a unitary element. In other examples, the edge seal may be a separate element, and the central seal portion 242 may be omitted or replaced by a coating formed on the substrate. In some examples, a coating may be deposited on the interior surface of the seal portion and/or edge seal. In some examples, the lens fluid may be enclosed in a flexible enclosure (sometimes referred to as a bag) that may include an edge seal, a membrane, and a central seal portion. In some examples, the central seal portion may be adhered to a rigid substrate component and may be considered as part of the substrate.

Figure 2D:
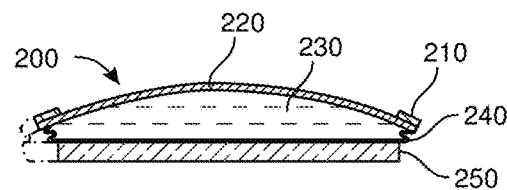

FIG. 2D shows adjustment of the device configuration, for example, by adjustment of forces on the membrane using actuators (not shown). As shown, the device may be configured in a planar-convex fluid lens configuration. In an example plano-convex lens configuration, the membrane 220 tends to extend away from the substrate 250 in a central portion.

In some examples, the lens may also be configured in a planar-concave configuration, in which the membrane tends to curve inwardly towards the substrate in a central portion.

Figure 2E:
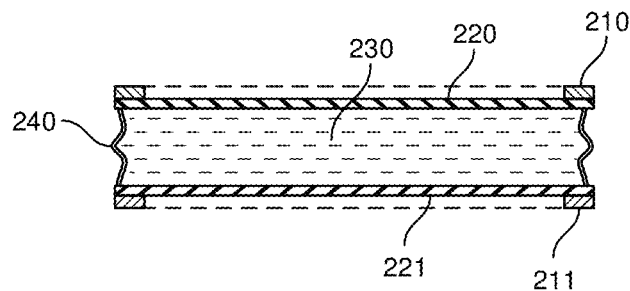

FIG. 2E illustrates a similar device to FIG. 2B, and element numbering is similar. However, in this example, the substrate 250 of the example of FIG. 2B is replaced by a second membrane 221, and there is a second peripheral structure (such as a second support ring) 211. In some examples disclosed herein, the membrane 220 and/or the second membrane 221 may be integrated with the edge seal 240.

Figure 2F:
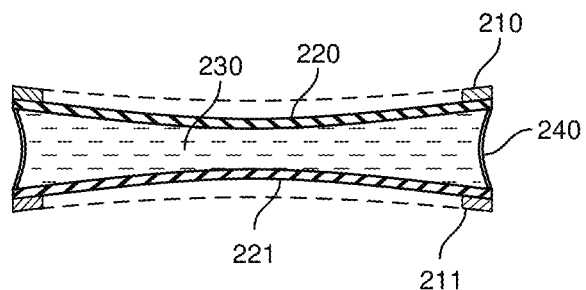

FIG. 2F shows the dual membrane fluid lens of FIG. 2E in a biconcave configuration. For example, application of negative pressure to the lens fluid 230 may be used to induce the biconcave configuration. In some examples, the membrane 220 and second membrane 221 may have similar properties, and the lens configuration may be generally symmetrical, for example, with the membrane and second membrane having similar radii of curvature (e.g., as a symmetric biconvex or biconcave lens). In some examples, the lens may have rotational symmetry about the optical axis of the lens, at least within a central portion of the membrane, or within a circular lens. In some examples, the properties of the two membranes may differ (e.g., in one or more of thickness, composition, membrane tension, or in any other relevant membrane parameter), and/or the radii of curvature may differ.

Figure 2G:
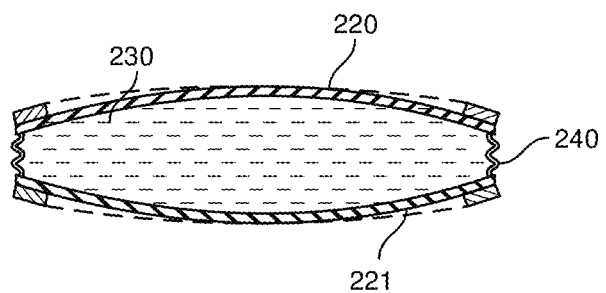

FIG. 2G shows the dual membrane fluid lens of FIG. 2E in a biconvex configuration, with corresponding element numbers.

In some examples, an ophthalmic device, such as an eyewear device, includes one or more fluid lenses. An example device includes at least one fluid lens supported by eyeglass frames. In some examples, an ophthalmic device may include an eyeglass frame, goggles, or any other frame or head-mounted structure to support one or more fluid lenses, such as a pair of fluid lenses.

FIG. 3 illustrates an ophthalmic device including a pair of fluid lenses, according to some embodiments. The example eyewear device 300 may include a pair of fluid lenses, 306 and 308, supported by an eyeglass frame 310 (that may also be referred to as a "frame" for conciseness). The pair of fluid lenses 306 and 308 may be referred to as left and right lenses, respectively (from the viewpoint of the user).

In some examples, an eyewear device (such as eyewear device 300 in FIG. 3) may include a pair of eyeglasses, a pair of smart glasses, an augmented reality device, a virtual reality headset, or the like.

In some examples, the frame 310 may include one or more of any of the following: a battery, a power supply or power supply connection, other refractive lenses (including additional fluid lenses), diffractive elements, displays, eye-tracking components and systems, motion tracking devices, gyroscopes, computing elements, health monitoring devices, cameras, and/or audio recording and/or playback devices (such as microphones and speakers).

Figure 4A:
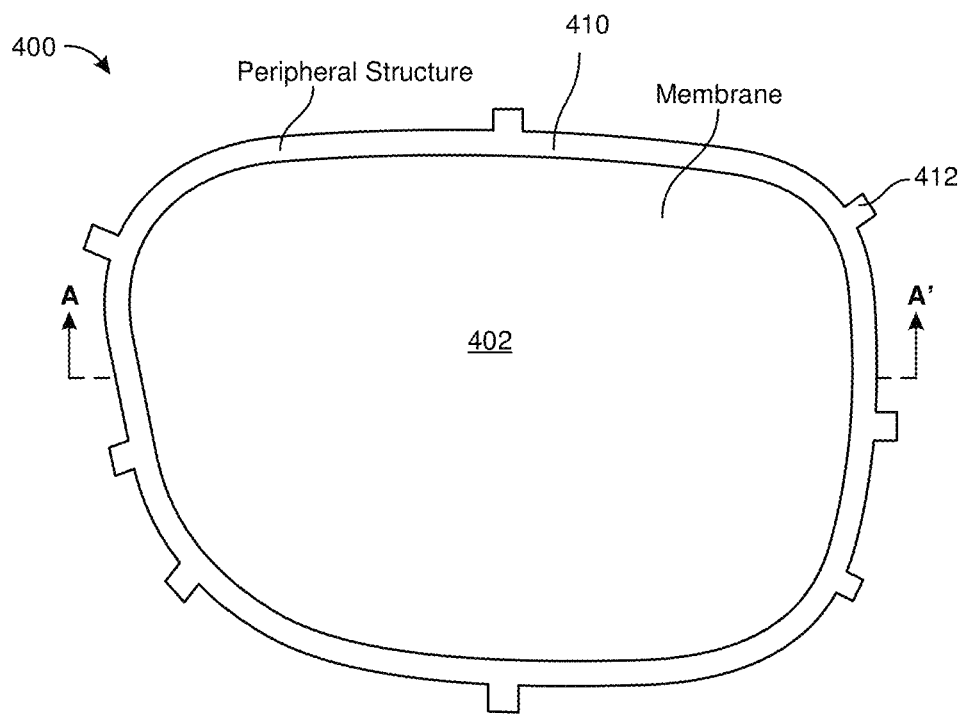
FIGS. 4A-4B illustrate a fluid lens having a membrane assembly including a peripheral structure.

FIG. 4A shows an example fluid lens 400 including a peripheral structure 410 that may generally surround a fluid lens 402. The peripheral structure 410 (in this example, a support ring) includes membrane attachments 412 that may correspond to the locations of control points for the membrane of the fluid lens 402. A membrane attachment may be an actuation point, where the lens may be actuated by displacement (e.g., by an actuator acting along the z-axis) or moved around a hinge point (e.g., where the position of the membrane attachment may be an approximately fixed distance "z" from the substrate). In some examples, the peripheral structure and hence the boundary of the membrane may flex freely between neighboring control points. Hinge points may be used in some embodiments to prevent bending of the peripheral structure (e.g., a support ring) into energetically favorable, but undesirable, shapes.

A rigid peripheral structure, such as a rigid support ring, may limit adjustment of the control points of the membrane. In some examples, such as a non-circular lens, a deformable or flexible peripheral structure, such as a guide wire or a flexible support ring, may be used.

Figure 4B:
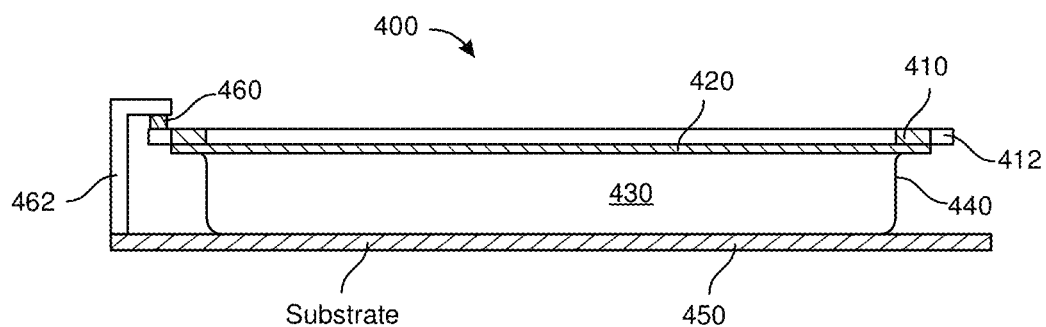

FIG. 4B shows a cross-section of the example fluid lens 400 (e.g., along A-A' as denoted in FIG. 4A). The fluid lens includes a membrane 420, fluid 430, edge seal 440, and substrate 450. In some examples, the peripheral structure 410 may surround and be attached to the membrane 420 of the fluid lens 402. The peripheral structure may include membrane attachments 412 that may provide the control points for the membrane. The position of the membrane attachments (e.g., relative to a frame, substrate, or each other) may be adjusted using one or more actuators, and used to adjust, for example, the optical power of the lens. An actuator may include one or more piezoelectric layers sandwiched by electrode layers. A membrane attachment having a position adjusted by an actuator may also be referred to as an actuation point, or a control point.

In some examples, an actuator 460 may be attached to actuator support 462, and the actuator be used to vary the distance between the membrane attachment and the substrate, for example, by urging the membrane attachment along an associated guide path. In some examples, the actuator may be located on the opposite side of the membrane attachment from the substrate.

In some examples, one or more actuators may be attached to respective actuator supports. In some examples, an actuator support may be attached to one or more actuators. For example, an actuator support may include an arcuate, circular, or other shaped member along which actuators are located at intervals. Actuator supports may be attached to the substrate, or, in some examples, to another device component such as a frame. In some examples, the actuator may be located between the membrane attachment and the substrate, or may be located at another suitable location. In some examples, the force exerted by the actuator may be generally directed along a direction normal to the substrate, or along another direction, such as along a direction at a non-normal direction relative to the substrate. In some examples, at least a component of the force may be generally parallel to the substrate. The path of the membrane attachment may be based on the guide path, and in some examples the force applied by the actuator may have at least an appreciable component directed along the guide path.

Figure 5:
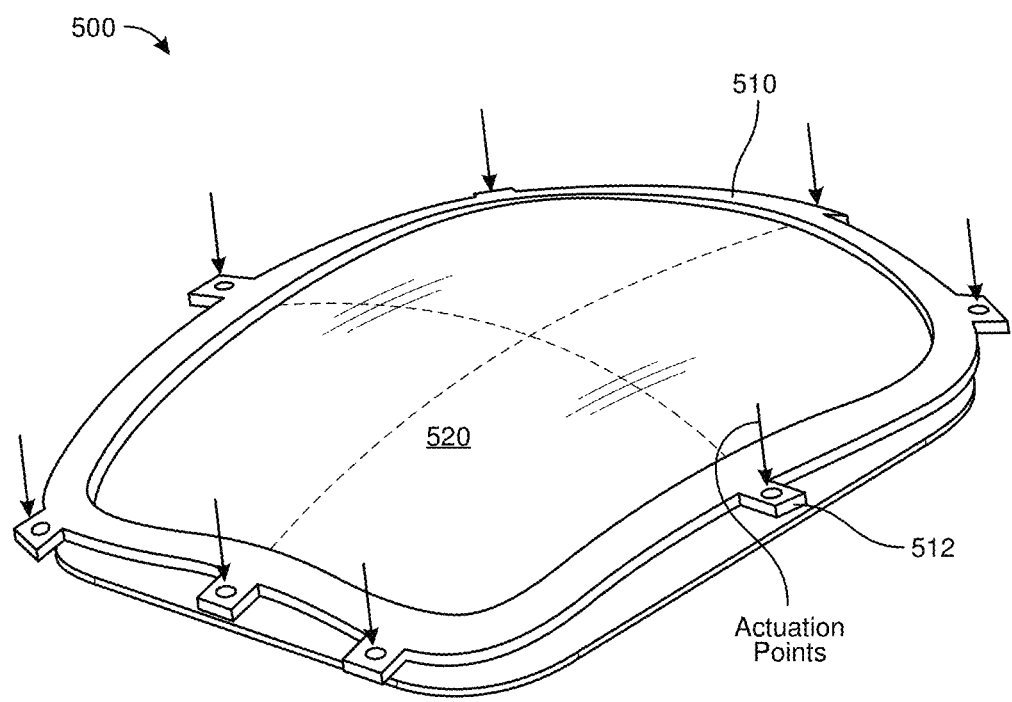
FIG. 5 illustrates deformation of a non-circular fluid lens.

FIG. 5 shows an example fluid lens 500 including a peripheral structure 510, here in the form of the support ring including a plurality of membrane attachments 512, and extending around the periphery of a membrane 520. The membrane attachments may include or interact with one or more support structures that each provide a guide path for an associated control point of the membrane 520. Actuation of the fluid lens may adjust the location of one or more control points of the membrane, for example, along the guide paths provided by the support structures. Actuation may be applied at discrete points on the peripheral structure, for example, the membrane attachments shown. In some examples, the peripheral structure may be flexible, for example, so that the peripheral structure may not be constrained to lie within a single plane.

In some examples, a fluid lens includes a membrane, a support structure, a substrate, and an edge seal. The support structure may be configured to provide a guide path for an edge portion of the membrane (such as a control point provided by a membrane attachment). An example membrane attachment may function as an interface device, configured to mechanically interconnect the membrane and the support structure, and may allow the membrane to exert an elastic force on the support structure. A membrane attachment may be configured to allow the control point of the membrane (that may be located in an edge portion of the membrane) to move freely along the guide path.

In some examples, a fluid lens may be configured to have one or both of the following features: in some examples, the strain energy in the membrane is approximately equal for all actuation states; and in some examples, the force reaction at membrane edge is normal to the guide path. Hence, in some examples, the strain energy of the membrane may be approximately independent of the optical power of the lens. In some examples, the force reaction at the membrane edge is normal to the guide path, for some or all locations on the guide path.

In some examples, movement of the edge portion of the membrane along the guide path may not result in an appreciable change in the elastic energy of the membrane. This configuration may be termed a "zero-strain" guide path, as, in some examples, adjustment of the membrane edge portion along the guide path does not appreciably change the strain energy of the membrane.

Example embodiments described in the present disclosure include apparatuses, systems, and methods related to fluid lenses (such as adjustable fluid-filled lenses), including fluid lenses configured to reduce or effectively eliminate the energy required to actuate a fluid lens with a pre-strained flexible membrane.

The boundary conditions of the membrane may be configured such that the change in strain energy in the membrane between all optical powers of the lens is zero or close to zero. Also, the boundary conditions of the membrane may be configured such that the reaction force is parallel or approximately parallel to the slope of the membrane at the periphery of the membrane, in some examples for all optical powers of the lens.

Example lenses may be configured so that the membrane is in a stable equilibrium state for all optical powers of the lens. Actuation may be required to change the lens configuration, but a lens may be configured so that no external force is required to hold the lens in a selected configuration (such as a selected optical power). In some examples, a lens may be configured so that relatively little or effectively zero energy is required to overcome strain energy in the membrane. In some examples, the energy required to adjust the lens may include that required to overcome friction, hysteresis, viscosity, and dynamic effects, so that greatly reduced or relatively negligible energy is required to adjust the lens from one optical power to another.

The boundary conditions may be configured to create a force bias such that the lens tends to move towards a specific configuration; for example, towards a predetermined optical power within a range of optical powers. This may be used to counteract friction forces or membrane support structure stiffness.

For some applications of adjustable fluid lenses, it may be advantageous to reduce both the energy required for actuation, and the packaging dimensions of the actuation system. Controlling the edge of the membrane may require energy to deform the membrane and/or energy to deform the membrane peripheral structure (such as a flexible support ring or guide wire, e.g., in the example of a non-round lens). These energy requirements may limit the technology choices for actuation and the extent to which the energy supply and the actuator packaging can be reduced. It would be advantageous to reduce or substantially eliminate these energy requirements. Advantages of the approaches described in the present disclosure may include one or more of the following: reduced size actuators, inconspicuous actuators, reduced weight, reduced power requirements, increased battery life, reducing or eliminating the need for external power supplies, and the like. Many of these aspects are particularly advantageous in the case of ophthalmic applications such as glasses or goggles, or for any application related to human use, such as augmented reality or virtual reality systems.

In some examples, a fluid lens configuration may be configured to reduce the energy required to change the power of the lens to an arbitrarily low value. This may enable the use of low-power actuation technologies that would not be otherwise feasible for use with a conventional fluid lens of similar optical properties and/or enable a reduction in size of the actuator and any energy storage device used.

In some examples, a device includes a membrane, a support structure configured to provide a guide path for an edge portion of the membrane, and a membrane attachment which allows a mechanical interaction between the membrane and an actuator and/or a support structure. A device may also include a peripheral structure disposed around the periphery of the membrane, and at least one membrane attachment may be configured to allow a mechanical connection between the membrane and the support structure, which may allow the membrane to move freely along the guide path. A device may also include a substrate and an edge seal. In some examples, the support structure may be rigid, or semi-rigid, and may be attached to the substrate.

In some examples, an adjustable fluid-filled lens includes a membrane assembly. A membrane assembly may include a membrane (e.g., having a line tension) and a peripheral structure (such as a guide wire, support ring, or any other suitable structure extending around the membrane). A fluid lens may include a membrane assembly, a substrate, and an edge seal. The membrane line tension (an elastic force) may be supported, at least in part, by a peripheral structure such as a guide wire or a support ring. The retention of the elastic force by a peripheral structure, and support structures, may be augmented by at least one static restraint and/or hinge point, for example, at one or more locations on the peripheral structure.

In some examples, a fluid lens includes a membrane, a support structure configured to provide a guide path for an edge portion of the membrane, and a substrate. An example fluid lens may further include a membrane attachment (which may also be termed an interface device) configured to connect the membrane to the support structure and to allow the edge portion of the membrane, such as a control point of the membrane, to move freely along the guide path. A device may include a substrate and an edge seal. In some examples, a fluid lens may include an elastomeric or otherwise deformable element (such as an elastic membrane), a substrate, and a fluid. In some examples, movement of a control point of the membrane (as determined, for example, by the movement of a membrane attachment along a guide path) may be used to adjust the optical properties of a fluid lens.

In some examples, a fluid lens, such as an adjustable fluid-filled lens, includes a pre-strained flexible membrane that at least partially encloses a fluid volume, a fluid enclosed within the fluid volume, a flexible edge seal that may define a periphery of the fluid volume, and an actuation system configured to control the location of an edge of the membrane (e.g., a control point provided by a membrane attachment) such that the optical power of the lens may be modified. The fluid volume may be retained in an enclosure formed at least in part by the membrane, substrate, and the edge seal.

Controlling the edge of the membrane may require energy to deform the membrane and/or energy to deform a peripheral structure such as a support ring or a peripheral guide wire (e.g., in the case of a non-round lens). In some examples, a fluid lens configuration may be configured to reduce the energy required to change the power of the lens to a low value, for example, such that the change in elastic energy stored in the membrane as the lens properties change may be less than the energy required to overcome, for example, frictional forces.

In some examples, an adjustable focus fluid lens includes a substrate and a membrane (e.g., an elastic membrane), where a lens fluid is retained between the membrane and the substrate. The membrane may be under tension, and a mechanical system for applying or retaining the tension in the membrane at sections may be provided along the membrane edge or at portions thereof. The mechanical system may allow the position of the sections to be controllably changed in both height and radial distance. In this context, height may refer to a distance from the substrate, along a direction normal to the local substrate surface. In some examples, height may refer to the distance from a plane extending through the optical center of the lens and perpendicular to the optic axis. Radial distance may refer to a distance from a center of the lens, in some examples, a distance from the optical axis along a direction normal to the optical axis. In some examples, changing the height of at least one of the sections restraining the membrane may cause a change in the membrane's curvature, and the radial distance of the restraint may be changed to reduce increases in the membrane tension.

In some examples, a mechanical system may include a sliding mechanism, a rolling mechanism, a flexure mechanism, an active mechanical system, or a combination thereof. In some examples, a mechanical system may include one or more actuators, and the one or more actuators may be configured to control both (or either of) the height and/or radial distance of one or more of the sections.

An adjustable focus fluid lens may include a substrate, a membrane that is in tension, a fluid, and a peripheral structure restraining the membrane tension, where the peripheral structure extends around a periphery of the membrane, and where, in some examples, the length of the peripheral structure and/or the spatial configuration of the peripheral structure may be controlled. In some examples, the peripheral structure may include an elastic element, allowing the perimeter distance (e.g., circumference) of the membrane to be adjusted, for example, using the membrane attachments. Controlling the circumference of the membrane may controllably maintain the membrane tension when the optical power of the fluid lens is changed.

Changing the optical power of the lens from a first power to a second power may cause a change in membrane tension if the membrane perimeter distance (e.g., circumference) is not changed. However, allowing the membrane perimeter distance (e.g., the distance around the periphery of the membrane) to change may allow the membrane tension to remain substantially unchanged, or be changed by a substantially reduced amount, such as less than a relative magnitude change of 1%, 2%, 5%, or 10%. In some examples, a load offset or a negative spring force may be applied to the actuator. In some examples, changes in the membrane tension may remain within at least one of these percentage limits as the fluid lens is adjusted.

A fluid lens may include strain energy, for example, within the elastic membrane. For example, an elastic membrane may have elastic energy (such as strain energy) when the membrane is stretched. In some configurations, work done by an external force, such as provided by an actuator when adjusting the membrane, may increase the strain energy stored within the membrane. However, in some examples, one or more membrane attachments, which may be located within edge portions of the membrane, may be adjusted along a guide path such that the elastic strain energy stored within the membrane may not appreciably change.

A force, such as a force provided by an actuator, may perform work when there is a displacement of the point of application in the direction of the force. In some examples, a fluid lens is configured so that there is no appreciable elastic force in the direction of the guide path. In such configurations, a displacement of the edge portion of the membrane along the guide path does not require work in relation to the elastic force. There may, however, be work required to overcome friction and other relatively minor effects.

In some examples, a fluid lens includes a peripheral structure. A peripheral structure may include a member, such as a support ring or guide wire, affixed to a perimeter of an elastic membrane of a fluid-filled lens. The peripheral structure may be approximately the same shape as the lens. For a circular lens, the peripheral structure may be generally circular. For non-circular lenses, the peripheral structure may bend normally to the plane defined by the membrane for spherical optics. However, a rigid peripheral structure may impose restrictions on the positional adjustment of control points, and in some examples a flexible peripheral structure such as a guide wire may be positioned around the periphery of the membrane, and locations of control points on the flexible peripheral structure may be controlled. Membrane attachments may be attached to the peripheral structure, such as attached to a support ring or guide wire, and movement of the membrane attachments along a guide path may be used to adjust the membrane profile and at least one optical property of the lens, such as focal length. In some examples, one or more actuators may be used to control the surface profile of the membrane, for example, by adjusting a line tension within the membrane, or by moving one or more membrane attachments along a guide path. The membrane may be a distensible membrane, such as an elastic membrane.

In some examples, a membrane may have one or more control points, which may include locations within an edge portion of a membrane (arranged, for example, around a periphery of a membrane) that may be moved. For example, a fluid lens may include a membrane and one or more membrane attachments, that may provide actuation points for the membrane. In some examples, a membrane attachment may move along a guide path in response to elastic forces, and not be an actuation point, and in some examples one or more membrane attachments may be hingedly or pivotally attached to a support structure. In some examples, an actuator may be configured to move at least one control point along a respective guide path to adjust the optical properties of the fluid lens. Control points may be provided by membrane attachments, which may be mechanical components attached to the membrane on which an actuator may exert an actuation force. The actuation force may be used to move the membrane attachment along a guide path, where the guide path is determined by the configuration of a support structure. An example support structure may be attached to the substrate and provide, for example, a surface, slot, groove, or any other suitable mechanical configuration that restricts motion of the membrane attachment to a predetermined guide path.

Figure 6A:
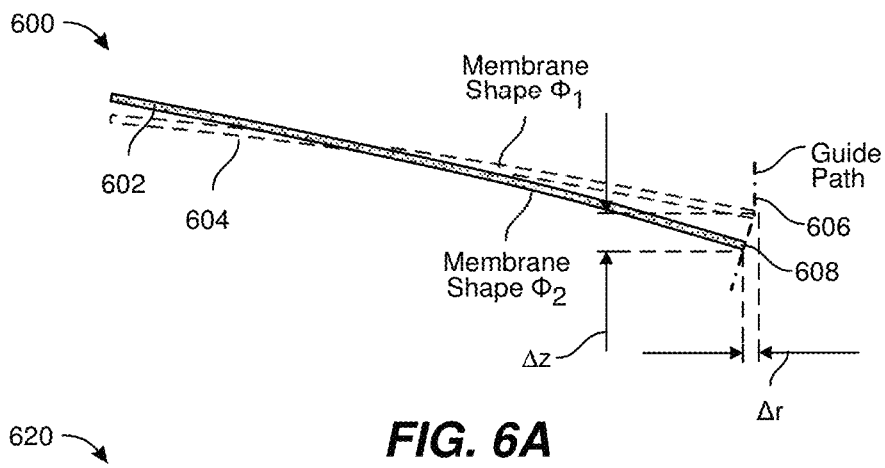
FIGS. 6A-6B illustrates changes in a membrane profile of an example fluid lens, for example, using support structures that provide guide paths, according to some embodiments.

FIG. 6A shows a simplified schematic of an example fluid lens 600, including at least one support structure (not shown) that provides a guide path 606 (in this example, a sliding guide path). FIG. 6A shows a membrane having first and second shapes 602 (denoted by solid lines) and 604 (dashed lines), respectively. The membrane shape may also be referred to as a membrane profile. The membrane may be adjusted between the first and second profiles by moving an edge portion of the membrane 608 along the guide path 606. The guide path may be configured so that, as the edge portion of the membrane 608 is moved downwards (e.g., towards the substrate) a distance $\Delta z$, the edge portion of the membrane moves inwards, towards the optical center of the lens, by a distance $\Delta r$. In some examples, the guide path may have a generally curved form in which the edge portion of the membrane may move inwardly towards the optical center, as the edge portion moves towards the substrate (or, as the curvature of the membrane increases).

Figure 6B:
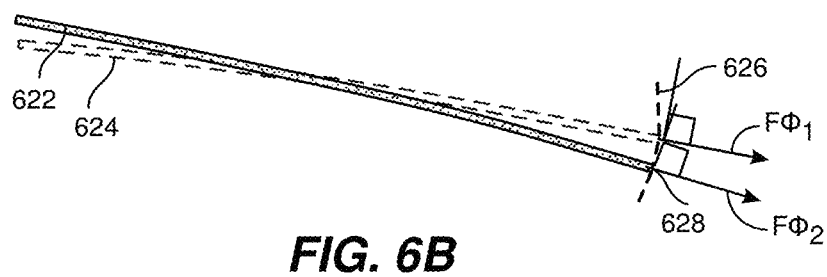

FIG. 6B shows a simplified schematic of an example fluid lens 620, including at least one support structure (not show) that provides a guide path 626. FIG. 6A shows a membrane having first and second shapes 622 (solid lines) and 624 (dashed lines), respectively. The membrane may be adjusted between the first and second shapes by moving an edge portion of the membrane 628 along the guide path 606. The guide path may be configured so the elastic force exerted by the edge portion of the membrane remains normal to the guide path as the edge portion moves along the guide path. In both FIGS. 6A and 6B, the edge portion may correspond to a membrane attachment that is attached to a periphery of the membrane.

The example guide path shown in FIGS. 6A and 6B (and also shown in FIG. 7 below) may be configured so that the strain energy in the membrane is approximately equal for all or most actuation states (e.g., for all or most locations of the membrane attachment along the guide path). Example guide paths may also (or alternatively) be configured so that the force reaction at the membrane edge is normal to the guide path at the location of the control points along the guide path. The elastic force exerted by the membrane on the membrane attachment may be directed in a direction approximately normal to the guide path, at the respective location of the membrane attachment along the guide path.

The figure illustrates guide paths in terms of a parameter $\Delta z$, or "z-displacement" (corresponding to what may be termed a vertical displacement, axial displacement, or height above the substrate) and a parameter $\Delta r$, or "r-displacement", corresponding to what may be termed a radial displacement from the optic axis (that may be determined in a direction normal to the optic axis). The figure illustrates a curved guide path that may be provided by the support structure, which may be used as a guiding device. The radial displacement may be normal to the axial displacement, and the axial displacement may be parallel to the optical axis, in a fluid lens application.

The z-displacement (axial displacement) may be dependent on the frame shape and/or on the edge seal conditions. The r-displacement (radial displacement) may be determined such that the strain energy in the system is at least approximately equal, such as effectively identical, for all states. In this context, a "state" may correspond to an optical property of a fluid lens, such as a focal length, that may be obtained using locations of the membrane control points along a respective guide path.

The fluid lens, in particular the guide path, may be configured so that the angle between the reaction force F between the edge of the membrane and the guiding surface, and the local normal to the guide path provided by the guiding surface, may be approximately zero degrees or a low angle (e.g., less than 5 degrees, and in some examples less than 1 degree).

Typical values of z and r for an approximately one-inch radius round lens are shown below in Table 1.

TABLE 1

| Φ Diopters | Δr mm | Δz Mm |
|---|---|---|
| 0.5 | −0.0016 | −0.0224 |
| 2 | −0.0251 | −0.4491 |
| 3.5 | −0.0770 | −0.8746 |

A similar approach may be used for a non-circular lens. The guide path, which may define a trajectory for a control point of the membrane during lens adjustment, may be calculated for every point on the membrane perimeter in a plane which passes through the optical center of the lens.

Figure 7:
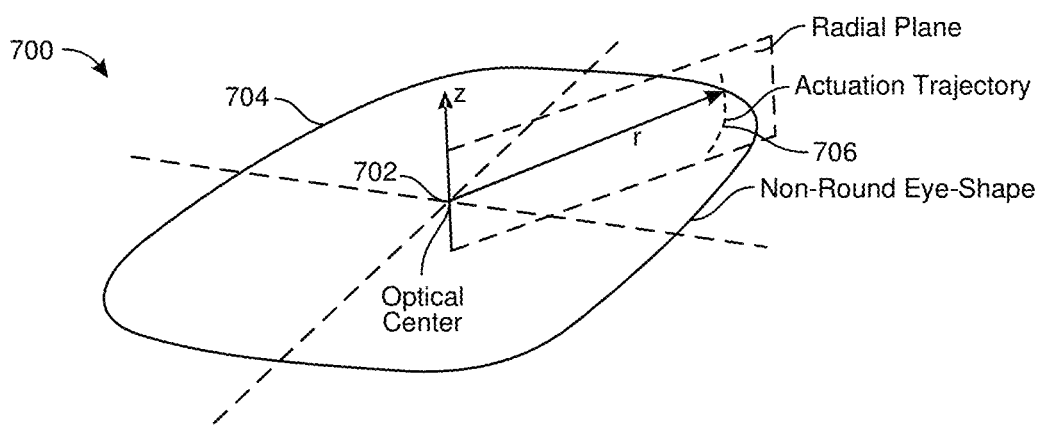
FIG. 7 illustrates an example non-circular fluid lens, including an example guide path, according to some embodiments.

FIG. 7 illustrates an example non-circular fluid lens 700, having an optical center 702, non-circular periphery 704, and an example guide path 706. The guide path may describe the actuation trajectory, for example, of a membrane attachment. The illustrated lens has an optical center 702 through which an optical axis passes, which may be used as the z-axis and may be referred to as the vertical direction or axial direction. The term "vertical" used here is arbitrary and not intended to place any limitation on the lens orientation.

An example of "zero-strain" guide path for a control point (e.g., a trajectory allowing appreciable reduction or substantial elimination of elastic energy change in the membrane during lens adjustment), for a non-round lens, is shown below in Table 2.

TABLE 2

| Φ Diopters | Δr Mm | Δz mm |
|---|---|---|
| 0.5 | −0.0031 | −0.2443 |
| 2 | −0.0499 | −0.9802 |
| 3.5 | −0.1558 | −1.7278 |

Figure 8:
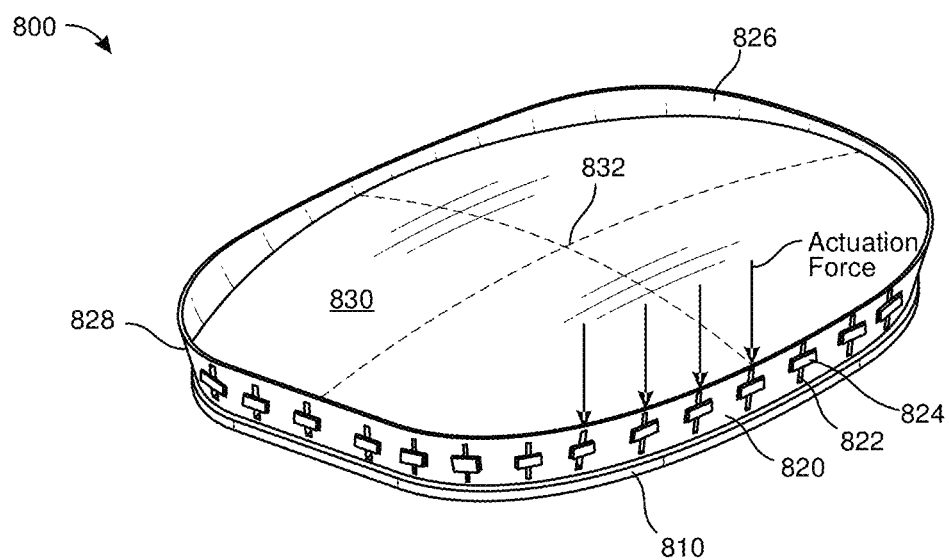
FIG. 8 illustrates an example non-circular fluid lens, including application of actuation forces, according to some embodiments.

FIG. 8 illustrates an example non-circular fluid lens 800, including a substrate 810, a support structure 820 having guide slots 822 formed therein, a membrane 830, and membrane attachments 824 that extend through the guide slots 822. The figure shows application of actuation forces (as generally downwards arrows, but forces may also be directed generally upwards, as illustrated) to each of one or more membrane attachments 824, which in this example provide actuation points for the membrane 830. In this example, the membrane attachments extend through guide slots 822 formed in a support structure 820. The membrane attachments may move within the slot along a guide path, and the shape of the guide path is defined by the exterior surface of the support structure, as seen at 828. The dashed lines crossing at the optical center 832 of the lens provide a visual indication of a convex exterior surface of the membrane 830. The interior of the support structure is visible at 826. In this example, the support structure generally extends around the periphery of the lens. In other examples, a fluid lens may include a plurality of separate support structures arranged around the periphery of the lens. (Terms such as upwards, downwards, vertical, horizontal, and the like, may refer to example illustrated orientations, and are not limiting.)

The guide path may be configured so that the elastic energy within the membrane is approximately unchanged as the membrane attachments are moved along the respective guide paths. Using this approach, the actuation force may be very low, and may be approximately zero, as related to changes in the strain energy of the membrane. In some examples, a relatively low actuation force may be used to overcome frictional forces and the like. The actuation force may be positive or negative at any of the control point locations.

In some examples, a guide path may be provided by a support structure including one or more of the following: a pivot, a flexure, a slide, a guide slot, a guide surface, a guide channel, or any other suitable mechanism. A support structure may be entirely outside the fluid volume, entirely inside the fluid volume, or partially within the fluid volume.

In some examples, an advantage of the "zero actuation force" approach (where the actuation force is greatly reduced and may be mostly force required to overcome friction) is that a lens may be actuated into a particular configuration (such as a particular optical power) and the membrane may then tend to remain in that particular configuration, which may be neutrally stable. This may greatly reduce actuation power requirements, as no appreciable force may be needed to hold the lens in any particular configuration.

In some examples, a fluid lens (which may also be termed a fluid-filled lens) may include a relatively rigid substrate and a flexible polymer membrane. The control points may be provided by membrane attachments, which may be attached to the membrane or a peripheral structure (such as a guide wire) and may interact with a corresponding support structure that provides a guide path. For example, the membrane may be attached to at least one support structure at control points disposed around the membrane periphery. A flexible edge seal may be used to enclose the fluid. The lens power can be adjusted by moving the location of control points along guide paths, for example, using one more actuators. Guide paths (which may correspond to reduced work trajectories of the control points) may be determined that maintain a constant elastic deformation energy of the membrane as the control point location is moved along the guide path.

Guide devices may be attached to (or formed as part of) the substrate. Sources of elastic energy include hoop stress (tension in azimuth) and line strain, and elastic energy may be exchanged between these as the membrane is adjusted. Example "zero-strain" guide paths may greatly reduce or substantially eliminate the energy required for lens adjustment. In some examples, the force direction used to adjust the control point location may be normal to the elastic force on the support structure from the membrane. There are great possible advantages to this approach, including much reduced actuator size and power requirements and a faster lens response that may be restricted only by viscous and friction effects.

In the analysis used to determine the guide path, the fluid may be assumed to be incompressible so that the fluid volume does not change. A "zero-strain" guide path may be readily determined for a circular lens. The analysis for non-circular lenses may be slightly different, and in some cases the work required for adjustment may be reduced but not entirely eliminated. An example simplified approach determines a guide path for which there is no elastic force component in the guide direction, so that the force direction used to adjust the control point location is normal to the elastic force on the support structure from the membrane.

In some examples, a liquid lens may be adjusted by moving each control point of an elastic membrane along a guide path, which may be determined so that the elastic deformation energy of the membrane is substantially unchanged by the adjustment. This may allow for greatly reduced actuation power and a faster response. An example approach uses a guide wire, such as a steel wire with an optional thermoplastic polyurethane (TPU) coating, positioned along the perimeter of the membrane. If the perimeter distance is reduced, the control points of the membrane may move along the guide path towards the substrate.

In some examples, at least one optical parameter of a fluid lens may be determined at least in part by a physical profile of a membrane. In some examples, a fluid lens may be configured so that at least one optical parameter of the lens may be adjusted without changing the elastic strain energy in the membrane. In some examples, at least one optical parameter of the lens may be adjusted using an adjustment force, for example, a force applied by an actuator, that is normal to a direction of an elastic strain force in the membrane (e.g., at the periphery of the membrane). In some examples, a guide path may be configured so that the adjustment force is always at least approximately normal to the elastic strain force during adjustment of the fluid lens. For example, the angle between the adjustment force and the elastic strain force may be within 5 degrees of normal, for example, within 3 degrees of normal.

Example applications of the principles described herein include a device including a deformable element such as a membrane (where the deformable element may be in elastic tension), a substrate, a fluid at least partially enclosed between the membrane and the substrate, and a support structure configured to provide a guide path for an edge portion of the deformable element. The guide path may be configured such that adjustment of the device changes a profile of the deformable element without changing an elastic strain energy within the deformable element. The guide path may be configured such that adjustment of the device changes a profile of the deformable element by applying an actuation force normal to an elastic strain force in the deformable element.

In some examples, a device, such as an adjustable fluid lens, includes a membrane in elastic tension, a substrate, a fluid at least partially enclosed between the membrane and the substrate, and a support structure configured to provide a guide path for an edge portion of the membrane. The guide path may be configured so that there is approximately no change in the total strain energy in the membrane as the edge portion of the membrane moves along the guide path.

In some examples, the optical power of the fluid lens may be adjustable by moving a location of the edge portion of the membrane along the guide path. The device may further include at least one actuator configured to adjust the location of respective one or more edge portions of the membrane. The elastic energy may be substantially independent of the location of the edge portion along the guide path. In some examples, the guide path may be configured so that the elastic tension is directed normal to the local direction of the guide path for each location on the guide path.

In some examples, the device includes a fluid lens having an optical center, where locations on the guide path have a radial distance from the optical center and an axial displacement from the substrate. The guide path may be configured such that the radial distance decreases as the axial displacement (or vertical distance) decreases. The guide path may be configured such that the guide path curves inwardly towards the optical center as the axial displacement decreases. In some examples, the elastic tension may have no appreciable component directed tangentially along the guide path. A device may further include a membrane attachment (that may also be termed an interface device) that connects the membrane to the support structure and may allow the membrane to move freely along the guide path. A support structure may include at least one of a pivot, a flexure, a slide, a guide slot, a guide channel, or a guide surface.

In some examples, a device may further include an edge seal configured to help retain the fluid between the substrate and the membrane. The edge seal may be connected to the substrate and the membrane, and may be flexible to allow movement of the peripheral region of the membrane. A device may include a plurality of support structures, with each support structure mechanically interacting with a respective membrane attachment.

In some examples, a device includes a fluid lens having a deformable element such as a membrane (where the deformable element may be in elastic tension), a substrate, a fluid at least partially enclosed between the membrane and the substrate, and a support structure configured to provide a guide path for an edge portion of the deformable element, such as a membrane attachment attached to a periphery of a membrane. The guide path may be configured such that adjustment of the device changes a profile of the deformable element without appreciably changing an elastic strain energy within the deformable element. The guide path may be configured such that adjustment of the device changes a profile of the deformable element by applying an actuation force normal to an elastic force exerted by the deformable element.

In some examples, a method of adjusting a fluid lens (e.g., including a membrane such as an elastomer polymer membrane) includes adjusting a respective position of one or more control points such that the optical power of the fluid lens changes while the elastic strain energy in the elastomer polymer membrane does not change appreciably. An example method may further include applying an actuation force to the membrane to change the optical power of the fluid lens, where the actuation force is applied in a direction normal to an elastic strain force within the membrane. The actuation force may move a control point of the membrane along a guide path, and the control point may be located within an edge portion of the membrane. A control point may be provided by a membrane attachment that mechanically interacts with a support structure attached to the substrate. In some examples, the control point may be taken to be a location of a membrane attachment, for example, where it is attached to an edge portion of the membrane.

In some examples, a fluid lens may include a membrane attachment (which may also be referred to as an interface device) that interconnects the support structure and the membrane. The membrane attachment may be configured to provide one or more of the following aspects: to mechanically connect the membrane control points to the support structure, to react the loads from the guide wire into the support structure, to move freely along the guides, and/or to provide an interface for the actuation system. FIG. 9 shows a membrane assembly 900 that includes a membrane 910 and a guide wire 920 that extends around the periphery of the membrane. A guide wire may also be referred to as an edge wire. Control points are provided by membrane attachments 930 arranged around the periphery of the membrane. The membrane attachments may be attached to the guide wire, and may engage with a support structure (not shown). Example support structures may be attached to a substrate (and/or a frame) and may be configured to retain the membrane tension. The example membrane assembly 900 may have a "trampoline configuration", with scalloping between the control points.

In an example fluid lens, a support structure may be used to guide the location of a corresponding control point along a guide path, for example, relative to a lens substrate (not shown). For example, a corresponding support structure may be provided for each membrane attachment. In some examples, one or more support structures may be configured to allow the corresponding membrane attachment to move along a guide path. One or more support structures may be configured as fixed, pivoting, or hinged connections to the corresponding membrane attachment.

In some examples, the membrane may provide an optical surface of a fluid lens. The membrane may include an optically transparent polymer, such as a thermoplastic polyurethane. The guide wire may include a flexible wire positioned around a periphery of the membrane. The guide wire may have a high modulus, for example, in relation to the membrane.

The membrane may be stretched to a pre-determined state, such as a predetermined line tension, which may be determined based on gravity sag considerations. A higher tension may reduce the effects of gravity sag, but may exert a higher force on, for example, the support structures.

In some examples, the guide wire may have a polymer coating, such as a thermoplastic polyurethane (TPU) sheath. The guide wire may be bonded to the membrane by any appropriate method, for example, using an adhesive or acoustic welding. Ends may be molded or swaged onto one or more trampoline apexes to provide anchors for the control points for the guiding interface. For example, the control points may be provided by a membrane attachment, which may include a mechanical structure configured to engage with a guide path provided by a support structure.

FIG. 10A illustrates an example engagement of a membrane attachment of an example membrane assembly to a corresponding support structure. In this context, the term "corresponding" may refer to a mechanical engagement between a membrane attachment and a support structure. FIG. 10A shows a membrane assembly generally at 1000, including an expanded view of a portion 1010 of the membrane assembly 1000. The expanded view shows that the membrane assembly 1000 includes a membrane 1012, a guide wire 1014, and a membrane attachment 1020. The membrane attachment 1020 may include a portion 1016 that extends through the support structure. The membrane attachment 1020 includes a roller having an axle 1022 and a pair of roller wheels 1024 and 1026. The roller wheels 1024 and 1026 may engage with an outer surface 1032 of the support structure 1030. The outer surface 1032 may be curved and define a guide surface for the roller wheels, and may define a guide path for the membrane attachment. The outer surface 1032 may include grooves, flanges, or other suitable structures to help engage and guide the roller wheels. The membrane attachment may be attached to the guide wire 1014 at attachment 1040, and the attachment may be provided by a molded or swaged end portion of the membrane attachment.

FIG. 10B shows a side view (A-A') through a portion 1050 of the membrane assembly 1000, showing a portion of the membrane 1012 bonded to a portion of the guide wire 1014. The guide wire 1014 may include a central metal wire (such as a steel cable) 1056 surrounded by a sleeve (such as a polymer sleeve) 1058. There may be an acoustic weld 1060 between the guide wire and the membrane, for example, between the polymer sleeve 1058 and the membrane 1012.

For a device configuration similar to that discussed above in relation to FIGS. 10A-10B, the tension acting on the guide wire may be calculated using Equation 1 below:

$$F_L = F_w / r_w \qquad \text{Equation 1}$$

In Equation 1, $F_L$ represents membrane line load, $F_w$ represents the guide wire tensile load, and $r_w$ represents the guide wire radius. The latter term is discussed further below.

Figure 11:
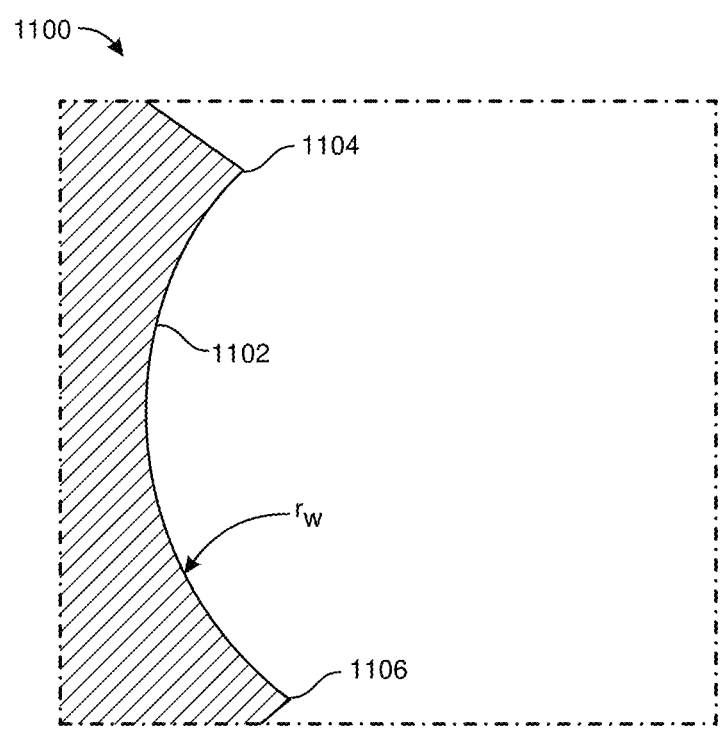
FIG. 11 illustrates a curved peripheral portion of a membrane.

FIG. 11 shows a portion 1100 of the edge of an example membrane assembly, and illustrates the guide wire radius term ($r_w$). The guide wire 1102 may be located along the membrane periphery, and may have an inwards curve (e.g., towards the center of the lens) between control points 1104 and 1106, where membrane attachments may be located. The radius of the curve is denoted $r_w$, which may represent the guide wire radius as used in Equation 1 above. The guide wire may be bonded to the membrane, using one or more processes such as thermal bonding, ultrasonic welding, or an adhesive.

In some examples, a fluid lens includes one or more support structures, which may include, for example, static support structures (e.g., a hinge connection), which may not move along a guide path. A support structure may be configured to perform one or more of the following functions: react the load from the guide wire tension, guide the membrane control points along the zero-delta energy path (e.g., a "zero-strain" guide path corresponding to a guide path along which the elastic strain energy in the membrane is approximately unchanged), and/or support the substrate. In some examples, a support structure may include one or more of the following: a curved pin, a slotted surface, or other feature configured to provide a guide path.

Figure 12A:
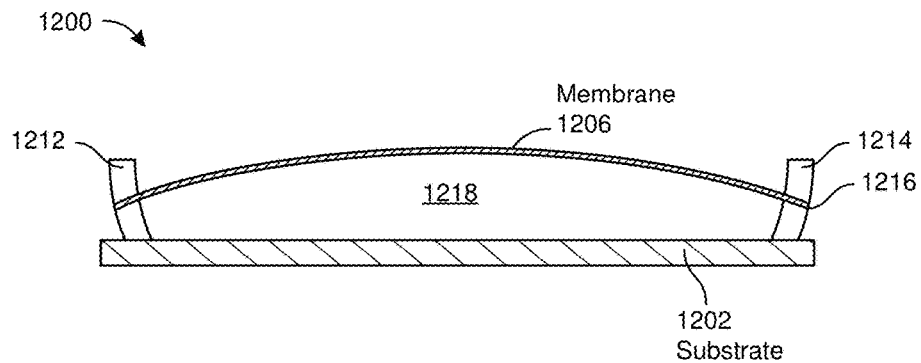
FIGS. 12A-12C illustrate an example device including a membrane attachment engaged with a support structure.

FIG. 12A illustrates an example fluid lens, similar to that shown in FIG. 1A. The fluid lens 1200 includes a substrate 1202, membrane 1206, support structures 1212 and 1214, and fluid-filled enclosure 1218. In this example, the support structures 1212 and 1214 may each include a curved pin, discussed further below. The membrane may have one or more membrane attachments (not shown in detail) that may extend (at least in part) through a support structure, for example, as shown at 1216.

Figure 12B:
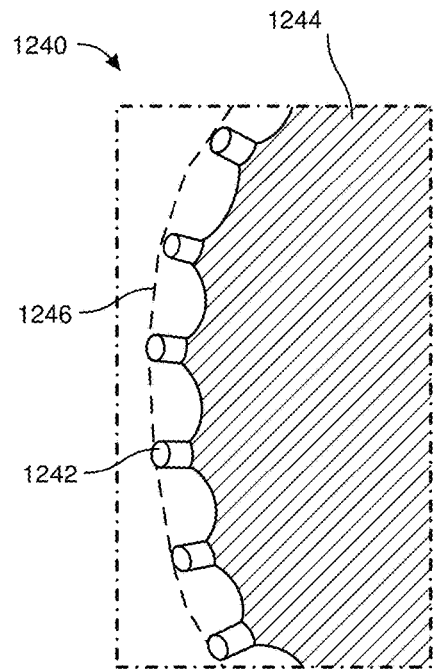

FIG. 12B shows a top view of a portion of fluid lens 1240, including part of a membrane 1244, and having membrane attachments 1242 arranged around the periphery of the membrane 1244. The curve 1246 may represent a line around which support structures may be arranged, and may also be considered as an "ideal" peripheral profile of the membrane. The actual peripheral profile of the membrane may show scalloping, as illustrated.

Figure 12C:
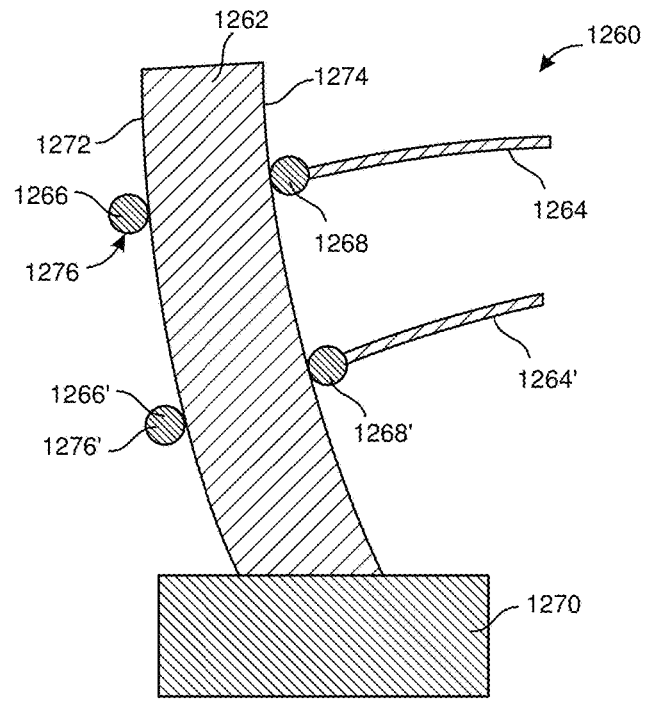

FIG. 12C shows an example support structure configuration in more detail at 1260, showing a support structure 1262 having curved outer and inner surfaces (1272 and 1274, respectively) that help provide a guide path for a membrane attachment. The support structure 1262 may be attached to the substrate portion 1270. The membrane portion 1264, having a first profile, is attached to a membrane attachment 1276 which includes engagement elements 1266 and 1268 that engage with the outer and inner surfaces (1272 and 1274, respectively) of the support structure 1262. In this context, the inner surface of the support structure may face the membrane, or the optical center of the lens. The figure also shows the membrane portion in a second position 1264', having a second profile which may correspond to a second focal length of the fluid lens, which may be different from the focal length corresponding to the first position of the membrane portion 1264. The second position 1264' corresponds to the membrane attachment, initially at 1276, being moved (e.g., by an actuator) to a second location 1276', with the engagement elements being moved to second locations 1266' and 1268', respectively. As the membrane attachment moves down the support structure 1262, it also moves inwardly towards the center of the lens (not shown in this figure), following a curved guide path determined by the curved surfaces (1272 and 1274) of the support structure 1262. A portion of the membrane attachment 1276 may extend through the support structure, for example, through a slot (not shown) to attach to the membrane and engage with the outer surface 1272.

The elastic force exerted on the support structures, by the membrane, may be transferred to the substrate by a rigid attachment of the support structures to the substrate. In some examples, the substrate may be supported by an additional rigid base structure, a frame, or other additional rigid structure. A substrate may include or be attached to a base structure, a frame, or other structure which may be supported by or integrated with the substrate. In some examples, the substrate may be supported by a frame or a portion thereof. Example support structures, such as a support structure including one or more curved pins, may be arranged around the periphery of the substrate, or may be attached to another structure, such as a base structure or frame. In some examples, the curved pins may provide one or more curved surfaces configured to provide a guide path for the control points of the membrane.

In some examples, a support structure may include a curved pin, and a plurality of control points of the membrane may be guided along a guide path by an arrangement of curved pins. For example, a plurality of curved pins may be arranged around the membrane, and each curved pin may be configured to engage with a corresponding membrane attachment associated with the membrane.

In some examples, control points of the membrane may be guided by an arrangement of curved surfaces, or guide surfaces, provided by an arrangement of support structures. The curved surfaces may be provided by one or more rigid structures. In some examples, a support structure may be integrated with the substrate, for example, as a portion of the substrate configured to extend away from a generally planar extent of the substrate.

Figure 13A:
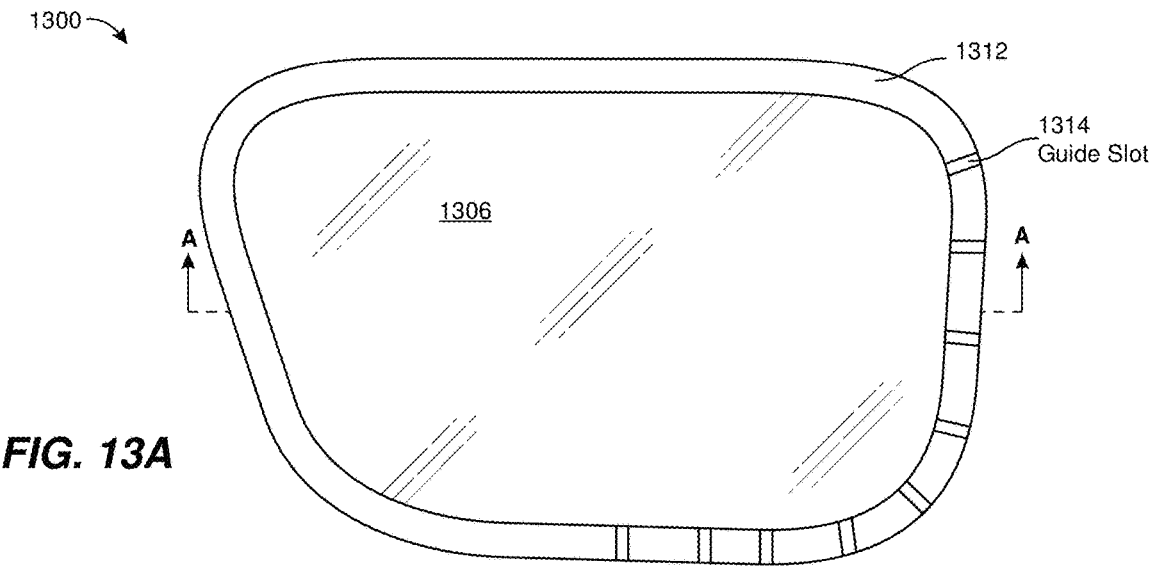
FIGS. 13A-13B illustrate an example device.
Figure 13B:
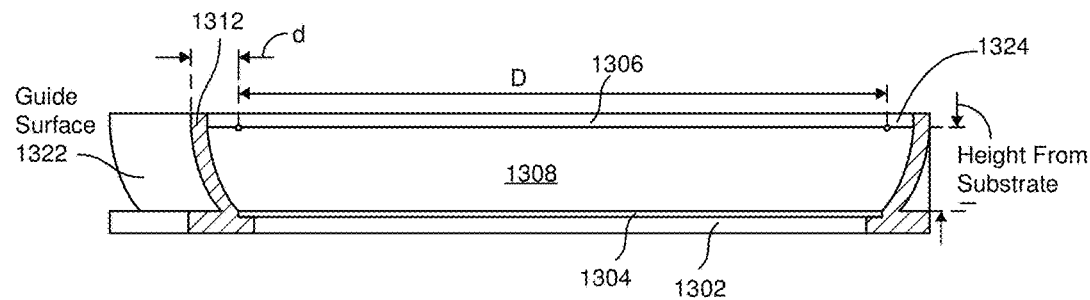

FIGS. 13A-13B show a portion of an example ophthalmic device including a fluid lens having a support structure including guide slots.

FIG. 13A shows a fluid lens 1300 of an example ophthalmic device including a support structure 1312 surrounding the membrane 1306, where the support structure 1312 includes an arrangement of guide slots 1314. Additional guide slots may be provided, for example, arranged around the support structure, but are not shown in the figure for illustrative clarity. Each guide slot 1314 may be configured so that the support structure provides at least one guide surface that helps define a guide path. The guide path may be a "zero-strain" guide path for a control point of the membrane. The control point may be provided by a membrane attachment that is attached to the membrane and may extend, at least in part, through the guide slot and engage with a guide surface provided by the support structure.

FIG. 13B shows a side view in cross-section, showing substrate 1302, optional substrate coating 1304, membrane 1306, lens fluid 1308 within an enclosure, and support structure 1312. The outer surface 1322 of the support structure 1312 provides a guide surface that helps define a guide path for one or more membrane attachments, such as a membrane attachment located with a peripheral region of the membrane (at 1324). The details of the membrane attachment are not shown in this figure, but this may be similar to examples discussed elsewhere, such as in relation to FIG. 12C. The usable diameter (or width) of the lens may be denoted D, and there may be a peripheral region (of extent denoted d) that may be less useful, and which may be concealed by a frame.

Figure 14A:
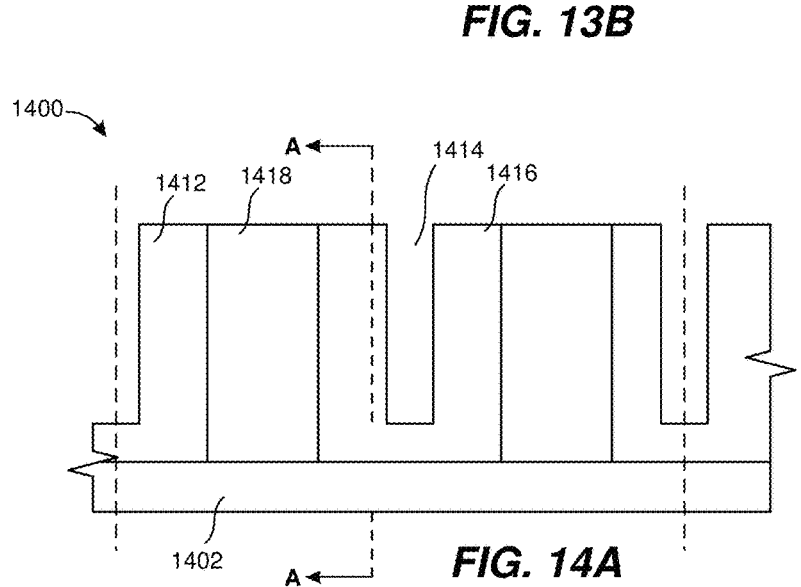
FIGS. 14A-14B illustrate an example support structure configuration.
Figure 14B:
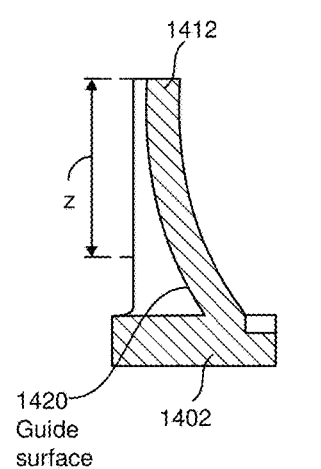

FIGS. 14A-14B further illustrates provision of a guide path using a support structure, for example, a support structure including one or more guide slots. FIG. 14A shows a side view of a portion of a fluid lens generally at 1400, including a support structure 1412, attached to substrate 1402. In this example, the support structure 1412 may include a slotted portion 1416 that at least partially defines slots 1414. In some examples, slotted portions such as 1416 may be provided by separate support structures. In this example, the slotted portions are interconnected by edge portions 1418.

FIG. 14B shows a cross-section through A-A' in FIG. 14B, showing that the slotted portion 1416 of the support structure 1412 has a curved profile, shown as curved support structure 1412. The exterior surface 1420 of the support structure 1412 may provide a guide surface that may help define the guide path of a corresponding control point of the membrane (not shown in this figure), such as a slider or roller of a membrane attachment that, in some examples, may extend through a slot in the support structure.

In some examples, a device may include a support structure (including a curved guide pin, which may sometimes be referred to as a guide post), and a membrane attachment. The membrane attachment may include a roller, an axle, and a carrier which may support the axle and roller and connect to the membrane. In some examples, a membrane attachment may include a one or more rollers, and in some examples may include a single roller, such as a single concave roller. An actuator may also be configured to act on a portion of the membrane attachment, such as the carrier, and the actuator may be supported by the substrate or other device component. The membrane attachment may engage with a support structure, such as a guide pin, and may provide a control point and/or actuation point for the membrane.

FIGS. 15A-15B illustrate an example membrane attachment configuration. FIG. 15A shows a portion of a fluid lens 1500, including a substrate 1502, a support structure 1512, and a membrane 1506 connected to a membrane attachment 1520. The membrane attachment 1520 includes a roller 1522 rotating around an axle 1524. For illustrative simplicity, only one roller, the rear roller from the viewpoint of this side view, is shown, though there may be a pair of rollers as more clearly shown in FIG. 15B. The membrane attachment engages with the support structure 1512, and the surface 1514 of the support structure 1512 helps define a guide path for a membrane control point, which may be considered to be the point of attachment, or interface 1526, between the membrane and the membrane attachment. The roller 1522 may move along the outer surface 1514 of the support structure 1512.

FIG. 15B shows the membrane attachment 1520 in more detail, including an interface or attachment of the membrane attachment 1520 to the membrane 1506, roller 1522, an axle 1524, and an interface to the membrane 1506. In this example, the membrane attachment includes a carrier 1530 that fits around the support structure 1512. In other examples, the membrane attachment 1520 may extend through a slot, or otherwise mechanically engage with the support structure 1512. In this example, the support structure 1512 is shown with a generally circular cross-section, but other configurations may be used, including examples in which the support structure may have an oval, rectangular, or square cross-section, or may include grooves and/or flanges to help guide the membrane attachment.

In some examples, a curved guide path may be provided by a circular roller that engages with a curved support structure. The guide path may be based on an outer curved surface of the curved support structure, such as a curved pin, along which the roller may move. In some examples, a curved guide path may be provided by a cam having a non-circular periphery and/or an off-center axle straight support structure, which may engage with a generally straight support structure. As the cam moves along a generally straight surface, the cam may motion move the control path along a curved guide path. In some examples, the guide path may be determined by the engagement of a cam and a curved guide surface. In this context, a cam may include a rotatable structure supported by an axle (or other suitable structure), and the motion of the axle may help define the guide path. A cam may include a non-circular wheel, such as a generally oval or elliptical wheel, and/or a non-centrally mounted axle.

In some examples, a device may include a support structure configured to provide a curved guide path, and a membrane attachment that may engage with the support structure. The membrane attachment may include at least one roller, such as twin cylindrical rollers. The membrane attachment may provide a control point of the membrane, and may be connected to the membrane by a molded or swaged end portion of the membrane attachment, or otherwise attached.

In some examples, a membrane attachment (which may also be termed an interface device or interface element) may include a concave roller (which may be compatible with a curved pin based support structure). In some examples, the membrane attachment may include twin cylindrical rollers (which may be compatible with a slotted support structure providing a guide surface over which the roller may rotate). A roller may include a hard substance, such as synthetic sapphire. Sliding contacts may be coated with a hard, low friction coefficient material such as an aluminum magnesium boride ceramic (e.g., BAM).

In some examples, a roller may include a jewel wheel, and may include, for example, a synthetic sapphire roller. Synthetic sapphire components may, in some examples, include ruby rollers and ruby bearings. In some examples, a roller may include a metal roller, such as a tungsten roller. In some examples, a clevis fastener configuration may be used to provide the axle for supporting a roller. In some examples, an interface device may include a roller, wheel, or similar rotating structure. A rotating structure may have a flange or flanges to guide the rotating structure within a slot.

FIG. 16A-16B show an example support structure configuration. FIG. 16A shows a support structure assembly 1600 including an arrangement of support structures 1612. The detailed inset to FIG. 16A shows the support structure 1612 in more detail, including a slotted portion 1616 defining a guide slot 1614. The figure also shows membrane attachment 1620 in part extending through the guide slot 1614. The membrane attachment includes a roller 1624 rotating around an axle 1622. The roller 1624 may be urged against the outside surface 1618 of the support structure 1612 by an elastic force exerted by the membrane (not shown), and may move along a path defined by the shape of the outer surface 1618 of the support structure 1612. The shape of the outer surface 1618 may help define the guide path for the membrane attachment. The slotted portions may be interconnected by edge portions 1630 or, in other examples, may be provided by separate support structures.

FIG. 16B shows a side view, further illustrating the membrane attachment 1620. The figure shows a membrane 1606 attached to the membrane attachment 1620 at interface 1626. A portion of the membrane attachment 1620 extends through the guide slot 1614 in support structure 1612 so that the roller wheel 1624 moves against the outer surface 1618 of the support structure 1612. The support structure 1612 may be attached to a substrate 1602.

In some examples, a support structure providing a guide surface (e.g., including a pin or slot) may be provided by a portion of the substrate. In some examples, an edge portion of a substrate may, for example, have a portion that extends away from a generally planar central portion of the substrate to provide, for example, one or more curved pins or one or more curved slots or other guide surfaces.

Figure 17:
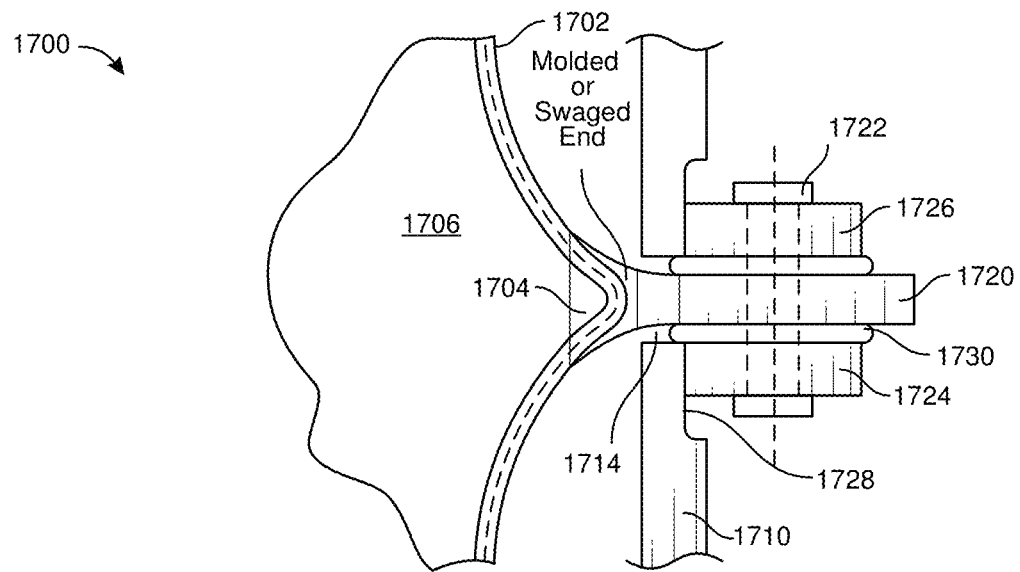
FIG. 17 illustrates an example membrane attachment including a roller.

FIG. 17 shows a portion of an example device 1700 including a membrane 1706 having a guide wire 1702 extending around the periphery of the membrane. The membrane is attached to a membrane attachment at an end portion 1704 of the membrane attachment. The end portion may be molded or swaged to the membrane and/or the guide wire. The membrane attachment 1720 includes an axle 1722 and rollers 1724 and 1726, and the rollers may engage with the guide surface 1718 of the support structure 1710. The guide surface 1718 may be provided by a surface of a recessed portion 1728 of the support structure 1710. Roller spacers 1730 may be configured to help locate the rollers against the guide surface. A portion of the membrane attachment 1720 may extend through a slot 1714 in the support structure 1710.

Simulated properties were determined using finite element analysis for a non-round, "zero-strain" device configuration. The model used the following characteristics: an arbitrary realistic eyewear shape; 25 actuation points (with each actuation point moved along an individual "zero-strain" trajectory); and a 0.5D to 3.5D optical power adjustment based on the membrane deformed shape and the fluid refractive index. The positions of the actuators were adjusted to reduce the reaction force, and to produce a reaction force that was approximately normal to the edge of the eyeshape.

Figure 18:
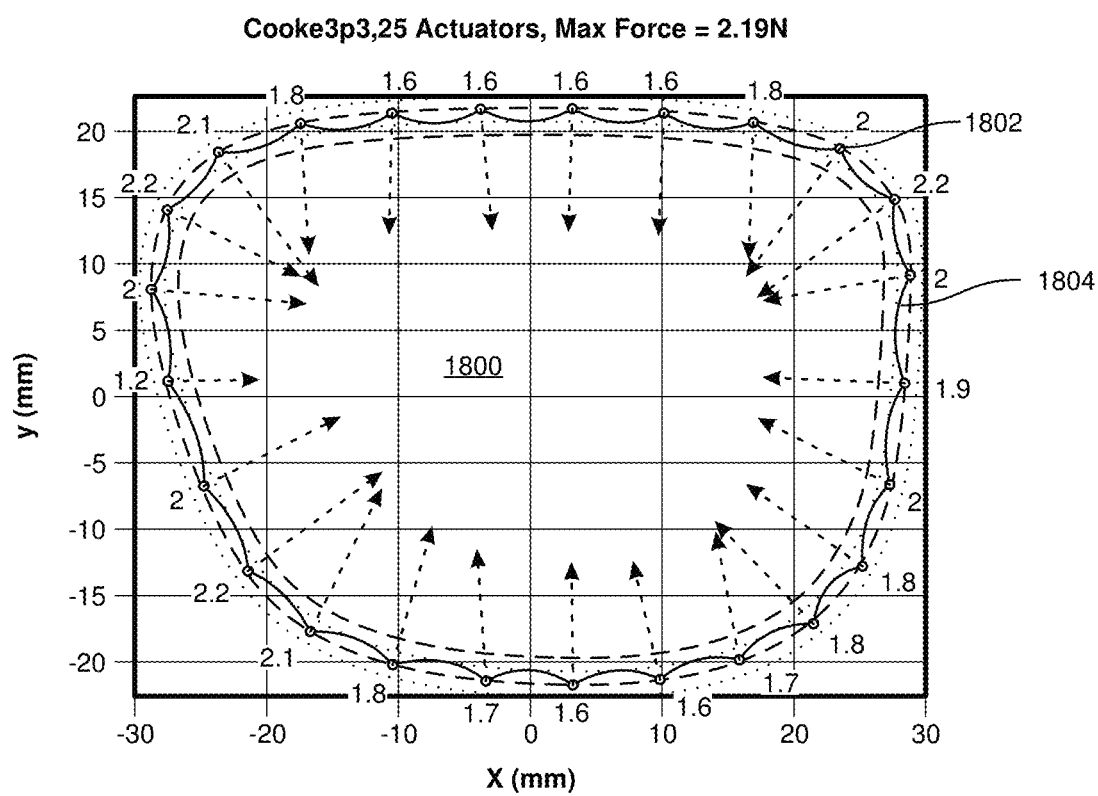
FIG. 18 illustrates example elastic forces exerted at membrane control points.

FIGS. 18 and 19 illustrate the results of this simulation. FIG. 18 shows a finite element analysis of a membrane 1800, showing the directions of elastic forces on the respective membrane attachments 1802. The inner dashed line and outer dotted line may denote the extent of a frame used to conceal the scalloping of the membrane periphery 1804. The remaining dashed line extends through the control points provided by the membrane attachments 1802, and may correspond to an "ideal" periphery of the membrane. The numbers by each control point represent example forces in Newtons (N), and the dashed arrows indicate approximate force directions.

FIG. 19 shows an example configuration of a membrane assembly 1900 that was modeled using finite element analysis, including membrane 1906, control points (which may be provided by membrane attachments) 1902, and a guide wire 1904. The periphery of the membrane 1906 has scalloped portions between control points 1902. In some examples, a membrane assembly 1900 may have a plurality of actuation points (which may also be referred to as control points), which may be provided by membrane attachments on which an actuator may act. In some examples, the control points may be uniformly distributed around a lens periphery. In some examples, the control point locations may be adjusted to balance forces on the control points (e.g., to approximately equalize the forces on each control point). In some examples, the width of the membrane may be sized for ophthalmic applications, and may be, for example, between 20 mm and 100 mm, such as between 20 mm and 80 mm.

FIGS. 20A and 20B qualitatively represent an example membrane profile, including a membrane assembly 2000 having control points 2002 and a periphery (which may include a guide wire) having a scalloped profile 2004. FIG. 20A shows that the maximum axial displacement (e.g., distance from the substrate) is located at the lens center 2006. The different concentric shaded bands show axial displacements of the membrane within certain arbitrary ranges. A membrane portion with minimum displacement (2008) from the substrate is shown close to the edge of the membrane. The representation is qualitative, using arbitrary units of displacement, but the concentric nature of the circles arises from the excellent optical quality of a lens fabricated with such a membrane.

FIG. 20B shows a side view, showing the lens center 2006 having the greatest axial displacement, the membrane portion having minimum displacement 2008, and further showing the curved membrane profile 2010 of the membrane. The membrane profile may correspond to an optical power of 3.5 diopters. The profile has a generally convex exterior surface, with the maximum outward displacement of the membrane (e.g., relative to the substrate) being approximately the optical center of the lens 2006.

Figure 21:
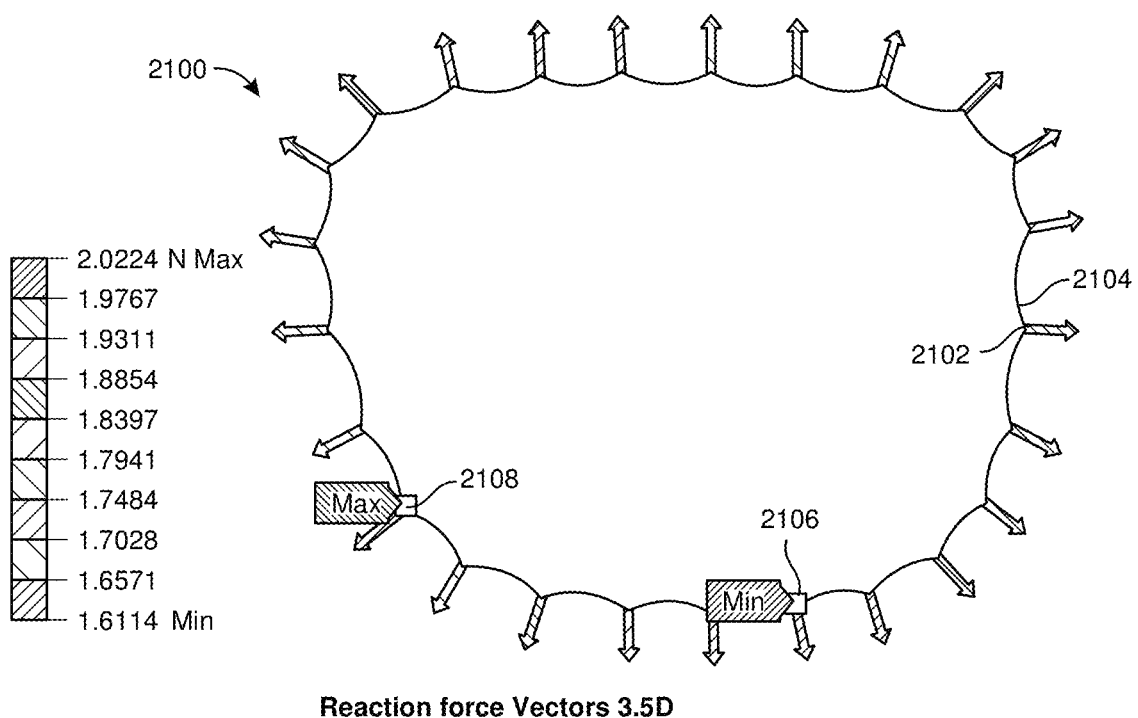
FIG. 21 illustrates elastic forces exerted on the control points of a membrane assembly including a guide wire.

FIG. 21 shows reaction force vectors for a membrane 2100 at the control points 2102 (which may be actuation points, and may be provided by membrane attachments) for a lens configuration similar to that shown in FIG. 20. The membrane 2100 has a peripheral guide wire 2104 with a scalloped peripheral profile. The control points may be provided by membrane attachments arranged around the periphery of the membrane. The graphic representations of force vectors are shaded according to the accompanying scale of forces. The control points having highest and lowest elastic forces are shown at 2106 and 2108, respectively. In this example, the highest force is approximately 2.0 N, and the lowest force is approximately 1.6 N. These values are representative and not limiting.

Figure 22A:
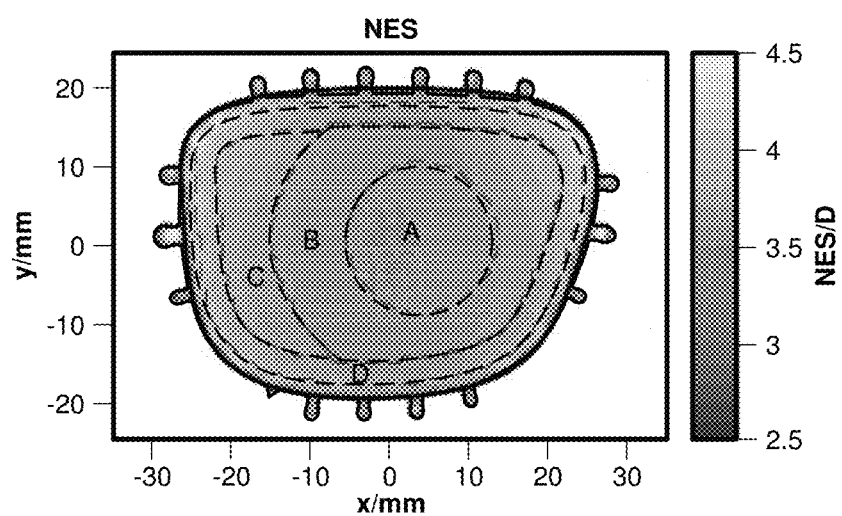
FIGS. 22A-22B show optical defects on a simulated lens.
Figure 22B:
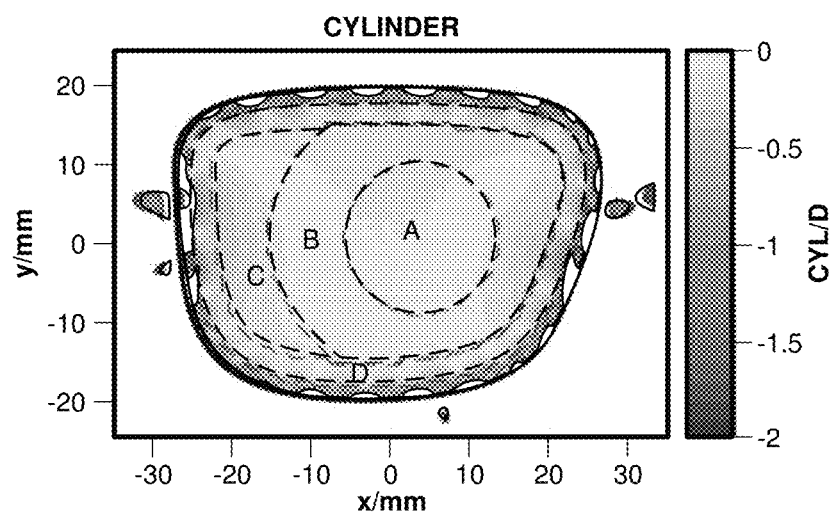

FIG. 22A-22B illustrate the optical quality of the lens. FIG. 22A shows NES (nearest equivalent sphere) errors over the lens surface. The lens surface may be divided into zones labeled zones A, B, C, and D, indicated approximately by dashed lines. The figure also shows the average NES error and standard deviation of NES values for each zone. FIG. 22B shows cylindricity errors over the lens surface. As in FIG. 22A, the lens surface may be divided into zones labeled zones A, B, C, and D, indicated approximately by dashed lines. The figure also shows the average cylindricity error and standard deviation of cylindricity values for each zone. Data is not shown for the extreme periphery of the lens.

Figure 23A:
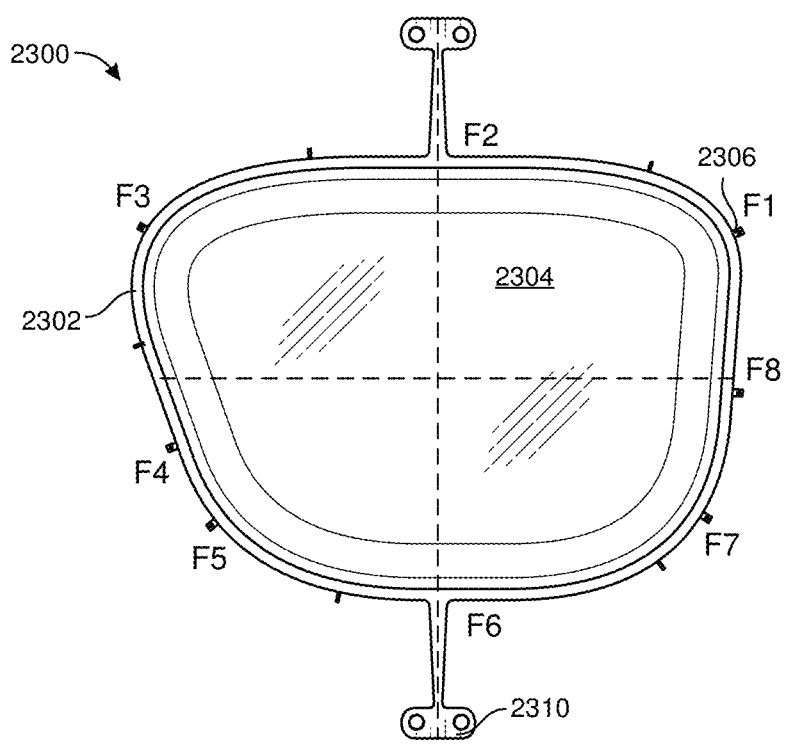
FIGS. 23A-23D illustrate example actuation forces for an adjustable fluid lens, and other example peripheral structure configurations.

FIG. 23A shows the actuation forces in Newtons (N) for an example lens 2300 with a metallic guide wire 2302. The structures 2310 are optional. The lens membrane 2304 has 8 control points (labeled F1-F8, denoting the actuation force F at the respective control point), such as control point 2306 (labeled F1). The magnitudes of the actuation forces in this example are in the range 0.48 N-3.31 N, and total 14.07 N.

Figure 23B:
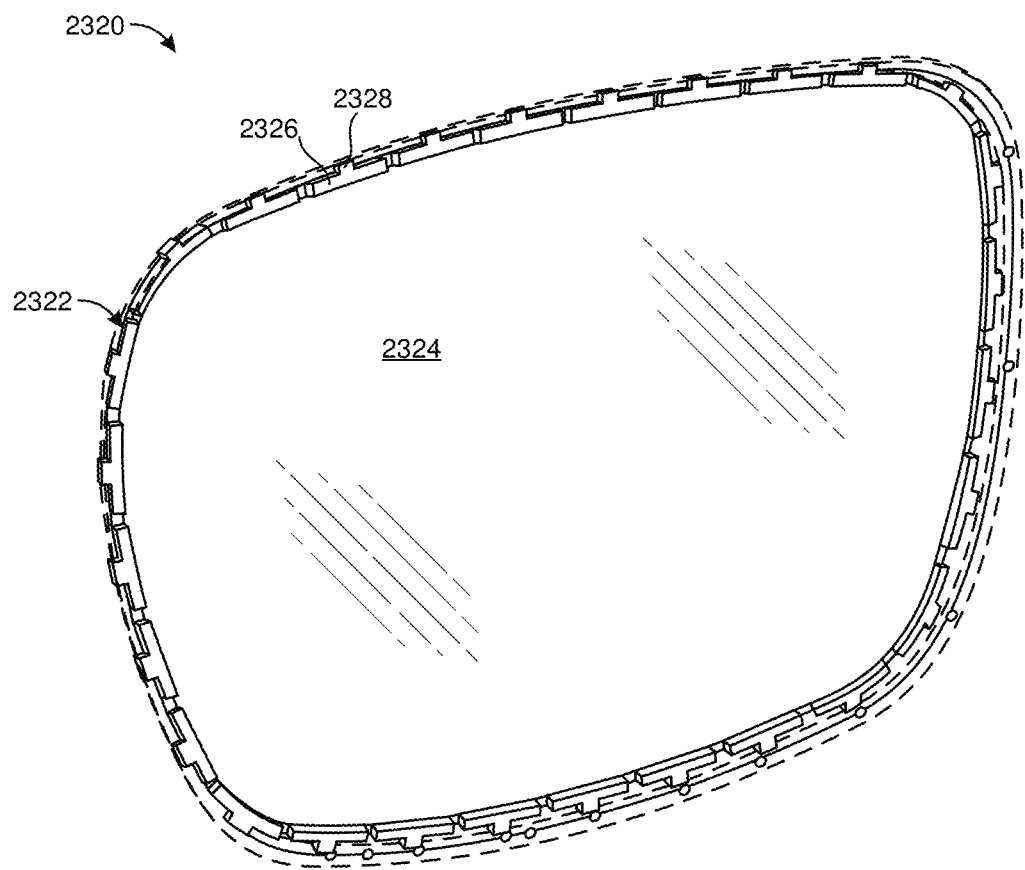

FIG. 23B shows a further example configuration of an adjustable fluid lens 2320, including a segmented support ring 2322 surrounding the membrane 2324. Each segment 2326 may include a control point 2328. This structure may be similar to the metal support ring shown in FIG. 23A, but the division into segments allows a control point within any particular segment to follow a zero-strain path.

Figure 23C:
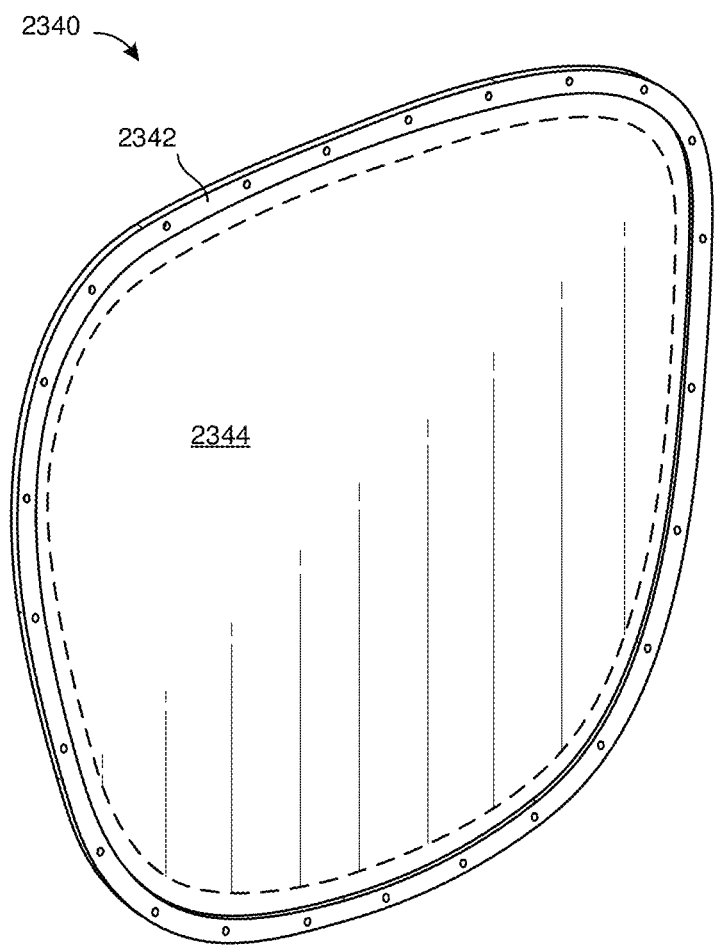

FIG. 23C shows a further example configuration of an adjustable fluid lens 2340, including a low modulus support ring 2342 surrounding the membrane 2344. The support ring may include a solid support ring similar including (or formed from) a compliant polymer.

Figure 23D:
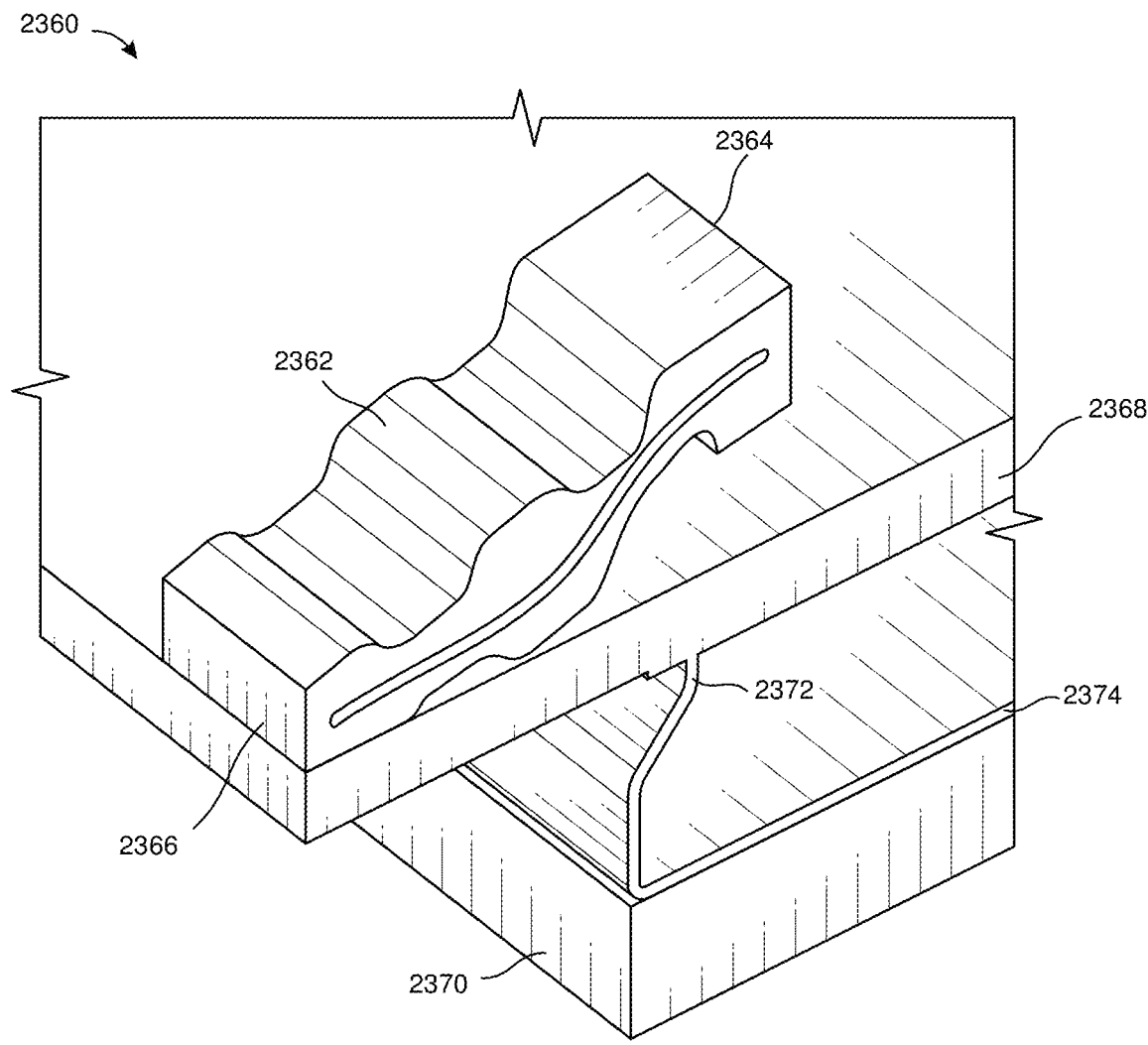

In some examples, a support ring may be configured as an "interpolating ring", such as a resiliently bendable support ring slidably coupled to the control points to enable a reduced actuator number. An interpolating ring can be used in combination with trampoline, segmented support ring or low modulus support ring FIG. 23D shows a portion of an example fluid lens including a configuration 2360, which includes a flexure 2362. The flexure 2362 is anchored at an anchor point 2364 at one end, and flexibly interconnects the control point 2366 to the anchor point 2364. The details of the anchor point are not shown, but an additional anchor structure (not shown) may be attached to the substrate and provide the anchor point. The control point 2366 is connected to the membrane 2368. In some examples, the connection may be located on a peripheral structure such as a control ring (not shown, for illustrative simplicity). The figure also shows substrate 2370 and edge seal 2372, which, along with the membrane, may provide an enclosure for the lens fluid. In this example, the edge seal may be connected to an optional additional coating 2374 that coats the substrate 2370.

Figure 24:
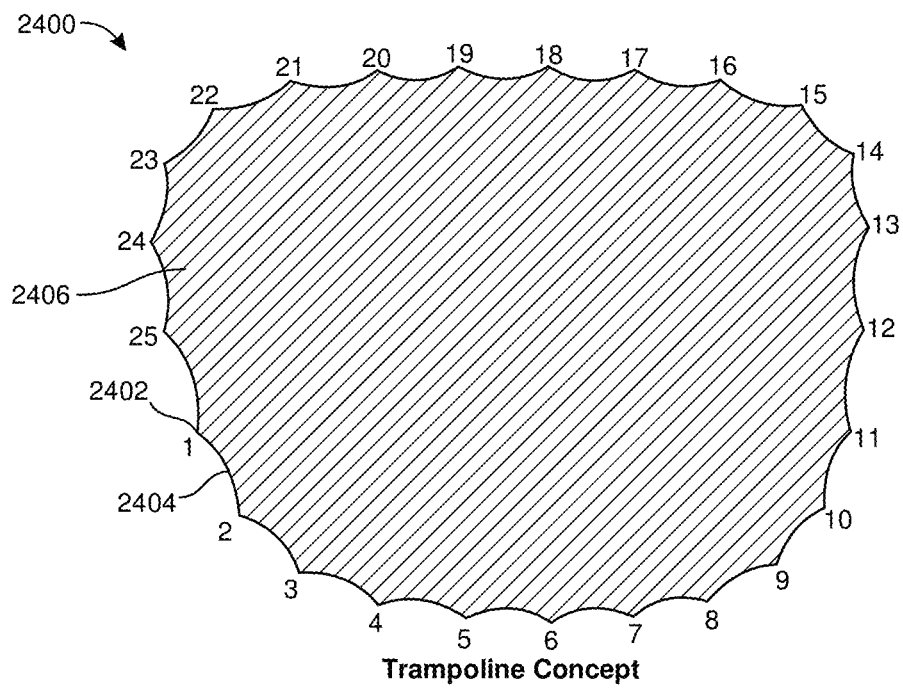
FIG. 24 shows the greatly reduced actuation forces required by an example adjustable fluid lens having a "zero-strain" configuration.

FIG. 24 shows the actuation forces for a membrane assembly 2400 for a fluid lens having a "zero-strain" device configuration, with an assumed friction coefficient of 0.1. The membrane assembly 2400 includes a membrane 2406 with 25 control points (labeled 1-25), including as control point 2402 (labeled "1"). A guide wire 2404 extends around the periphery of the membrane, which has a scalloped periphery.

As shown in the tabulated data shown in FIG. 24, the magnitudes of the actuation forces are in the range 0.16 N-0.20 N, and the forces total 4.36 N. The remarkable reduction in actuation forces allows actuator sizes and actuator energy consumption to both be greatly reduced. Another feature of the various actuation forces is their relative uniformity, relative to configurations without which may be termed the "zero-strain" device configuration (or actuation configuration), as actuation forces may be mostly due to frictional forces, and may include greatly reduced or no appreciable elastic force contributions due to membrane profile changes.

Table 3 below shows radial distance ($\Delta r$) and axial distance ($\Delta z$) for a fluid lens adjusted to different optical powers. In some examples, the guide paths deviate from a straight line by less than about 10% (e.g., $\Delta r \leq \Delta z/10$). In some figures, the curvature of the guide paths may be exaggerated for illustrative clarity.

TABLE 3

| $\Phi$ Diopters | $\Delta r$ mm | $\Delta z$ mm |
|---|---|---|
| 0.5 | −0.0016 | −0.0224 |
| 2 | −0.0251 | −0.4491 |
| 3.5 | −0.0770 | −0.8746 |

In some examples, the membrane may have a scalloped periphery (sometimes referred to as a scalloped edge, or a trampoline configuration). The membrane periphery may curve inwards, towards the center of the lens, between the control points. An "ideal" periphery may approximate a smooth curved through the control points. In some examples, a guide wire may not provide an "ideal" periphery, having a smooth peripheral shape. This may be particularly noticeable when there is a relatively small number of control points (e.g., compared with examples shown above). In some examples, the periphery of the membrane, which may include scalloped portions, may be concealed by a frame. Using a larger number of control points may reduce the radial extent of scalloped portions (e.g., the distance the scalloped portions extend inwards from a periphery drawn through the control points), and may help the scalloped portions to be concealed by a frame. In some examples, the number of control points may be in the range of approximately 8 to approximately 40, such as within the range 10-30.

Figure 25A:
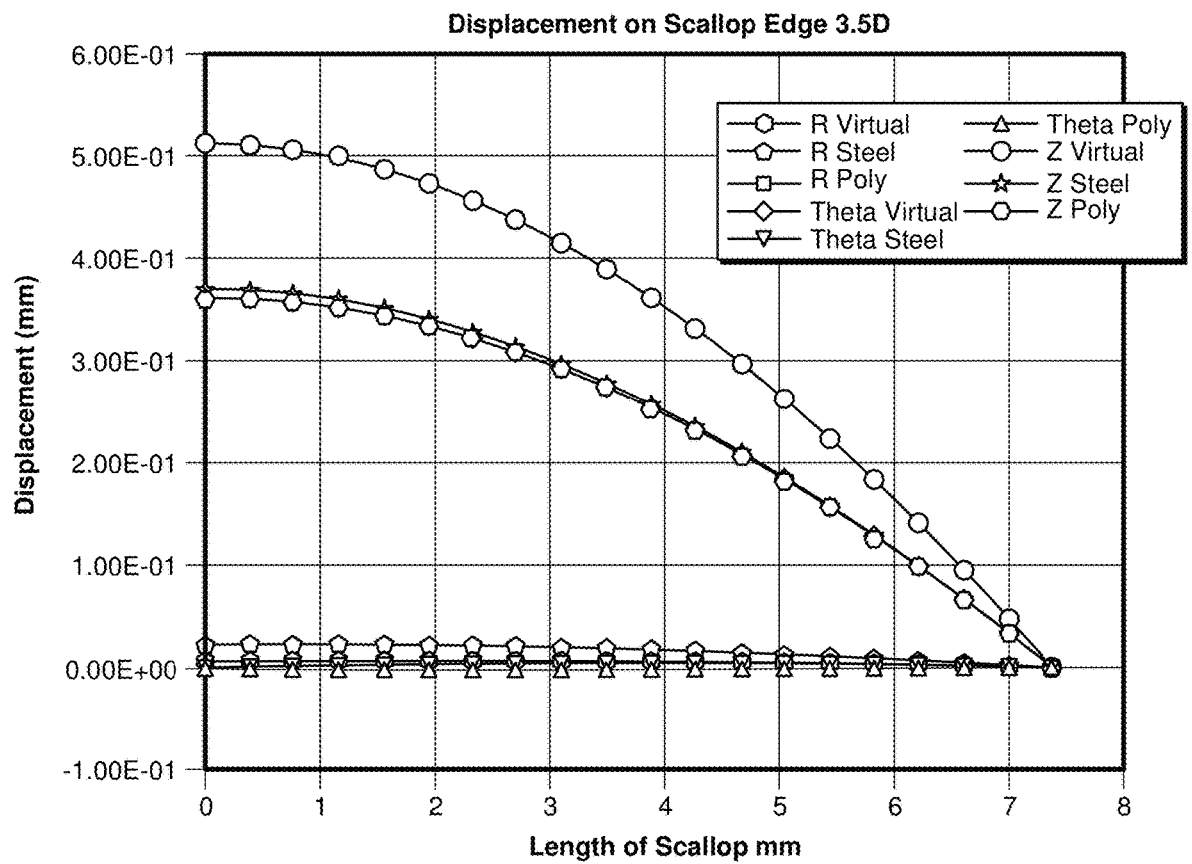
FIGS. 25A-25B illustrate the effects of guide wire material choice on the properties of a membrane assembly.

FIG. 25A compares the membrane displacements of an "ideal" (e.g., non-scalloped) membrane as compared with the scalloped membrane periphery, and shows that the profile of a membrane with a scalloped periphery may deviate from a desired profile. The upper three curves of FIG. 25A represent deviations in Z (displacement, also referred to as "delta Z") for virtual (ideal), steel, and polymer (e.g., polymer-coated) guide wires. The lower three curves (almost horizontal and close to zero) in FIG. 25A show angle (theta) deviations for virtual, steel, and polymer guide wires. For ophthalmic applications, the membrane profile may be within 20 microns of an ideal spherical shape. In some examples, the membrane periphery may deviate by approximately 120 microns from a desired profile, which for some applications may be larger than desired. The profile deviation may be at least partially reduced by adding one or more additional components to the device, for example, a component which tends to push the guide wire away from the substrate (sometimes referred to as "upwards" in relation to example illustrations, though any such directional terms are not limiting), as the control points of the lens are actuated. Examples are discussed further below, and this approach may significantly improve optical performance of the lens.

Figure 25B:
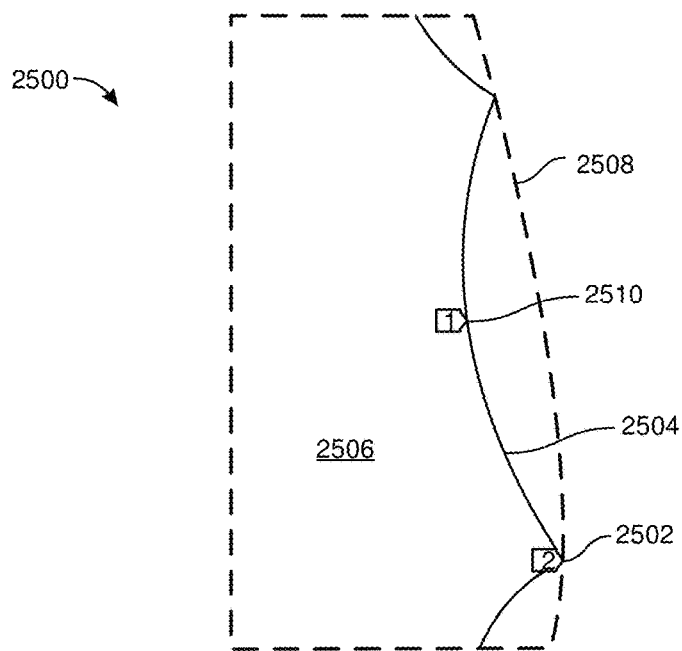

FIG. 25B further shows that the membrane periphery may show scalloping. A device with additional control points, and hence shorter scallop lengths, may also show reduced deviations from the "ideal" peripheral profile. FIG. 25B shows a portion of a generally circular membrane assembly 2500, including a membrane 2506 having twelve control points 2502, and a peripheral guide wire 2504. Only a portion of the membrane assembly is shown. The combination of the control points 2502 and the guide wire 2504 may result in a scalloped membrane periphery, which may also be termed a trampoline configuration. The elastic forces acting on the guide wire may increase for portions of the guide wire between the membrane attachments, and may be at a maximum at a location of maximum deviation (2510, also labelled "1") of the actual membrane periphery from an "ideal" membrane periphery, which may be a smooth curve 2508 drawn through the control points (also labeled "2").

Figure 26A:
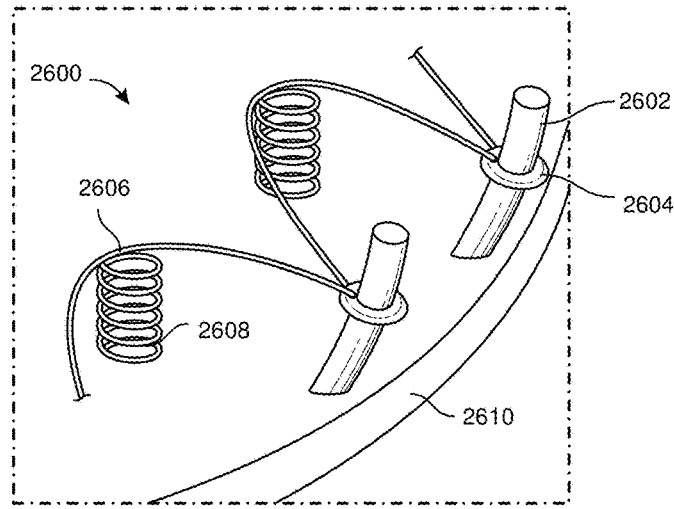
FIGS. 26A-26D show example device configurations including a spring or resilient material.
Figure 26B:
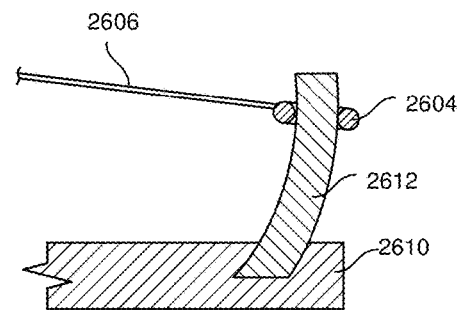
Figure 26C:
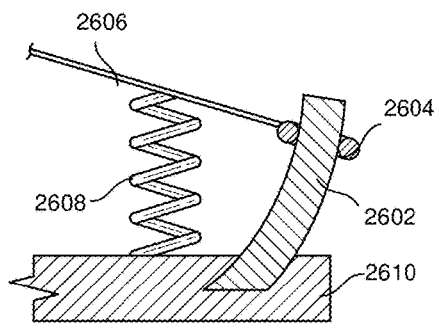

FIGS. 26A-26C illustrate a portion of a device 2600. FIG. 26A shows a device 2600 having a passive spring 2608 positioned under the guide wire 2606, near the edge of the membrane, which produces an axial load (e.g., normal to a substrate 2610) as the membrane attachment 2604 moves along the guide path provided by the support structure 2602.

FIG. 26B shows a support structure 2612 that provides a curved guide path for the membrane attachment 2604, in this example without the spring 2608. This configuration allows the profile of the membrane to be adjusted by moving the membrane attachment 2604 along a curved guide path defined by the curved support structure 2612. The support structure 2612 may be attached to the substrate 2610.

FIG. 26C shows a side view further illustrating a possible location of the spring 2608 relative to the components discussed above in relation to FIGS. 26A and 26B. The support structure 2602 may be modified, relative to the spring-less configuration of FIG. 26B, to further balance the vertical force exerted by the spring 2608 when the spring is compressed. For example, the guide path provided by the support structure 2602, used in combination with the spring 2608, may have a greater curve inwards (towards the center of the lens) as the membrane attachment 2604 approaches the substrate 2610. The curvature of the support structure 2602, used with a spring, may be greater than that of support structure 2612, used without a spring.

Figure 26D:
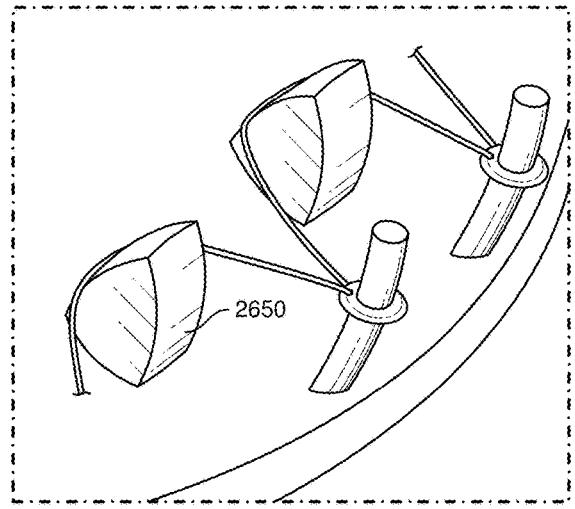

FIG. 26D shows an example configuration using a resilient material 2650, instead of the spring 2608 in FIG. 21A, located in part between the guide wire (or other peripheral structure) and the substrate. The resilient material may include an elastomer, a foam block, or other suitable material. Other elements may be similar to those described above in relation to FIG. 26A.

FIGS. 27A-27G show example approaches to manufacturing a device including a membrane assembly having a guide wire. Examples may include approaches to the fabrication of various devices including a fluid lens, such as a head-mounted device including a fluid lens. The example approaches are shown using very simplified schematics, and some components may be omitted for illustrative clarity.

FIG. 27A shows a membrane 2710 (e.g., a sheet or film material) that may be biaxially stretched and held in a carrier ring 2712. The rectangle 2714 represents use of a tool, in a simplified manner. FIG. 27B shows a guide wire assembly 2720, which may include a guide wire 2722, and optional membrane attachments (not shown, which may function as actuator coupling assemblies). The guide wire assembly 2720 may be held in a tool 2724, for example, to provide datum orientation and to support any elastic tension. FIG. 27C shows presentation of the guide wire assembly 2720 to the membrane 2710 held within the carrier ring 2712.

FIG. 27D shows that guide wire assembly 2720 may be ultrasonically welded to stretched membrane 2710 in the carrier ring 2712, for example, using ultrasonic source 2740. FIG. 27E shows that membrane material outside of the guide wire assembly 2720 may be removed, for example, trimmed with a laser 2750. The membrane tension may be supported, at least in part, by the guide wire, and the guide wire may be supported by support structures, as discussed elsewhere in this disclosure. For example, tension in the guide wire may be supported by the mechanical interaction of membrane attachments and support structures (not shown), which may be provided by a substrate assembly.

FIG. 27F shows the support tool 2714 holding the membrane assembly 2760, including a membrane 2710 and a guide wire 2722. The tool may also be used to hold the support structures and any other desired components. The membrane assembly 2760 may include a combination of a membrane, guide wire, and optionally the membrane attachments, and any other suitable components. FIG. 27G illustrates the insertion of the membrane assembly 2760 into a substrate assembly 2770, which in this example may be referred to as a colander assembly. A substrate assembly may include a substrate and one or more support structures attached to the substrate. In some examples, membrane attachments or other suitable actuation support structures may be located within slots (e.g., shown at 2772 in FIG. 27H), and the membrane tension may be supported by membrane attachments interacting with respective guide surfaces, for example, provided by corresponding support structures. FIG. 27H shows that a retaining cover 2780 may be fitted into the substrate assembly 2770 to increase the stiffness of the structure and/or to provide some other function, for example, as a chassis for one or more actuators. The retaining cover may have a generally ring-shaped form, or other suitable shape.

Figure 28A:
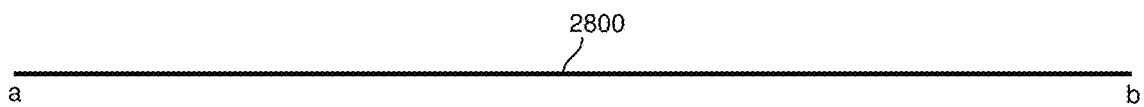
FIGS. 28A-28E illustrate example approaches to assembling a membrane assembly including a guide wire.

FIGS. 28A-28E show further details of an example manufacturing process for fabricating a membrane assembly. FIG. 28A shows a wire 2800, having ends labeled "a" and "b", suitable for supporting the membrane tension. In some examples, a wire may include a high strength and low creep material, such as a high strength steel, and may have a thickness or diameter in the range of between approximately 0.05 mm to approximately 0.3 mm. The wire 2800 may be capable of holding a constant tension in the range of approximately 1N to approximately 10N without failing or lengthening significantly.

Figure 28B:
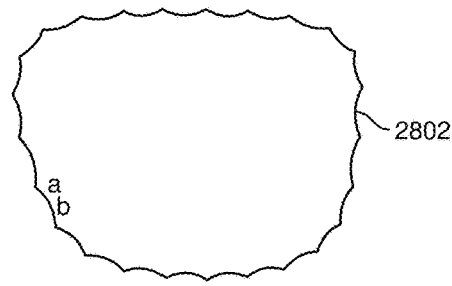

FIG. 28B shows that the wire 2800 formed (e.g., bent) into the shape of a guide wire 2802, such as the shape of a guide wire used in a membrane assembly. In some examples, a guide wire may be fabricated in a similar shape by stamping the wire from a sheet. The ends "a" and "b" are adjacent.

Figure 28C:
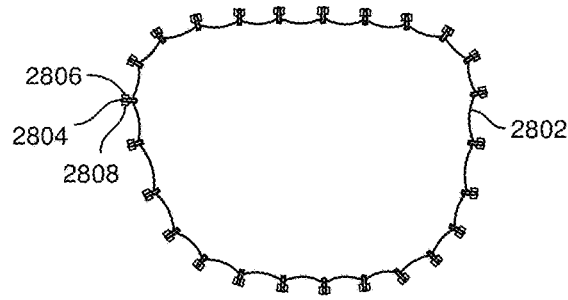

FIG. 28C shows that membrane attachments 2804 (some or all of which may function as an actuator coupling) may be threaded onto (or otherwise attached to or associated with) guide wire 2802. A membrane attachment 2804 may include a pair of rollers, located at 2806 and 2808 (the rollers are not shown in detail in this figure). Membrane attachments may be held at their respective desired locations by a mechanical fixture (not shown). The combination of a guide wire and membrane attachments may be referred to as a guide wire assembly. A guide wire assembly may be attached to a substrate assembly, as described further below.

Figure 28D:
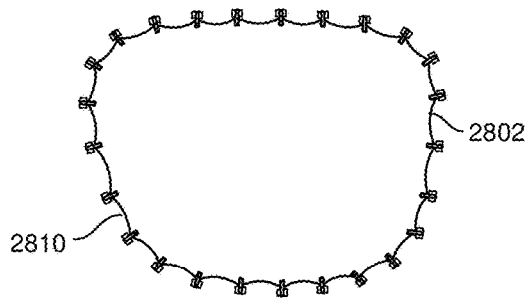

FIG. 28D shows that the open ends of the wire 2802 (which may be held adjacent each other) may be closed by any suitable approach, such as one or more of welding, soldering, a sleeve crimp, or some other approach, such as forming a join 2810 in the guide wire 2802.

Figure 28E:
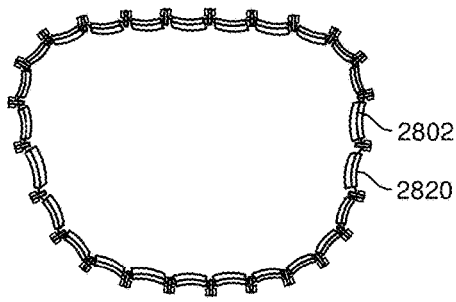

FIG. 28E shows thermoplastic sleeves 2820 applied to interstitial portions of the guide wire 2802. The interstitial portions of the guide wire may be portions of the guide wire located between membrane attachments. Scalloping of the periphery of the membrane may occur within the interstitial portions of the guide wire.

Figure 29A:
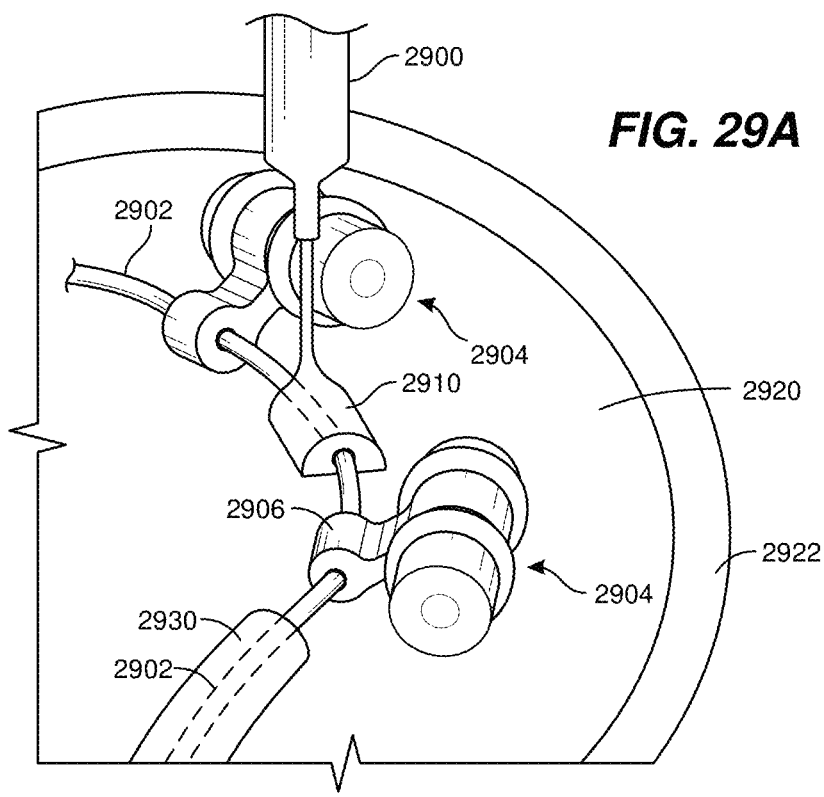
FIGS. 29A-29B illustrate formation of a sleeve on a guide wire.
Figure 29B:
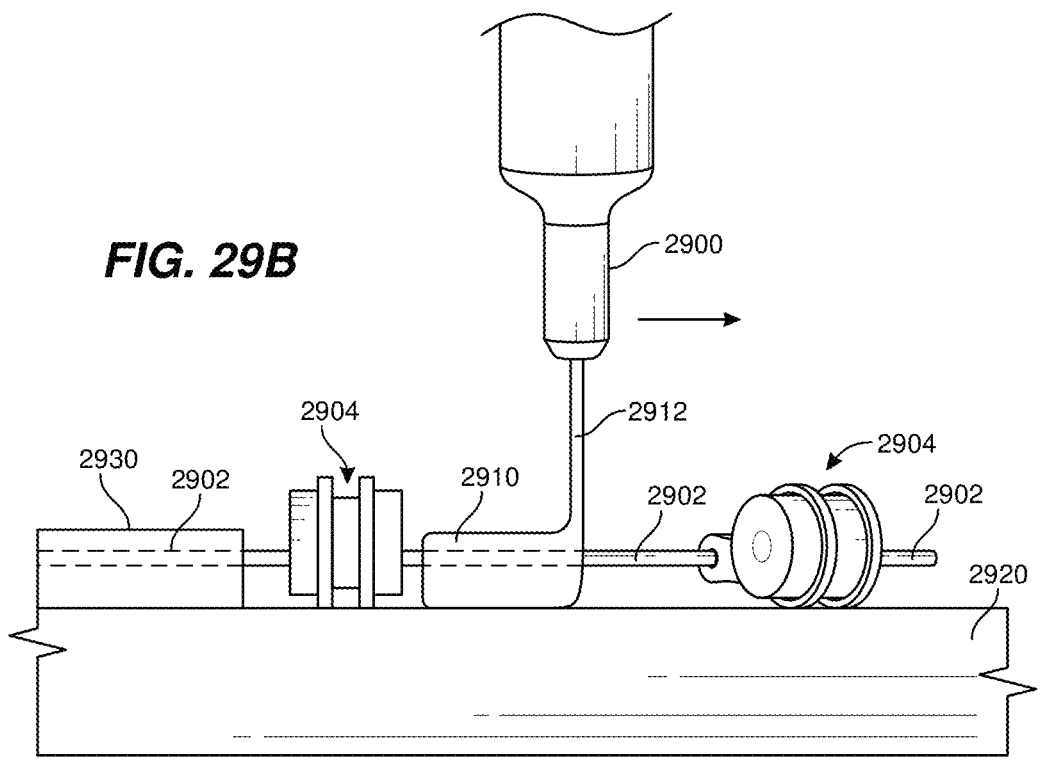
Figure 30:
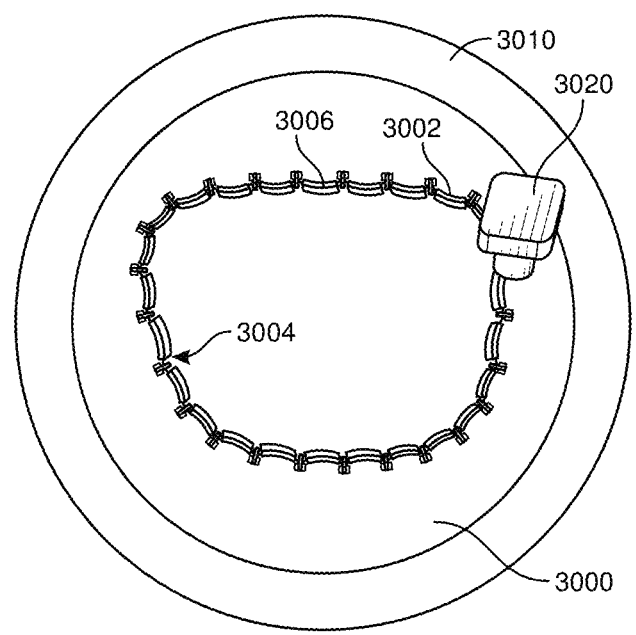
FIG. 30 further illustrates formation of a sleeve on a guide wire.

FIGS. 29A-29B show example approaches to forming thermoplastic sleeves 2910 on an example guide wire 2902. FIG. 29A shows the guide wire 2902 and membrane attachments (that may also provide actuator couplings) shown generally as elements 2904 on a support layer 2920 (optionally supported by substrate support 2922), which may include a non-stick material such as a fluoropolymer (e.g., polytetrafluoroethylene, PTFE), and may function similarly to a release liner. The support layer 2920 may include PTFE or any other suitable material. Hot-melt gun 2900 may drop a bead of molten thermoplastic polymer onto the guide wire 2902 to form a sleeve 2910. The sleeve 2910 may extend along the guide wire 2902, and may end short of the membrane attachments 2904. The membrane attachment 2904 connects to the guide wire 2902 at a control point 2906 for the membrane. In other examples, the sleeve may extend over a portion of the membrane attachment, and, in some examples, may form a single continuous sleeve around the membrane periphery. The sleeve 2910 may include a thermoplastic polymer (such as a thermoplastic polyurethane), may be sufficiently flexible and strong (e.g., to allow adjustment of the membrane without cracking of the sleeve), and may be suitable for ultrasonic welding. FIG. 29A also shows a portion of a second sleeve 2930.

FIG. 29B shows a side view of an arrangement similar to that shown in FIG. 29A, with similar element numbering, showing the bead of molten thermoplastic polymer 2912 deposited from the hot-melt gun 2900 and forming a sleeve 2910 on the guide wire 2902. Other elements are as described in relation to FIG. 29A. FIG. 29B shows a second sleeve 2930 formed on another portion of the wire 2902.

FIGS. 30A-30B show a further method of fabricating a guide wire assembly by forming the guide wire directly onto a membrane 3000. FIG. 30A shows a guide wire 3002 and membrane attachments 3004 (which may be similar to those shown in FIG. 28D) placed onto a stretched membrane 3000, which may be held in a mechanical fixture, such as the carrier ring 3010. Molten thermoplastic may be applied to the guide wire 3002 by hot-melt gun 3020, to form the sleeve 3006. The guide wire 3002 and membrane attachments 3004 may be held in place by a support jig (not shown). Sufficient adhesion between the sleeve (e.g., sleeve 3006) and membrane 3000 may be achieved by direct contact. For example, a molten thermoplastic used to form the sleeve may contact and adhere to a thermoplastic elastomeric membrane. In some examples, ultrasonic welding (e.g., as discussed above in relation FIG. 27D) may be used to improve adhesion of the sleeve to the membrane. The sleeve may be a continuous sleeve or include separate portions such as sleeve 3006. The sleeve may be formed using a process similar to that discussed above in relation to FIGS. 29A and 29B, or any other suitable approach.

In some examples, a device includes a membrane assembly, and the membrane assembly may include: a membrane in elastic tension; a guide wire extending around a peripheral portion of the membrane, where the membrane assembly has at least one control point; a substrate; a fluid at least partially enclosed between the membrane and the substrate; and at least one support structure configured to provide a guide path for the at least one control point. In some examples, a support structure may include at least one curved pin. A curved pin may be configured to provide a curved guide surface, which may define the guide path provided by the support structure for a respective control point. In some examples, the support structure includes at least one slot. The slot may be configured to provide a curved guide surface that defines the guide path provided by the slot for a respective control point.

An example device may include a membrane having membrane attachments (which may also be referred to as interface elements) arranged around the periphery of the membrane. The membrane attachment may be attached to the guide wire at a control point for the membrane, and may engage with the support structure. The guide path for the control point may be controlled by the movement of the membrane attachment relative to the support structure. The membrane attachment may include a roller, such as a pair of rollers, that may rotate around an axle. In some examples, the roller may include synthetic sapphire (alumina), quartz, glass, metal (e.g., steel, tungsten, or titanium), inorganic material (e.g., a ceramic), or any other suitable material. The membrane attachment may include at least one roller, such as a pair of spaced-apart rollers. A device may further include an actuator configured to adjust a location of the control point along the guide path. The guide path may be configured so that the elastic energy of the membrane is substantially independent of the location of the control point on the guide path. Alternatively, or additionally, the guide path may be configured so that the elastic tension exerted by the membrane is directed normal to the guide path for each location of the membrane attachment on the guide path.

An example device may include a fluid lens, and the membrane may provide an adjustable profile for an adjustable fluid lens. For example, an optical power of a fluid lens may be adjustable by moving a location of the control point of the membrane assembly along the guide path. The fluid lens may have an optical center, and locations on the guide path may have a radial distance from the optical center and an axial distance from the substrate. An example guide path may be configured so that the radial distance decreases as an axial distance from the substrate decreases. The guide path may curve inwards, towards the optical center of the lens, moving along the guide path towards the substrate.

In some examples, a support structure may include a pin or slot that defines a guide path. The guide path may curve inwardly towards the optical center as the axial distance decreases. In some examples, the radial distance may decrease as the magnitude of the membrane curvature increases. The support structure may include a pin, slot, or other suitable structure that defines a guide path, and the guide path may curve inwardly towards the optical center as the direction of increasing membrane distension increases. In some examples, the elastic tension may have no appreciable component tangentially along the guide path. A support structure may include one or more of a pivot, a flexure, a slide, a guide slot, a guide channel, or a guide surface.

A device may include an edge seal configured to help retain the fluid between the substrate and the membrane. A membrane attachment may be bonded to the membrane assembly, and may engage with the support structure to allow the control point of the membrane assembly to move along the guide path. The exterior surface of the membrane may be convex (e.g., as part of a plano-convex lens), or concave (e.g., as part of a plano-concave lens). A substrate may be a planar substrate, and may be optically transparent. In some examples, the exterior surface of a membrane may be concave in some actuation states, and may be planar or convex in other actuation states.

An example method of adjusting a fluid lens (e.g., such that an optical power of the fluid lens changes) may including adjusting a profile of a membrane, such that the elastic strain energy in an elastomeric polymer membrane does not change appreciably as the membrane profile is adjusted. The fluid lens may include a membrane assembly including an elastomeric polymer membrane and a guide wire, and adjusting the fluid lens may include moving a control point of the membrane assembly along a guide path provided by a support structure. An actuation force may be applied, through a membrane attachment, to the membrane to change the optical power of the fluid lens. The actuation force may be applied in a direction normal to an elastic strain force within the membrane. The actuation force may move one or more control points of the membrane along a respective guide path. At least one control point may be located within an edge portion of the membrane assembly. Control points may be arranged around the periphery of the membrane. The guide path may be provided by a support structure, for example, a support structure including a curved structure, such as a curved pin or slot.

Example embodiments include apparatuses, systems, and methods related to fluid lenses. In some examples, the term "fluid lens" may include adjustable fluid-filled lenses, such as adjustable liquid-filled lenses.

In some examples, a fluid lens may include a membrane, a substrate, such as a rigid substrate having a substrate surface, and a fluid located within an enclosure formed at least in part by the membrane and the substrate. The membrane may be an elastic membrane having a membrane profile. The fluid lens may have an optical property that is adjustable by adjusting the membrane profile, for example, by modifying a curvature of the membrane profile. A fluid lens may further include a support structure configured to retain the membrane under tension and allow adjustment of the optical property of the fluid lens by adjusting the membrane profile.

In some examples, a fluid lens includes a substrate (such as a planar substrate, that may be generally rigid), a membrane, which may provide a curved or planar surface, an edge seal, and a support structure. A fluid lens may be a circular lens or non-circular lens. The edge seal may extend around the periphery of a fluid-filled volume and retain (in cooperation with the substrate and the membrane) the fluid within an enclosed fluid volume. The fluid may be enclosed by the substrate and membrane in cooperation with the edge seal. The support structure may provide a guide surface, and may include a guide slot or any other suitable guide structure. An example support structure may include an element that extends around the periphery (or within a peripheral region) of the substrate and attach the membrane to the substrate. The support structure may provide a guide path, such as a guide surface along which a control point (e.g., provided by a membrane attachment located within an edge portion of the membrane) may slide. The support structure may include at least one actuator, and the fluid lens may include one or more actuators which may be located around the periphery of the fluid lens. The at least one actuator may exert a controllable force on the membrane through at least one control point, and may be used to adjust the curvature of the membrane surface and hence the optical properties of the lens (such as focal length, astigmatism correction, cylindricity, parabolic or freeform surface profiles, pincushion distortion, barrel distortion, or any other relevant optical parameter).

In some examples, an ophthalmic application of a fluid lens includes a lens frame, an elastic membrane, a substrate, a lens fluid (that may be at least partially enclosed between the elastic membrane and the substrate), an edge seal, and at least one support structure. The substrate may include a generally planar, rigid layer, and may be generally optically transparent. Adjustment of the device configuration and forces applied to the membrane may achieve a planar-convex fluid lens, in which the membrane tends to curve away from the substrate within a central portion. Example lenses may also be configured in planar-concave configurations, in which the membrane tends to curve towards the substrate in a central portion. In some examples, an adjustable fluid-filled lens includes a membrane having a line tension, a peripheral structure (such as a guide wire or support ring) extending around the membrane periphery, a substrate, and an edge seal. The membrane line tension may be supported by the peripheral structure. This may be augmented by a static restraint located at one or more points on the peripheral structure.

In some examples, a peripheral structure may generally surround the membrane of a fluid lens, and the fluid may be enclosed by the combination of the substrate, the membrane, and the edge seal. A rigid peripheral structure, such as a rigid support ring, may limit adjustments available to the control points of the membrane. In some examples, a deformable or flexible peripheral structure may be used, such as a peripheral structure including a guide wire or a flexible ring. In some examples, a flexible ring may be relatively rigid in a plane orthogonal to the optic axis. In some examples, a flexible ring may be generally circular, or have a non-circular shape, such as an oval or rounded quadrilateral shape generally associated with eyewear lenses.

In some examples, a device includes a membrane, a support structure configured to provide a guide path for an edge portion of the membrane, a membrane attachment (which mechanically connects the membrane to the support structure and allows a control point of the membrane to move freely along the guide path), a substrate, and an edge seal. In some examples, the support structure may be generally rigid and attached to the substrate, and/or to a frame.

Lens Fluid

In some examples, a fluid lens (which may also be termed a "fluid-filled lens") includes a fluid, a substrate, and a membrane, with the substrate and the membrane at least partially enclosing the fluid. The fluid within a fluid lens may be referred to as a "lens fluid" or occasionally as a "fluid" for conciseness. The lens fluid may include a liquid, such as an oil, such as a silicone oil, such as a phenylated silicone oil.

In some examples, a lens fluid may be (or include) a transparent fluid. In this context, a transparent fluid may have little or substantially no visually perceptible visible wavelength absorption over an operational wavelength range. However, fluid lenses may also be used in the UV and the IR spectrum, and in some examples the fluid used may be generally non-absorbing in the wavelength range of the desired application and may not be transparent over some or all of the visible wavelength range. In some examples, the membrane may be transparent, for example, optically clear at visible wavelengths.

In some examples, a lens fluid may include an oil, such as an optical oil. In some examples, a lens fluid may include one or more of a silicone, a thiol, or a cyano compound. The fluid may include a silicone based fluid, which may sometimes be referred to as a silicone oil. Example lens fluids include aromatic silicones, such as phenylated siloxanes, for example, pentaphenyl trimethyl trisiloxane.

In some examples, a fluid lens includes, for example, a membrane at least partially enclosing a fluid. A fluid may be, or include, one or more of the following: a gas, gel, liquid, suspension, emulsion, vesicle, micelle, colloid, liquid crystal, or any other suitable flowable or otherwise deformable phase.

In some examples, a lens fluid may have a visually perceptible color or absorption, for example, for eye protection use or improvement in visual acuity. In some examples, the lens fluid may have a UV absorbing dye and/or a blue absorbing dye, and the fluid lens may have a slightly yellowish tint. In some examples, a lens fluid may include a dye selected to absorb specific wavelengths, for example, laser wavelengths in the example of laser goggles. In some examples, a device including a fluid lens may be configured as sunglasses, and the lens fluid may include an optical absorber and/or photochromic material. In some examples, a fluid lens may include a separate layer, such as a light absorption layer configured to reduce the light intensity passed to the eye, or protect the eye against specific wavelengths or wavelength bands.

Polymer Membranes

In some examples, an example fluid lens may include a membrane. A membrane may include a thin polymer film, which may have a thickness much less (e.g., more than an order of magnitude less) than the lens radius or other lateral extent of the lens. The membrane may provide a deformable optical surface of an adjustable fluid-filled lens.

A fluid lens may include a deformable element such as a polymer membrane, or any other suitable deformable element. A polymer membrane may include an elastomer polymer, and may be an elastic membrane. Membrane thicknesses may be in the range of 10 microns to 1 mm, for example, between 100 microns and 500 microns. The membrane may be optically clear.

In some applications, a fluid lens may show gravity sag, which is a typically undesired variation of optical power with height due to a hydrostatic pressure gradient in the fluid lens. Gravity sag may be expressed as change in optical power with height, for example, 0.25 diopters (D) over a vertical displacement of 20 mm. In some examples, a membrane coating may also modify the elastic properties of a membrane in such a way that gravity sag is reduced or substantially eliminated.

In some applications, a fluid lens may show gravity sag, which is a typically undesired variation of optical power with height due to a hydrostatic pressure gradient in the fluid lens. Gravity sag may be expressed as change in optical power with height, for example, 0.25 diopters (D) over a vertical displacement of 20 mm. In some examples, a membrane coating may modify the elastic properties of a membrane in such a way that gravity sag is reduced or substantially eliminated. In some examples, a membrane may have a tension sufficient to keep gravity sag to within a desired limit. For example, a membrane may have a tension in the range 100 N/m to 500 N/m, for instance within the range 200 N/m to 300 N/m.

In some examples, a membrane and/or a substrate may be subject to a surface treatment, such as a coating, which may be provided before or after fluid lens assembly. In some examples, a polymer may be applied to the membrane, such as a polymer coating, for example, a fluoropolymer coating. A fluoropolymer coating may include one or more fluoropolymers, such as polytetrafluoroethylene, or its analogs, blends, or derivatives.

Substrates

In some examples, a fluid lens may include a substrate. The substrate may provide one exterior surface of an adjustable fluid-filled lens, for example, opposite the surface provided by the membrane, and may include a rigid layer or a rigid lens.

In some examples, the substrate may be relatively rigid, and may exhibit no visually perceptible deformation due to, for example, adjusting the internal pressure of the fluid and/or tension on the membrane. In some examples, the substrate may be a generally transparent planar sheet. The substrate may include one more substrate layers, and a substrate layer may include a polymer, glass, optical film, or the like. Example glasses include silicate glasses, such as borosilicate glasses. In some examples, one or both surfaces of a substrate may be planar, spherical, cylindrical, spherocylindrical, convex, concave, parabolic, or have a freeform surface curvature. One or both surfaces of a substrate may approximate a prescription of a user, and adjustment of the membrane profile may be used to provide an improved prescription, for example, for reading, distance viewing, or any other desired use. In some examples, the substrate may have no significant optical power, for example, by having parallel planar surfaces.

Membrane deformation may be used to adjust an optical parameter, such as a focal length, around a center value determined by relatively fixed surface curvature(s) of a substrate or other optical element, for example, of one or both surfaces of a substrate.

In some examples, the substrate may include an elastomer, and may in some examples have an adjustable profile (that may have a smaller range of adjustments than provided by the membrane), and in some examples the substrate may be omitted and the fluid enclosed by a pair of membranes, or any other suitable flexible enclosure configuration. An example lens may include a pair of membranes at least partially enclosing the lens fluid, and a rigid substrate may be omitted.

Edge Seal

In some examples, a fluid lens may include an edge seal, that may include, for example, a deformable component configured to retain the fluid in the lens. The edge seal may connect an edge portion of the membrane to an edge portion of the substrate, and may include a thin flexible polymer film. In some examples, the fluid may be enclosed in a flexible bag, which may provide the edge seal, membrane, and in some examples, a substrate coating. An edge seal may include a flexible polymer film.

Actuators

In some examples, a fluid lens includes one or more actuators. The one or more actuators may be used to modify the elastic tension of a membrane, and may hence modify an optical parameter of a fluid lens including the membrane. The membrane may be connected to a substrate around the periphery of the membrane, for example, using a connection assembly. The connection assembly may include at least one of an actuator, a post, a wire, or any other suitable connection hardware. In some examples, one or more actuators are used to adjust the curvature of the membrane, and hence the optical properties of the fluid lens.

Devices, Such as Ophthalmic Devices with Frames

In some examples, a device including a fluid lens may include a one or more fluid lenses supported by a frame, such as ophthalmic glasses, goggles, visor, or the like. Example fluid lenses may be shaped and sized for use in glasses (e.g., prescription spectacles) or head-mounted displays such as virtual reality devices or augmented reality devices. Example lenses may be the primary viewing lenses of such devices.

Applications of the concepts described herein include fluid lenses and devices that may include one or more fluid lenses, such as ophthalmic devices (e.g., glasses), augmented reality devices, virtual reality devices, and the like. Fluid lenses may be incorporated into eyewear, such as wearable optical devices like eyeglasses, an augmented reality or virtual reality headset, and/or other wearable optical device. Example devices may exhibit reduced thickness, reduced weight, improved field-of-view (e.g., wide angle) optics (e.g., for a given weight), and/or improved aesthetics. In some examples, a device may include at least one lens shaped and/or sized for use in glasses, heads-up displays, augmented reality devices, virtual reality devices, and the like. In some examples, a fluid lens may be a primary viewing lens for the device, for example, a lens through which light from the environment passes before reaching the eye of a user. In some examples, a fluid lens may have a diameter or other analogous dimension (e.g., width or height of a non-circular lens) that is between 20 mm and 80 mm.

Coatings

In some examples, a substrate may include a coating. In some examples, an interior and/or exterior surface of a substrate and/or membrane may have a coating, such as a polymer coating. In some examples, an exterior surface of a substrate may have a scratch-resistant coating and/or an antireflection coating. In some examples, an interior surface may correspond to an interior surface of an enclosure holding the lens fluid, such as a surface of a membrane or substrate adjacent or substantially adjacent to the lens fluid.

In some examples, a device includes a fluid lens, where the fluid lens includes a membrane having a peripheral portion, a guide wire arranged around the peripheral portion of the membrane, a membrane attachment attached to the guide wire, a substrate, a fluid located within an enclosure formed at least in part by the membrane and the substrate, and a support structure attached to the substrate. An adjustment of a focal length of the fluid lens may include a movement of the membrane attachment. The support structure may engage with the membrane attachment and allow the movement of the membrane attachment. In some examples, the movement of the membrane attachment does not appreciably change an elastic energy of the membrane.

In some examples, a method of fabricating a device may include one or more of the following aspects. A membrane may be stretched in one or more directions, and may be held in a carrier ring (such as a flexible ring) or other suitable peripheral structure. A flexible ring may have a circular periphery, or, in some examples, may have a non-circular periphery, such as a peripheral shape similar to that of a lens used in spectacles. A guide wire assembly, which may include a guide wire and at least one membrane attachment, may be held in a tool, for example, to provide orientation and support elastic tension. The guide wire assembly may then be attached to the membrane. In some examples, a guide wire assembly may be ultrasonically welded to the membrane. Membrane material outside of the guide wire assembly may be removed by laser trimming. In the membrane assembly, the membrane tension may be, at least in part, supported by the guide wire, and the guide wire may be supported by support structures which may be attached to a substrate (or frame, or other suitable structure) of the lens. Tension in the guide wire may be supported by the mechanical interaction between membrane attachments and support structures. An example membrane assembly may include a membrane, guide wire, optionally one or more membrane attachments, and any other suitable components. The membrane assembly may be inserted into a substrate assembly, that may include a substrate, support structures, and any other suitable components (e.g., a frame, sensors, filters, coatings, and the like). The substrate assembly may include the lens substrate, and one or more support structures which may be rigidly attached to the substrate. The membrane attachments may be configured to engage with a corresponding support structure. For example, membrane attachments may be located in slots, or engage with posts or other suitable support structures. The membrane tension may be supported by membrane attachments interacting with corresponding guide surfaces, which may be provided by respective support structures. A retaining cover may be fitted into the substrate assembly to increase the stiffness of the structure and/or to provide some other function, for example, a chassis configured to support one or more actuators. An actuator may be configured to provide an urging force to a membrane attachment, and/or may be configured to modify the location of the membrane attachment along the guide path. The retaining cover may have a generally ring-shaped form, or other suitable shape.

In some examples, a method of fabricating a fluid lens includes bonding a guide wire assembly, including a guide wire and a plurality of membrane attachments, to a pre-stretched elastic membrane. The guide wire assembly may then be attached to a substrate assembly including a substrate and a plurality of support structures. The support structures may engage with the membrane attachments to retain an elastic tension in the membrane. The method may further include enclosing a fluid within an enclosure formed at least in part by the substrate and the membrane, to form an adjustable fluid lens. An edge seal may be used to help retain the fluid. A thermoplastic polymer sleeve may be formed on portions of the guide wire located between the membrane attachments. The membrane may be pre-stretched by a mechanical fixture, and the mechanical fixture may be removed after attaching the guide wire assembly to the substrate assembly.

In some examples, an adjustable fluid lens (such as an adjustable liquid lens) may be adjusted by moving at least one control point of an elastic membrane along a guide path.

Control points may be provided by at least one membrane attachment. The guide path may be configured so that the elastic deformation energy of the membrane is approximately unchanged by the movement of the membrane attachment. This approach may greatly reduce actuation force and/or device power requirements, and may provide faster response related to adjustment of an optical property of the fluid lens. In some examples, a device includes a guide wire (which may sometimes be referred to as an edge wire) located around a periphery of the membrane. A guide wire may include a metal wire, such as a steel wire, optionally having a thermoplastic polyurethane (TPU) coating. As the membrane attachments move along a respective guide path towards the substrate, the perimeter dimension of the membrane may be reduced, in some examples as the curvature of the membrane profile increases. In some examples, a membrane attachment may include a clevis fastener and/or one or more rollers, for example, using jewel (e.g., synthetic sapphire) wheels, optional surface treatments to reduce friction, and optional flanges to guide the membrane attachments along slots or another guide structure. The number of actuation points may be selected based on various factors, for example, the degree of "scalloping" (curved edges) between membrane attachments. The scalloped regions may be hidden by eyeglass frames. In some examples, an additional spring (or foam) element may be used to reduce the reduce the tendency of the wire to be pulled up (e.g., away from) the substrate. Numerical modeling with 20 attachment points showed good optical performance, though other numbers of attachment points may be used, for example, 8-30, such as 20-30. Fabrication may include attachment of the guide wire to the membrane using acoustic welding, optionally followed by laser trimming. In some examples, a method of operating an adjustable fluid lens, including a membrane, membrane attachments, and support structures configured to engage with a corresponding membrane attachment, may include moving at least one membrane attachment along a guide path determined by the corresponding support structure. In this context, a membrane attachment may physically interact with corresponding support structure, for example, extending through and/or around the corresponding support structure. Applications include ophthalmic devices, optical device, and other applications of liquid lenses.

EXAMPLE EMBODIMENTS

Example 1: An example device may include a fluid lens, where the fluid lens includes: a membrane assembly including a membrane and a peripheral structure, where the peripheral structure is disposed around a peripheral portion of the membrane; a membrane attachment attached to the peripheral structure; a substrate; a fluid located within an enclosure formed at least in part by the membrane and the substrate; and a support structure, attached to the substrate, where: the support structure is engaged with the membrane attachment and allows a movement of the membrane attachment along a guide path; the movement of the membrane attachment adjusts a focal length of the fluid lens; the support structure has a guide surface, and the guide path is determined, at least in part, by a shape of the guide surface; and the guide path curves inwardly towards an optical center of the fluid lens as the guide path approaches the substrate.

Example 2. The device of example 1, where the peripheral structure includes a guide wire or a flexible ring.

Example 3. The device of any of examples 1-2, where the membrane is an elastic membrane under tension, the membrane has an elastic energy, and the elastic energy of the membrane is substantially independent of a location of the membrane attachment on the guide path.

Example 4. The device of any of examples 1-3, further including an actuator configured to induce the movement of the membrane attachment along the guide path.

Example 5. The device of any of examples 1-4, where the support structure includes a curved pin, and the curved pin provides the guide surface.

Example 6. The device of any of examples 1-5, where the membrane attachment includes a roller.

Example 7. The device of example 6, where the support structure includes a slot formed in a curved element extending from the substrate, and a portion of the membrane attachment extends through the slot and engages with the curved surface using the roller.

Example 8. The device of any of examples 6-7, where the roller includes an axle and at least one roller wheel, where the roller has a generally circular periphery configured to move along the guide path, and the guide path provided by a curved surface.

Example 9. The device of any of examples 6-8, where the roller includes a cam.

Example 10. The device of any of examples 1-9, where the membrane exerts an elastic force on the support structure, and the guide path is configured so that the elastic force is generally normal to the guide path for each location of the membrane attachment on the guide path.

Example 11. The device of any of examples 1-10, further including an edge seal, where the edge seal is configured to retain the fluid between the substrate and the membrane.

Example 12. The device of any of examples 1-11, where the device includes a plurality of support structures, including the support structure, and each support structure is configured to engage with a respective membrane attachment.

Example 13. The device of any of examples 1-12, where the fluid lens is sized for use with a human eye, and the fluid lens has a diameter, width, or analogous dimension between approximately 20 mm and approximately 80 mm.

Example 14. The device of any of examples 1-13, where: the substrate is an optically transparent substrate, the membrane is an optically transparent membrane, and the fluid includes an optically transparent liquid.

Example 15. The device of any of examples 1-14, where the device includes a frame that supports both the fluid lens and an additional fluid lens, and the device is a head-mounted device.

Example 16. The device of any of examples 1-15, where the device is an ophthalmic device configured to be used as eyewear.

Example 17. The device of any of examples 1-16, where the device is an augmented reality device or a virtual reality device.

Example 18. An example method may include: bonding a peripheral structure around a periphery of an elastic membrane, the peripheral structure being attached to a plurality of membrane attachments; attaching the peripheral structure to a substrate assembly, the substrate assembly including a substrate and a plurality of support structures, such that each of the plurality of membrane attachments engage with a respective support structure of the plurality of support structures; and enclosing a fluid within an enclosure formed at least in part by the substrate and the elastic membrane to form an adjustable fluid lens, where an optical property of the adjustable lens may be adjusted by moving at least one of the plurality of membrane attachments along a guide path at least partially defined by the respective support structure, such an elastic energy within the membrane is substantially unchanged.

Example 19. The method of example 18, further including forming a thermoplastic polymer sleeve on portions of the peripheral structure located between the membrane attachments.

Example 20. The method of any of examples 18-19, where the elastic membrane is pre-stretched by a mechanical fixture, and the mechanical fixture is removed after attaching the peripheral structure to the substrate assembly.

Embodiments of the present disclosure may include or be implemented in conjunction with various types of artificial reality systems. Artificial reality is a form of reality that has been adjusted in some manner before presentation to a user, that may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of that may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs). Other artificial reality systems may include a NED that also provides visibility into the real world (e.g., augmented-reality system 3100 in FIG. 31) or that visually immerses a user in an artificial reality (e.g., virtual-reality system 3200 in FIG. 32). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 31, augmented-reality system 3100 may include an eyewear device 3102 with a frame 3110 configured to hold a left display device 3115(A) and a right display device 3115(B) in front of a user's eyes. Display devices 3115(A) and 3115(B) may act together or independently to present an image or series of images to a user. While augmented-reality system 3100 includes two displays, embodiments of this disclosure may be implemented in augmented-reality systems with a single NED or more than two NEDs.

In some embodiments, augmented-reality system 3100 may include one or more sensors, such as sensor 3140. Sensor 3140 may generate measurement signals in response to motion of augmented-reality system 3100 and may be located on substantially any portion of frame 3110. Sensor 3140 may represent a position sensor, an inertial measurement unit (IMU), a depth camera assembly, a structured light emitter and/or detector, or any combination thereof. In some embodiments, augmented-reality system 3100 may or may not include sensor 3140 or may include more than one sensor. In embodiments in which sensor 3140 includes an IMU, the IMU may generate calibration data based on measurement signals from sensor 3140. Examples of sensor 3140 may include, without limitation, accelerometers, gyroscopes, magnetometers, other suitable types of sensors that detect motion, sensors used for error correction of the IMU, or some combination thereof.

Augmented-reality system 3100 may also include a microphone array with a plurality of acoustic transducers 3120(A)-1320(J), referred to collectively as acoustic transducers 3120. Acoustic transducers 3120 may be transducers that detect air pressure variations induced by sound waves. Each acoustic transducer 3120 may be configured to detect sound and convert the detected sound into an electronic format (e.g., an analog or digital format). The microphone array in FIG. 2 may include, for example, ten acoustic transducers: 3120(A) and 3120(B), that may be designed to be placed inside a corresponding ear of the user, acoustic transducers 3120(C), 3120(D), 3120(E), 3120(F), 3120(G), and 3120(H), that may be positioned at various locations on frame 3110, and/or acoustic transducers 3120(I) and 3120 (J), that may be positioned on a corresponding neckband 3105.

In some embodiments, one or more of acoustic transducers 3120(A)-(F) may be used as output transducers (e.g., speakers). For example, acoustic transducers 3120(A) and/or 3120(B) may be earbuds or any other suitable type of headphone or speaker.

The configuration of acoustic transducers 3120 of the microphone array may vary. While augmented-reality system 3100 is shown in FIG. 31 as having ten acoustic transducers 3120, the number of acoustic transducers 3120 may be greater or less than ten. In some embodiments, using higher numbers of acoustic transducers 3120 may increase the amount of audio information collected and/or the sensitivity and accuracy of the audio information. In contrast, using a lower number of acoustic transducers 3120 may decrease the computing power required by an associated controller 3150 to process the collected audio information. In addition, the position of each acoustic transducer 3120 of the microphone array may vary. For example, the position of an acoustic transducer 3120 may include a defined position on the user, a defined coordinate on frame 3110, an orientation associated with each acoustic transducer 3120, or some combination thereof.

Acoustic transducers 3120(A) and 3120(B) may be positioned on different parts of the user's ear, such as behind the pinna, behind the tragus, and/or within the auricle or fossa. Or, there may be additional acoustic transducers 3120 on or surrounding the ear in addition to acoustic transducers 3120 inside the ear canal. Having an acoustic transducer 3120 positioned next to an ear canal of a user may enable the microphone array to collect information on how sounds arrive at the ear canal. By positioning at least two of acoustic transducers 3120 on either side of a user's head (e.g., as binaural microphones), augmented-reality system 3100 may simulate binaural hearing and capture a 3D stereo sound field around about a user's head. In some embodiments, acoustic transducers 3120(A) and 3120(B) may be connected to augmented-reality system 3100 via a wired connection 3130, and in other embodiments acoustic transducers 3120(A) and 3120(B) may be connected to augmented-reality system 3100 via a wireless connection (e.g., a Bluetooth connection). In still other embodiments, acoustic transducers 3120(A) and 3120(B) may not be used at all in conjunction with augmented-reality system 3100.

Acoustic transducers 3120 on frame 3110 may be positioned along the length of the temples, across the bridge, above or below display devices 3115(A) and 3115(B), or some combination thereof. Acoustic transducers 3120 may be oriented such that the microphone array is able to detect sounds in a wide range of directions surrounding the user wearing the augmented-reality system 3100. In some embodiments, an optimization process may be performed during manufacturing of augmented-reality system 3100 to determine relative positioning of each acoustic transducer 3120 in the microphone array.

In some examples, augmented-reality system 3100 may include or be connected to an external device (e.g., a paired device), such as neckband 3105. Neckband 3105 generally represents any type or form of paired device. Thus, the following discussion of neckband 3105 may also apply to various other paired devices, such as charging cases, smart watches, smart phones, wrist bands, other wearable devices, hand-held controllers, tablet computers, laptop computers, other external compute devices, etc.

As shown, neckband 3105 may be coupled to eyewear device 3102 via one or more connectors. The connectors may be wired or wireless and may include electrical and/or non-electrical (e.g., structural) components. In some cases, eyewear device 3102 and neckband 3105 may operate independently without any wired or wireless connection between them. While FIG. 31 illustrates the components of eyewear device 3102 and neckband 3105 in example locations on eyewear device 3102 and neckband 3105, the components may be located elsewhere and/or distributed differently on eyewear device 3102 and/or neckband 3105. In some embodiments, the components of eyewear device 3102 and neckband 3105 may be located on one or more additional peripheral devices paired with eyewear device 3102, neckband 3105, or some combination thereof.

Pairing external devices, such as neckband 3105, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 3100 may be provided by a paired device or shared between a paired device and an eyewear device, thus reducing the weight, heat profile, and form factor of the eyewear device overall while still retaining desired functionality. For example, neckband 3105 may allow components that would otherwise be included on an eyewear device to be included in neckband 3105 since users may tolerate a heavier weight load on their shoulders than they would tolerate on their heads. Neckband 3105 may also have a larger surface area over which to diffuse and disperse heat to the ambient environment. Thus, neckband 3105 may allow for greater battery and computation capacity than might otherwise have been possible on a stand-alone eyewear device. Since weight carried in neckband 3105 may be less invasive to a user than weight carried in eyewear device 3102, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 3105 may be communicatively coupled with eyewear device 3102 and/or to other devices. These other devices may provide certain functions (e.g., tracking, localizing, depth mapping, processing, storage, etc.) to augmented-reality system 3100. In the embodiment of FIG. 31, neckband 3105 may include two acoustic transducers (e.g., 3120(I) and 3120(J)) that are part of the microphone array (or potentially form their own microphone subarray). Neckband 3105 may also include a controller 3125 and a power source 3135.

Acoustic transducers 3120(I) and 3120(J) of neckband 3105 may be configured to detect sound and convert the detected sound into an electronic format (analog or digital). In the embodiment of FIG. 31, acoustic transducers 3120(I) and 3120(J) may be positioned on neckband 3105, thereby increasing the distance between the neckband acoustic transducers 3120(I) and 3120(J) and other acoustic transducers 3120 positioned on eyewear device 3102. In some cases, increasing the distance between acoustic transducers 3120 of the microphone array may improve the accuracy of beamforming performed via the microphone array. For example, if a sound is detected by acoustic transducers 3120(C) and 3120(D) and the distance between acoustic transducers 3120(C) and 3120(D) is greater than, for example, the distance between acoustic transducers 3120(D) and 3120(E), the determined source location of the detected sound may be more accurate than if the sound had been detected by acoustic transducers 3120(D) and 3120(E).

Controller 3125 of neckband 3105 may process information generated by the sensors on neckband 3105 and/or augmented-reality system 3100. For example, controller 3125 may process information from the microphone array that describes sounds detected by the microphone array. For each detected sound, controller 3125 may perform a direction-of-arrival (DOA) estimation to estimate a direction from which the detected sound arrived at the microphone array. As the microphone array detects sounds, controller 3125 may populate an audio data set with the information. In embodiments in which augmented-reality system 3100 includes an inertial measurement unit, controller 3125 may compute all inertial and spatial calculations from the IMU located on eyewear device 3102. A connector may convey information between augmented-reality system 3100 and neckband 3105 and between augmented-reality system 3100 and controller 3125. The information may be in the form of optical data, electrical data, wireless data, or any other transmittable data form. Moving the processing of information generated by augmented-reality system 3100 to neckband 3105 may reduce weight and heat in eyewear device 3102, making it more comfortable to the user.

Power source 3135 in neckband 3105 may provide power to eyewear device 3102 and/or to neckband 3105. Power source 3135 may include, without limitation, lithium ion batteries, lithium-polymer batteries, primary lithium batteries, alkaline batteries, or any other form of power storage. In some cases, power source 3135 may be a wired power source. Including power source 3135 on neckband 3105 instead of on eyewear device 3102 may help better distribute the weight and heat generated by power source 3135.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 3200 in FIG. 32, that mostly or completely covers a user's field of view. Virtual-reality system 3200 may include a front rigid body 3202 and a band 3204 shaped to fit around a user's head. Virtual-reality system 3200 may also include output audio transducers 3206(A) and 3206(B). Furthermore, while not shown in FIG. 32, front rigid body 3202 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 3100 and/or virtual-reality system 3200 may include one or more liquid crystal displays (LCDs), light emitting diode (LED) displays, organic LED (OLED) displays digital light project (DLP) micro-displays, liquid crystal on silicon (LCoS) micro-displays, and/or any other suitable type of display screen. Artificial reality systems may include a single display screen for both eyes or may provide a display screen for each eye, that may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay light (to, e.g., the viewer's eyes). These optical subsystems may be used in a non-pupil-forming architecture (such as a single lens configuration that directly collimates light but may result in so-called pincushion distortion) and/or a pupil-forming architecture (such as a multi-lens configuration that may produce barrel distortion to nullify pincushion distortion).

In addition to or instead of using display screens, some artificial reality systems may include one or more projection systems. For example, display devices in augmented-reality system 3100 and/or virtual-reality system 3200 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. The display devices may accomplish this using any of a variety of different optical components, including waveguides components (e.g., holographic, planar, diffractive, polarized, and/or reflective waveguide elements), light-manipulation surfaces and elements (such as diffractive, reflective, and refractive elements and gratings), coupling elements, etc. Artificial reality systems may also be configured with any other suitable type or form of image projection system, such as retinal projectors used in virtual retina displays.

Artificial reality systems may also include various types of computer vision components and subsystems. For example, augmented-reality system 3100 and/or virtual-reality system 3200 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. For example, elements 3206(A), and 3206(B) may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some examples, artificial reality systems may include tactile (i.e., haptic) feedback systems, that may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

The present disclosure may anticipate or include various methods, such as computer-implemented methods. Method steps may be performed by any suitable computer-executable code and/or computing system, and may be performed by the control system of a virtual and/or augmented reality system. Each of the steps of example methods may represent an algorithm whose structure may include and/or may be represented by multiple sub-steps.

In some examples, a system according to the present disclosure may include at least one physical processor and physical memory including computer-executable instructions that, when executed by the physical processor, cause the physical processor to perform an operation, such as at least one of adjusting the optical properties of a fluid lens (e.g., by energizing an actuator), displaying an augmented reality or virtual reality image, providing haptic feedback using one or more transducers, or any other appropriate operation.

In some examples, a non-transitory computer-readable medium according to the present disclosure may include one or more computer-executable instructions that, when executed by at least one processor of a computing device, cause the computing device to perform an operation, such as at least one of adjusting the optical properties of a fluid lens (e.g., by energizing an actuator), displaying an augmented reality or virtual reality image, providing haptic feedback using one or more transducers, or any other appropriate operation.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to perform a function, use the result of the transformation to perform a function, and store the result of the transformation to perform a function. An example function may include at least one of adjusting the focal length of an adjustable lens, actuating an actuator, modifying an optical absorption of an optical element, modifying a membrane profile of an adjustable fluid lens, providing augmented reality or virtual reality image elements, or other function. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Features from any of the embodiments described herein may be used in combination with one another in accordance with the general principles described herein. These and other embodiments, features, and advantages will be more fully understood upon reading the detailed description in conjunction with the accompanying drawings and claims.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

What is claimed is:

1. A device comprising a fluid lens, wherein the fluid lens comprises: a membrane assembly including a membrane and a peripheral structure, wherein the peripheral structure is disposed around a peripheral portion of the membrane; a membrane attachment attached to the peripheral structure; a substrate; a fluid located within an enclosure formed at least in part by the membrane and the substrate; and a support structure, attached to the substrate, wherein: the support structure is engaged with the membrane attachment and allows a movement of the membrane attachment along a guide path; the movement of the membrane attachment adjusts a focal length of the fluid lens; the support structure has a guide surface, and the guide path is determined, at least in part, by a shape of the guide surface; the guide path curves inwardly towards an optical center of the fluid lens as the guide path approaches the substrate; wherein the membrane attachment comprises a roller, and a portion of the membrane attachment extends through the slot and engages with the curved surface using the roller.

2. The device of claim 1, wherein the peripheral structure includes a guide wire or a flexible ring.

3. The device of claim 1, wherein the membrane is an elastic membrane under tension,
the membrane has an elastic energy, and
the elastic energy of the membrane is substantially independent of a location of the membrane attachment on the guide path.

4. The device of claim 1, further comprising an actuator configured to induce the movement of the membrane attachment along the guide path.

5. The device of claim 1, wherein the support structure comprises a curved pin, and the curved pin provides the guide surface.

6. The device of claim 1, wherein the roller comprises an axle and at least one roller wheel, wherein the roller has a generally circular periphery configured to move along the guide path, and the guide path provided by a curved surface.

7. The device of claim 1, wherein the roller comprises a cam.

8. The device of claim 1, wherein the membrane exerts an elastic force on the support structure, and the guide path is configured so that the elastic force is generally normal to the guide path for each location of the membrane attachment on the guide path.

9. The device of claim 1, further comprising an edge seal, wherein the edge seal is configured to retain the fluid between the substrate and the membrane.

10. The device of claim 1, wherein the device comprises a plurality of support structures, comprising the support structure, and
each support structure is configured to engage with a respective membrane attachment.

11. The device of claim 1, wherein the fluid lens is sized for use with a human eye, and the fluid lens has a diameter, width, or analogous dimension between approximately 20 mm and approximately 80 mm.

12. The device of claim 1, wherein:
the substrate is an optically transparent substrate,
the membrane is an optically transparent membrane, and
the fluid comprises an optically transparent liquid.

13. The device of claim 1, wherein the device comprises a frame that supports both the fluid lens and an additional fluid lens, and
the device is a head-mounted device.

14. The device of claim 13, wherein the device is an ophthalmic device configured to be used as eyewear.

15. The device of claim 1, wherein the device is an augmented reality device or a virtual reality device.

16. A method, comprising: bonding a peripheral structure around a periphery of an elastic membrane, the peripheral structure being attached to a plurality of membrane attachments; attaching the peripheral structure to a substrate assembly, the substrate assembly comprising a substrate and a plurality of support structures, such that each of the plurality of membrane attachments engage with a respective support structure of the plurality of support structures; enclosing a fluid within an enclosure formed at least in part by the substrate and the elastic membrane to form an adjustable fluid lens, wherein an optical property of the adjustable lens may be adjusted by moving at least one of the plurality of membrane attachments along a guide path at least partially defined by the respective support structure, such an elastic energy within the membrane is substantially unchanged; wherein membrane attachments comprises rollers, and portion of the membrane attachments extends through slots and engages with curved surfaces using the rollers.

17. The method of claim 16, further comprising forming a thermoplastic polymer sleeve on portions of the peripheral structure located between the membrane attachments.

18. The method of claim 16, wherein the elastic membrane is pre-stretched by a mechanical fixture, and the mechanical fixture is removed after attaching the peripheral structure to the substrate assembly.

\* \* \* \* \*